(12) United States Patent
Miller

(10) Patent No.: US 7,600,963 B2
(45) Date of Patent: Oct. 13, 2009

(54) FLUID ENERGY CONVERTER

(75) Inventor: Donald C. Miller, Fallbrook, CA (US)

(73) Assignee: Viryd Technologies Inc., San Diego, CA (US)

( * ) Notice: Subject to any disclaimer, the term of this patent is extended or adjusted under 35 U.S.C. 154(b) by 376 days.

(21) Appl. No.: 11/506,762

(22) Filed: Aug. 18, 2006

(65) Prior Publication Data

US 2007/0041823 A1 Feb. 22, 2007

Related U.S. Application Data

(60) Provisional application No. 60/710,225, filed on Aug. 22, 2005, provisional application No. 60/710,339, filed on Aug. 22, 2005, provisional application No. 60/760,251, filed on Jan. 19, 2006.

(51) Int. Cl.
F03D 7/02 (2006.01)
(52) U.S. Cl. ............ 415/4.3; 415/4.5; 415/73; 415/74; 415/908; 416/175; 416/177; 416/189; 416/203
(58) Field of Classification Search ......... 415/4.3, 415/4.5, 72, 73, 74, 75, 908; 416/11, 102, 416/148, 175, 176, 177, 189, 203; 290/44, 290/55
See application file for complete search history.

(56) References Cited

U.S. PATENT DOCUMENTS

| 4,963 | A | | 2/1847 | Armstrong et al. |
| 107,120 | A | * | 9/1870 | Sutton ............... 416/86 |
| 719,595 | A | | 2/1903 | Huss |
| 1,121,210 | A | | 12/1914 | Techel |
| 1,175,677 | A | | 3/1916 | Barnes |
| 1,380,006 | A | | 5/1921 | Nielson |
| 1,629,902 | A | | 5/1927 | Arter et al. |
| 1,631,069 | A | | 5/1927 | Smith |
| 1,835,018 | A | | 12/1931 | Darrieus |
| 1,851,680 | A | * | 3/1932 | Morris ............... 416/195 |
| 1,858,696 | A | | 5/1932 | Weiss |
| 1,903,228 | A | | 3/1933 | Thomson |

(Continued)

FOREIGN PATENT DOCUMENTS

CH 118064 12/1926

(Continued)

OTHER PUBLICATIONS

Partial International Search Report for International application No. PCT/US2006/032489 dated Feb. 2, 2007.

(Continued)

*Primary Examiner*—Edward Look
*Assistant Examiner*—Aaron R Eastman
(74) *Attorney, Agent, or Firm*—Knobbe, Martens, Olson & Bear LLP

(57) ABSTRACT

Embodiments include apparatus and methods of fluid energy conversion. One embodiment relates to a tube for a fluid energy converter. The tube may include a generally cylindrical and hollow body having an interior surface, an exterior surface, and a longitudinal axis. Another embodiment includes a fluid energy converter having a longitudinal axis and a rotatable tube coaxial about the longitudinal axis. In some embodiments, the rotatable tube converts kinetic energy in a fluid into rotating mechanical energy, or converts rotating mechanical energy into kinetic energy in a fluid.

16 Claims, 34 Drawing Sheets

U.S. PATENT DOCUMENTS

| | | | |
|---|---|---|---|
| 2,060,884 A | 11/1936 | Madle | |
| 2,086,491 A | 7/1937 | Dodge | |
| 2,112,763 A | 3/1938 | Cloudsley | |
| 2,152,796 A | 4/1939 | Erban | |
| 2,194,674 A * | 3/1940 | Riddell | 473/597 |
| 2,209,254 A | 7/1940 | Ahnger | |
| 2,230,398 A | 2/1941 | Benjafield | |
| 2,469,653 A | 5/1949 | Kopp | |
| 2,596,538 A | 5/1952 | Dicke | |
| 2,675,713 A | 4/1954 | Acker | |
| 2,683,603 A * | 7/1954 | Gackenbach | 473/613 |
| 2,730,904 A | 7/1956 | Rennerfelt | |
| 2,868,038 A | 1/1959 | Billeter | |
| 2,931,234 A | 4/1960 | Hayward | |
| 2,931,235 A | 4/1960 | Hayward | |
| 2,959,063 A | 11/1960 | Perry | |
| 2,959,972 A | 11/1960 | Madson | |
| 3,071,194 A | 1/1963 | Geske | |
| 3,184,983 A | 5/1965 | Kraus | |
| 3,248,960 A | 5/1966 | Schottler | |
| 3,264,776 A * | 8/1966 | Morrow | 446/34 |
| 3,273,468 A | 9/1966 | Allen | |
| 3,280,646 A | 10/1966 | Lemieux | |
| 3,487,726 A | 1/1970 | Burnett | |
| 3,487,727 A | 1/1970 | Gustafsson | |
| 3,661,404 A | 5/1972 | Bossaer | |
| 3,695,120 A | 10/1972 | Titt | |
| 3,707,888 A | 1/1973 | Schottler | |
| 3,736,803 A | 6/1973 | Horowitz et al. | |
| 3,768,715 A | 10/1973 | Tout | |
| 3,891,235 A | 6/1975 | Shelly | |
| 3,918,839 A | 11/1975 | Blackwell et al. | |
| 3,954,236 A * | 5/1976 | Brown | 244/155 R |
| 3,954,282 A | 5/1976 | Hege | |
| 3,996,807 A | 12/1976 | Adams | |
| 4,086,026 A * | 4/1978 | Tamanini | 416/176 |
| 4,166,596 A * | 9/1979 | Mouton et al. | 244/30 |
| 4,169,609 A | 10/1979 | Zampedro | |
| 4,177,683 A | 12/1979 | Moses | |
| 4,219,303 A * | 8/1980 | Mouton et al. | 415/7 |
| 4,227,712 A | 10/1980 | Dick | |
| 4,293,274 A * | 10/1981 | Gilman | 416/51 |
| 4,368,007 A | 1/1983 | Ely | |
| 4,390,148 A * | 6/1983 | Cudmore | 244/19 |
| 4,391,156 A | 7/1983 | Tibbals | |
| 4,459,873 A | 7/1984 | Black | |
| 4,464,952 A | 8/1984 | Stubbs | |
| 4,496,051 A | 1/1985 | Ortner | |
| 4,500,257 A | 2/1985 | Sullivan | |
| 4,574,649 A | 3/1986 | Seol | |
| 4,585,429 A | 4/1986 | Marier | |
| 4,624,648 A * | 11/1986 | Waters | 446/176 |
| 4,628,766 A | 12/1986 | De Brie Perry | |
| 4,630,839 A | 12/1986 | Seol | |
| 4,664,596 A | 5/1987 | Wood | |
| 4,700,581 A | 10/1987 | Tibbals, Jr. | |
| 4,735,430 A | 4/1988 | Tomkinson | |
| 4,756,211 A | 7/1988 | Fellows | |
| 4,790,788 A * | 12/1988 | Hill | 446/61 |
| 4,856,374 A | 8/1989 | Kreuzer | |
| 4,869,130 A | 9/1989 | Wiecko | |
| 4,900,046 A | 2/1990 | Aranceta-Angoitia | |
| 4,909,101 A | 3/1990 | Terry | |
| 4,955,620 A * | 9/1990 | Reinke | 473/613 |
| RE33,449 E * | 11/1990 | Martin | 473/613 |
| 5,020,384 A | 6/1991 | Kraus | |
| 5,037,361 A | 8/1991 | Takahashi | |
| 5,069,655 A | 12/1991 | Schivelbusch | |
| 5,121,654 A | 6/1992 | Fasce | |
| 5,125,677 A | 6/1992 | Ogilvie et al. | |
| 5,156,412 A | 10/1992 | Meguerditchian | |
| 5,230,258 A | 7/1993 | Nakano | |
| 5,236,211 A | 8/1993 | Meguerditchian | |
| 5,236,403 A | 8/1993 | Schievelbusch | |
| 5,261,783 A * | 11/1993 | Noyes | 415/71 |
| 5,273,501 A | 12/1993 | Scheivelbusch | |
| 5,318,486 A | 6/1994 | Lutz | |
| 5,330,396 A | 7/1994 | Lohr et al. | |
| 5,379,661 A | 1/1995 | Nakano | |
| 5,383,677 A | 1/1995 | Thomas | |
| 5,451,070 A | 9/1995 | Lindsay et al. | |
| 5,460,368 A * | 10/1995 | Pearson | 473/597 |
| 5,508,574 A | 4/1996 | Vlock | |
| 5,601,301 A | 2/1997 | Liu | |
| 5,645,507 A | 7/1997 | Hathaway | |
| 5,651,750 A | 7/1997 | Imanishi et al. | |
| 5,669,758 A | 9/1997 | Williamson | |
| 5,676,611 A * | 10/1997 | Foster et al. | 473/613 |
| 5,690,346 A | 11/1997 | Keskitalo | |
| 5,746,676 A | 5/1998 | Kawase et al. | |
| 5,816,880 A * | 10/1998 | Forti et al. | 446/61 |
| 5,899,827 A | 5/1999 | Nakano et al. | |
| 5,967,933 A | 10/1999 | Valdenaire | |
| 5,984,826 A | 11/1999 | Nakano | |
| 6,000,707 A | 12/1999 | Miller | |
| 6,045,481 A | 4/2000 | Kumagai | |
| 6,048,245 A * | 4/2000 | Forti et al. | 446/61 |
| 6,053,841 A | 4/2000 | Kolde et al. | |
| 6,066,067 A | 5/2000 | Greenwood | |
| 6,071,210 A | 6/2000 | Kato | |
| 6,095,940 A | 8/2000 | Ai et al. | |
| 6,119,539 A | 9/2000 | Papanicolaou | |
| 6,159,126 A | 12/2000 | Oshidan | |
| 6,186,922 B1 | 2/2001 | Bursal et al. | |
| 6,201,315 B1 | 3/2001 | Larsson | |
| 6,241,636 B1 | 6/2001 | Miller | |
| 6,322,475 B2 | 11/2001 | Miller | |
| 6,325,386 B1 | 12/2001 | Shoge | |
| 6,390,946 B1 | 5/2002 | Hibi et al. | |
| 6,406,399 B1 | 6/2002 | Ai | |
| 6,419,608 B1 | 7/2002 | Miller | |
| 6,461,268 B1 | 10/2002 | Milner | |
| 6,499,373 B2 | 12/2002 | Van Cor | |
| 6,551,210 B2 | 4/2003 | Miller | |
| 6,575,047 B2 | 6/2003 | Reik et al. | |
| 6,676,559 B2 | 1/2004 | Miller | |
| 6,679,109 B2 | 1/2004 | Gierling et al. | |
| 6,689,012 B2 | 2/2004 | Miller | |
| 6,805,654 B2 | 10/2004 | Nishii | |
| 6,931,316 B2 | 8/2005 | Joe et al. | |
| 6,945,903 B2 | 9/2005 | Miller | |
| 6,949,049 B2 | 9/2005 | Miller | |
| 6,991,579 B2 | 1/2006 | Kobayashi et al. | |
| 7,011,600 B2 | 3/2006 | Miller et al. | |
| 7,014,591 B2 | 3/2006 | Miller | |
| 7,036,620 B2 | 5/2006 | Miller et al. | |
| 7,063,640 B2 | 6/2006 | Miller | |
| 7,074,007 B2 | 7/2006 | Miller | |
| 7,074,154 B2 | 7/2006 | Miller | |
| 7,074,155 B2 | 7/2006 | Miller | |
| 7,112,158 B2 | 9/2006 | Miller | |
| 7,112,159 B2 | 9/2006 | Miller et al. | |
| 7,125,297 B2 | 10/2006 | Miller et al. | |
| 7,131,930 B2 | 11/2006 | Miller et al. | |
| 7,163,485 B2 | 1/2007 | Miller | |
| 2004/0224808 A1 | 11/2004 | Miller et al. | |
| 2005/0073127 A1 | 4/2005 | Miller | |
| 2005/0079944 A1 | 4/2005 | Miller | |
| 2005/0079948 A1 | 4/2005 | Miller et al. | |
| 2005/0085326 A1 | 4/2005 | Miller | |
| 2005/0085327 A1 | 4/2005 | Miller | |
| 2005/0085334 A1 | 4/2005 | Miller et al. | |
| 2005/0085336 A1 | 4/2005 | Miller et al. | |
| 2005/0085337 A1 | 4/2005 | Miller et al. | |

| | | | |
|---|---|---|---|
| 2005/0085338 A1 | 4/2005 | Miller et al. | |
| 2005/0096176 A1 | 5/2005 | Miller | |
| 2005/0096179 A1 | 5/2005 | Miller | |
| 2005/0113202 A1 | 5/2005 | Miller et al. | |
| 2005/0113210 A1 | 5/2005 | Miller | |
| 2005/0117983 A1 | 6/2005 | Miller et al. | |
| 2005/0119086 A1 | 6/2005 | Miller et al. | |
| 2005/0119087 A1 | 6/2005 | Miller et al. | |
| 2005/0119090 A1 | 6/2005 | Miller et al. | |
| 2005/0119092 A1 | 6/2005 | Miller et al. | |
| 2005/0119093 A1 | 6/2005 | Miller et al. | |
| 2005/0119094 A1 | 6/2005 | Miller et al. | |
| 2005/0124453 A1 | 6/2005 | Miller | |
| 2005/0124456 A1 | 6/2005 | Miller et al. | |
| 2005/0130784 A1 | 6/2005 | Miller et al. | |
| 2005/0137046 A1 | 6/2005 | Miller et al. | |
| 2005/0137051 A1 | 6/2005 | Miller et al. | |
| 2005/0137052 A1 | 6/2005 | Miller et al. | |
| 2005/0148422 A1 | 7/2005 | Miller et al. | |
| 2005/0148423 A1 | 7/2005 | Miller et al. | |
| 2005/0153808 A1 | 7/2005 | Miller et al. | |
| 2005/0153809 A1 | 7/2005 | Miller et al. | |
| 2005/0153810 A1 | 7/2005 | Miller et al. | |
| 2005/0159265 A1 | 7/2005 | Miller et al. | |
| 2005/0159266 A1 | 7/2005 | Miller et al. | |
| 2005/0159267 A1 | 7/2005 | Miller et al. | |
| 2005/0164819 A1 | 7/2005 | Miller et al. | |
| 2005/0176544 A1 | 8/2005 | Miller et al. | |
| 2005/0176545 A1 | 8/2005 | Miller et al. | |
| 2005/0178893 A1 | 8/2005 | Miller et al. | |
| 2005/0197231 A1 | 9/2005 | Miller et al. | |
| 2005/0209041 A1 | 9/2005 | Miller | |
| 2006/0084549 A1 | 4/2006 | Smithson et al. | |
| 2007/0049450 A1 | 3/2007 | Miller | |
| 2007/0142161 A1 | 6/2007 | Miller | |
| 2007/0155567 A1 | 7/2007 | Miller et al. | |
| 2007/0155580 A1 | 7/2007 | Nichols et al. | |

FOREIGN PATENT DOCUMENTS

| | | |
|---|---|---|
| CN | 1157379 A | 8/1997 |
| DE | 498 701 | 5/1930 |
| DE | 2 310880 | 9/1974 |
| DE | 2 136 243 | 1/1975 |
| DE | 263566 | 1/1989 |
| DE | 39 40 919 A1 | 6/1991 |
| EP | 0 432 742 | 12/1990 |
| EP | 635639 A1 | 1/1995 |
| EP | 1136724 | 9/2001 |
| GB | 14132 | 5/1910 |
| GB | 592320 | 9/1947 |
| GB | 906 002 A | 9/1962 |
| GB | 1 376 057 | 12/1974 |
| GB | 2 035 482 | 6/1980 |
| GB | 2 080 452 | 8/1982 |
| JP | 42-2844 | 2/1967 |
| JP | 48-54371 | 7/1973 |
| JP | 51-150380 | 12/1976 |
| JP | 47-20535 | 8/1977 |
| JP | 53 048166 | 1/1978 |
| JP | 55-135259 | 4/1979 |
| JP | 59069565 | 4/1984 |
| JP | 02157483 | 6/1990 |
| JP | 52-35481 | 9/1993 |
| JP | 411063130 | 3/1999 |
| JP | 2004162652 A | 6/2004 |
| JP | 8-247245 | 9/2004 |
| NE | 98467 | 7/1961 |
| WO | WO 2006/014617 | 2/2006 |

OTHER PUBLICATIONS

International Search Report dated Jun. 12, 2008 for International application No. PCT/US07/11100.

International Search Report for International application No. PCT/US2006/032489 dated Jun. 6, 2007.

* cited by examiner

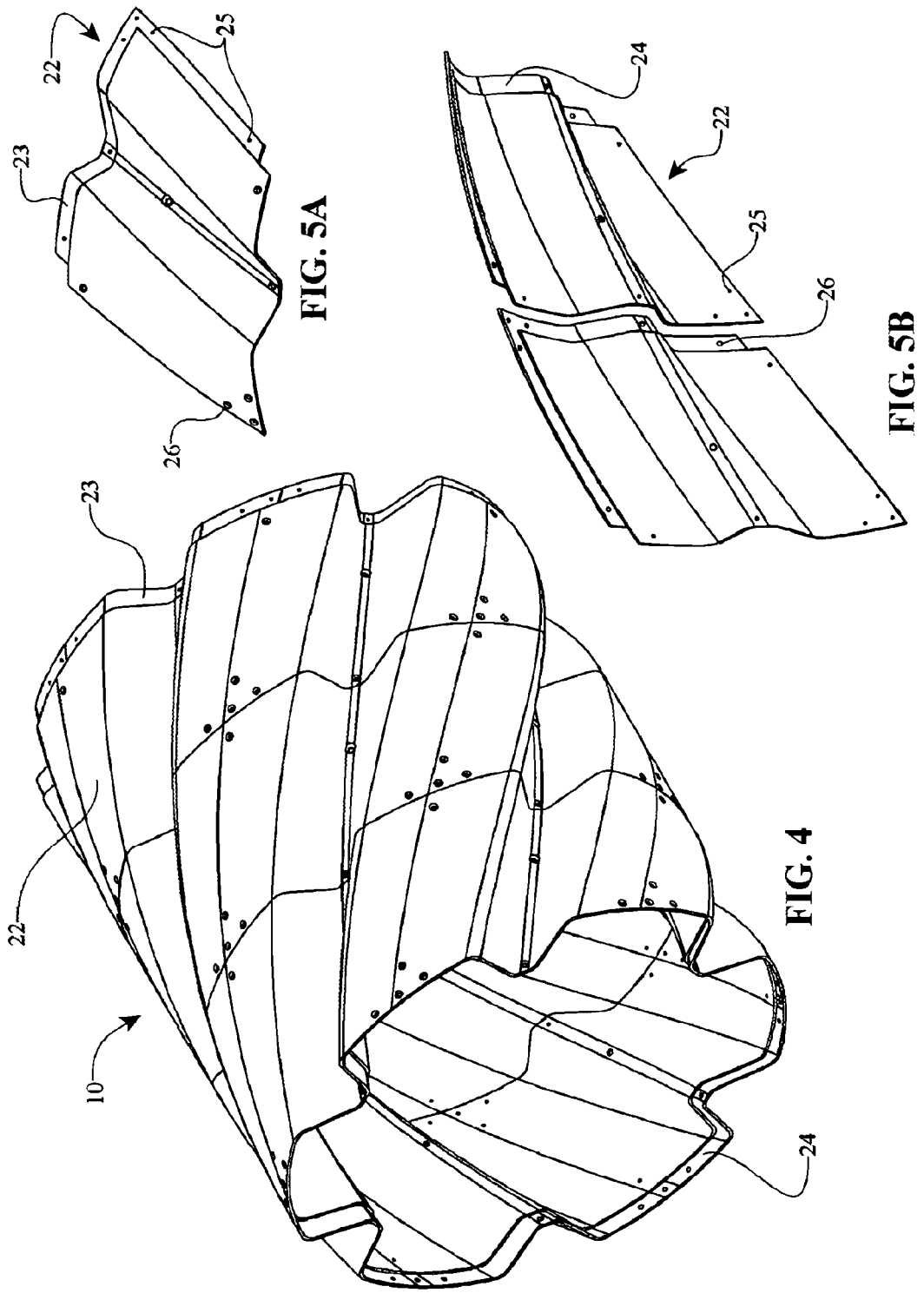

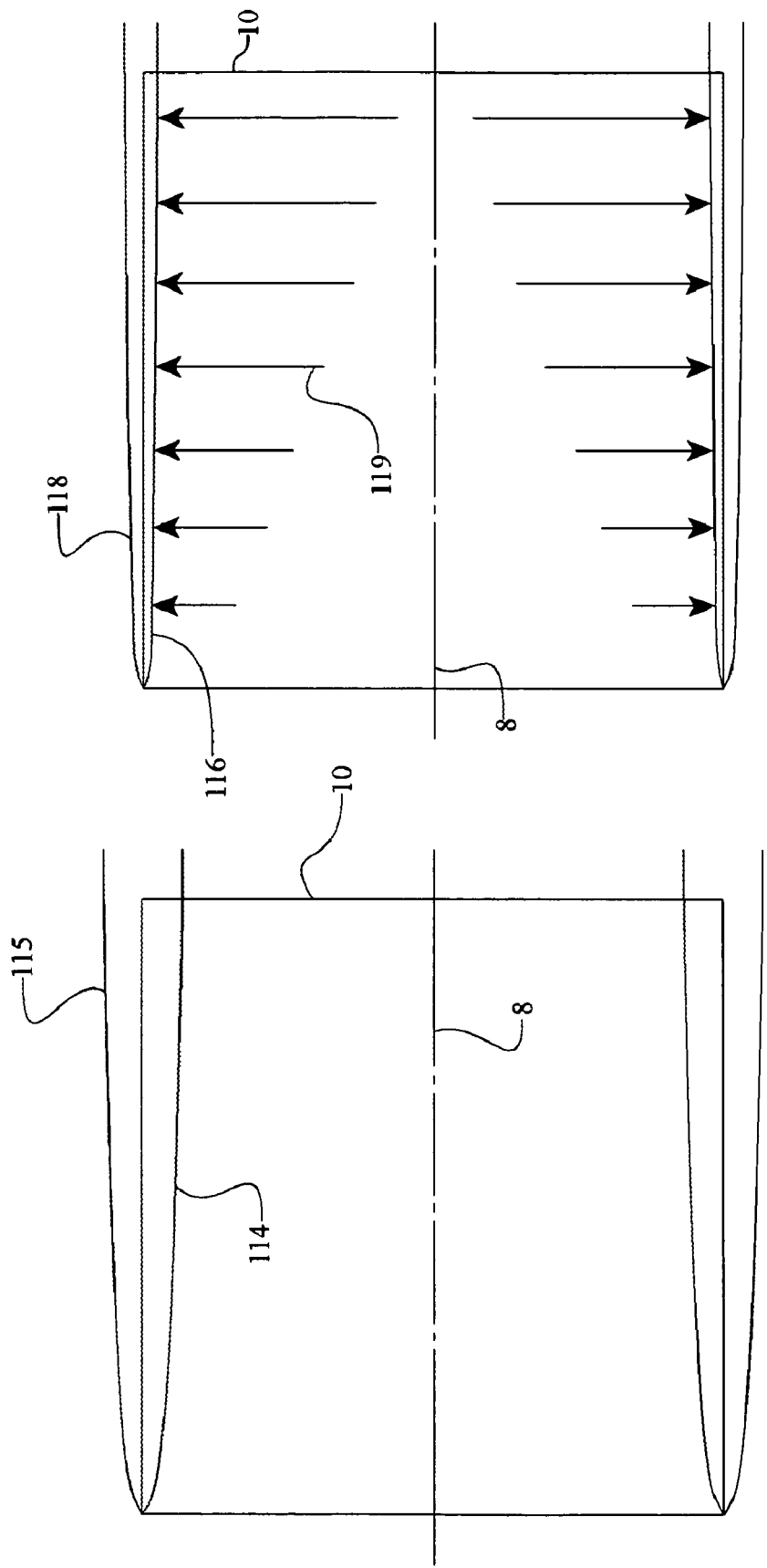

FLUID ENERGY CONVERTER

RELATED APPLICATIONS

This application claims the benefit of U.S. Provisional Application No. 60/710,225, filed Aug. 22, 2005, U.S. Provisional Application No. 60/710,339, filed Aug. 22, 2005, and U.S. Provisional Application No. 60/760,251, filed Jan. 19, 2006. Each of the above-identified applications is hereby incorporated by reference in its entirety.

BACKGROUND OF THE INVENTION

1. Field of the Invention

The field of the invention relates generally to fluid energy converters, and more particularly the invention relates to windmills and wind turbines.

2. Description of the Related Art

Fluid energy converters typically use blades, propellers, or impellers to convert kinetic energy of a moving fluid into mechanical energy, or to convert mechanical energy into kinetic energy of a moving fluid stream. For example, windmills and waterwheels convert kinetic energy from the wind or water into rotating mechanical energy, and wind turbines and water turbines further employ a generator to convert the rotating mechanical energy into electrical energy. In the reverse process, fans, propellers, compressors, and pumps can be configured to impart kinetic energy, from rotating mechanical energy, to a fluid.

Energy conversion, from kinetic to mechanical, for gases can be inefficient, especially with windmills and wind turbines. It is generally accepted that the highest efficiency possible for devices converting kinetic energy from the wind is about 59.3%. However, this number neglects losses which occur from drag and turbulence, for example. Some utility class three blade wind turbines can achieve peak efficiencies from 40-50%, while windmills are significantly lower. Therefore, there exists a need for a more efficient fluid energy converter for wind applications.

While some fluid energy converters for use with liquid fluids can achieve high efficiencies, these machines are expensive. For example, although Francis water turbines can achieve efficiencies of over 90%, they are extremely expensive. Applications exist where cost is a more important factor than efficiency maximization, and thus there exists a need for a lower cost fluid energy converter for liquid flows that still maintains a desirable efficiency.

SUMMARY OF THE INVENTION

The systems and methods illustrated and described herein have several features, no single one of which is solely responsible for its desirable attributes. Without limiting the scope as expressed by the description that follows, its more prominent features will now be discussed briefly. After considering this discussion, and particularly after reading the section entitled "Detailed Description of the Preferred Embodiments" one will understand how the features of the system and methods provide several advantages over traditional systems and methods.

In one aspect, the invention relates to a tube for a fluid energy converter. The tube can have a generally cylindrical and hollow body that has an interior surface, an exterior surface, and a longitudinal axis. The tube can be provided with a plurality of helical grooves for capturing kinetic energy of a fluid stream as the fluid stream rotates the tube about the longitudinal axis.

In another aspect, the invention concerns a fluid energy converter having a longitudinal axis and a rotatable tube coaxial about the longitudinal axis. The rotatable tube can have helical grooves formed into both its exterior surface and interior surface for converting rotating mechanical energy into kinetic energy in a fluid.

In yet another aspect, the invention relates to a tube for a fluid energy converter. The tube can include a generally cylindrical and hollow body having an interior surface, an exterior surface, and a longitudinal axis. The tube can also be provided with a plurality of helical grooves formed into the exterior surface and the interior surface. The helical grooves are adapted to capture fluid on a first side of a helical groove on the exterior surface, and the helical grooves are adapted to capture fluid on a second side of the helical groove on the interior surface. In one embodiment, the invention concerns a rotor for a fluid energy converter. The rotor has a longitudinal axis and a rotatable tube coaxial about the longitudinal axis. The tube can include an interior surface and an exterior surface. A plurality of helical grooves can be formed in the exterior surface and the interior surface, each helical groove having at least two helical groove walls that are substantially opposite each other. The helical groove walls on the exterior surface form an angle between 0-100 degrees, and the helical grooves are configured to convert rotating mechanical energy into kinetic energy in a fluid, or convert kinetic energy in a fluid into rotating mechanical energy.

In another embodiment, the invention concerns a fluid energy converter having a longitudinal axis and a rotatable tube coaxial about the longitudinal axis. The rotatable tube has a plurality of helical grooves formed into an exterior surface and an interior surface of the rotatable tube. The energy converter can additionally include a set of front blades distributed radially around the longitudinal axis, the set of front blades coupled to the rotatable tube. A set of back blades, distributed radially around the longitudinal axis, can be coupled to the rotatable tube. The fluid energy converter can also include a shaft coincident with the longitudinal axis and operationally coupled to the rotatable tube. In some configurations, the rotatable tube converts kinetic energy in a fluid into rotating mechanical energy, or converts rotating mechanical energy into kinetic energy in a fluid.

Another embodiment includes a rotor for a windmill. The rotor may include a generally cylindrical and hollow tube having an interior surface and an exterior surface and a plurality of walls along a perimeter of the tube, the walls forming a plurality of helical vanes configured to receive kinetic energy from a wind.

Another embodiment includes a tube section for a rotor. The tube section may include an arcuate, substantially rectangular, panel, a first tube section edge protruding from the edge of the panel, and a tube section cut formed in the panel. The tube section cut may be configured to receive a second tube section edge.

Another embodiment includes a method of operating a windmill. The method may include providing a tubular rotor, mounting the rotor such that a longitudinal axis of the rotor is substantially parallel to a fluid stream, and pitching and/or yawing the rotor between 1 and 30 degrees of pitch and/or yaw relative to the flow direction of the fluid stream.

These and other improvements will become apparent to those skilled in the art as they read the following detailed description and view the enclosed figures.

BRIEF DESCRIPTION OF THE DRAWINGS

FIG. 4 is a perspective view of a tube that can be used with the fluid energy converter of FIG. 1.

FIG. 5A is a perspective view of one section of the tube of FIG. 4.

FIG. 5B is a perspective view of two sections of the tube of FIG. 4.

FIG. 17A is a schematic of typical boundary layers across a typical tube.

FIG. 17b is a schematic view of boundary layers that form on the surfaces of a tube used with the fluid energy converter of FIG. 1.

DETAILED DESCRIPTION OF CERTAIN INVENTIVE EMBODIMENTS

Figure 1:
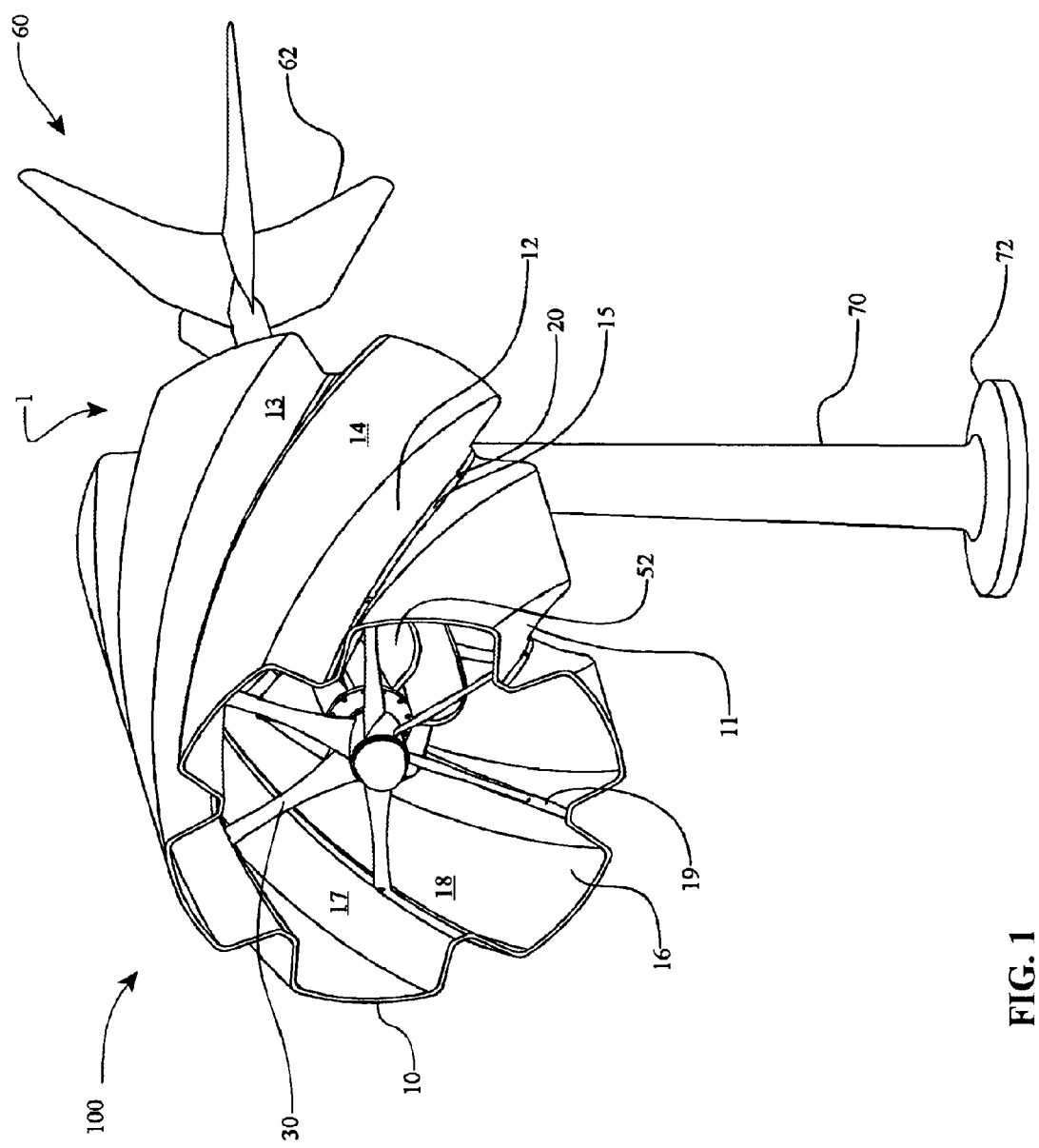
FIG. 1 is a perspective view of a fluid energy converter.

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

In a first aspect, a fluid turbine can have a ducted rotor and a stand or tower. The ducted rotor includes a longitudinal axis, a rotatable tube concentric with the longitudinal axis, a rotatable set of front blades concentric with the longitudinal axis, a nacelle concentric with the longitudinal axis, a set of rotatable back blades concentric with the longitudinal axis, and a shaft concentric with the longitudinal axis. In one embodiment, the tube incorporates multiple helical grooves which begin at the front edge of the tube and continue to the back edge of the tube, forming indentations on the outside diameter of the tube surface and protrusions on the inside diameter of the tube surface.

The front and back blades rigidly attach to and rotate with the tube. In some embodiments, the front and back blades rotate over the shaft, and bearings are incorporated between the shaft and the blades to minimize friction. The nacelle can be rigidly attached to the shaft and can have multiple helical vanes on its outer surface. The shaft can be a rigid rod or hollow tube and attaches to the tower supporting the ducted rotor. In one embodiment, the nacelle houses a drivetrain, which can include a speed increaser and a generator to produce electricity. In some embodiments, a tail is positioned behind and attached to the ducted rotor, which tail is directed by the fluid stream to point the ducted rotor into the fluid stream. The tail can have both vertical plane and horizontal plane components, which serve to position the ducted rotor both in pitch and yaw.

In some embodiments, areas of high and low pressure are created when a compressible fluid passes through the ducted rotor. The fluid inside of the tube rotates in the same direction as the ducted rotor and is, thereby, projected radially away from the longitudinal axis and compressed against the inside walls of the tube, creating an area of high pressure relative to the surrounding fluid pressure. An area of low pressure forms near and around the longitudinal axis, and consequently, draws the fluid into the tube. In this manner, the area of low pressure accelerates the fluid across and through the tube. Additionally, fluid tangent to the fluid entering the ducted rotor is directed against the outside surface of the tube, thereby creating an area of high pressure on both the inside and outside surfaces of the tube.

In some conditions the ducted rotor can be pitched (that is, oriented up or down in a vertical plane) and/or yawed (that is, rotated from side to side on a horizontal plane) to take advantage of beneficial effects which increase power production. The nacelle can incorporate helical vanes which direct the fluid to rotate in the same direction as the rotation of the ducted rotor, creating a vortex and increasing power production. In another aspect, the nacelle is adapted to rotate in the opposite direction of the ducted rotor to create a large speed differential at the generator, thus increasing power production. In still another aspect, the tube is flared at the front opening, or bell mouthed, to maximize the amount of fluid entering the tube.

In another aspect, the drivetrain of the ducted rotor incorporates a continuously variable transmission (CVT) to maintain a substantially constant speed into the generator as the velocity of the fluid, such as air or water, varies. The CVT is positioned between the speed increaser and the generator and can provide the additional benefit of cushioning the generator from torque spikes due to sudden increases in fluid flow, such as wind gusts. The input of the CVT is connected to the output of the speed increaser and the output of the CVT is attached to the input of the generator. In some embodiments, the speed increaser can be of the type described in Patent Cooperation Treaty patent application publication WO 2006/014617.

In some embodiments where a CVT is incorporated into the drivetrain, the CVT and generator are integrated. This can be accomplished by using a ball type CVT, which can be CVT embodiments disclosed in U.S. Pat. Nos. 6,241,636; 6,419,608; and 6,689,012, which are all hereby incorporated herein by reference in their entireties. The stator of the generator, which is usually stationary, can be attached to the sun (or idler, or support member) of the CVT. The generator rotor can be attached to the output ring of the CVT and rotates in the opposite direction of the sun. This creates a large speed differential between the stator and the rotor, which rotate in opposite directions, and increases generator power density. Alternatively, the integral CVT/generator can eliminate one or more stages of the speed increaser. The integral CVT/generator eliminates the shaft and couplers that connect the CVT to the generator, two or more bearings, and one of the cases surrounding the CVT and generator. Also, in a permanent magnet generator, the magnets can be attached to the same steel that forms the output ring of the CVT.

In yet another aspect, if a ball type CVT is used that is also functionally a planetary gear set, the CVT can also function as a generator, eliminating the generator. In such an embodiment, the balls (or power rollers) in the CVT can be made from magnetic material, such as hard ferrite ceramic or neodymium boron iron. As the input ring of the CVT rotates the multiple balls, the magnetic poles of the balls pass by copper, aluminum, or silver wires attached to the structure holding the balls in place, and electricity is produced. Additionally, a large speed increase is achieved due to the smaller diameter balls being rotated by the larger input ring. This speed increase can eliminate one or more stages of the speed increaser.

In some embodiments, the fluid energy converter is configured so that the front blades extract only a small amount of energy from the fluid entering the ducted rotor. In this manner, the swirl behind the front blades is minimized, which rotates in a direction opposite the ducted rotor. The nacelle can be adapted to redirect the fluid in a beneficial direction, and the back blades extract a larger portion of energy from the fluid, which also straightens the fluid exiting the tube and reentering the fluid stream. This minimizes turbulence created from surrounding fluid mixing with fluid that has passed through or adjacent to the ducted rotor. In some embodiments, the nacelle is moved forward toward the front of the ducted rotor, to minimize the time the swirl rotates in a power reducing direction. In still other embodiments, the nacelle and drivetrain are moved toward the back of the ducted rotor to minimize the cantilever load on the shaft.

In yet another aspect, the shaft supporting the ducted rotor can be attached at both ends rather than only at the back of the ducted rotor. The ducted rotor can be positioned above and substantially over the stand from which it is supported, and a U-shaped arm provides support to both the front and back of the shaft. The ducted rotor can be yawed and in some embodiments pitched to maximize power production.

In still another aspect, the tail can be offset from the longitudinal axis to set the optimal pitch and yaw relative to the fluid stream. Thus, the tail axis need not be parallel with the longitudinal axis. In some embodiments, changing fluid velocity increases or decreases pressure on the tail, causing changes in pitch and yaw with varying fluid speeds.

In another embodiment, the nacelle is positioned behind the ducted rotor to maximize fluid flow through the tube. The shaft extends behind the stand and the nacelle is mounted over the shaft. The helical vanes of the nacelle can be eliminated and the nacelle can be positioned to counterbalance the weight of the ducted rotor, which minimizes or eliminates the cantilever load on the shaft.

Figure 2:
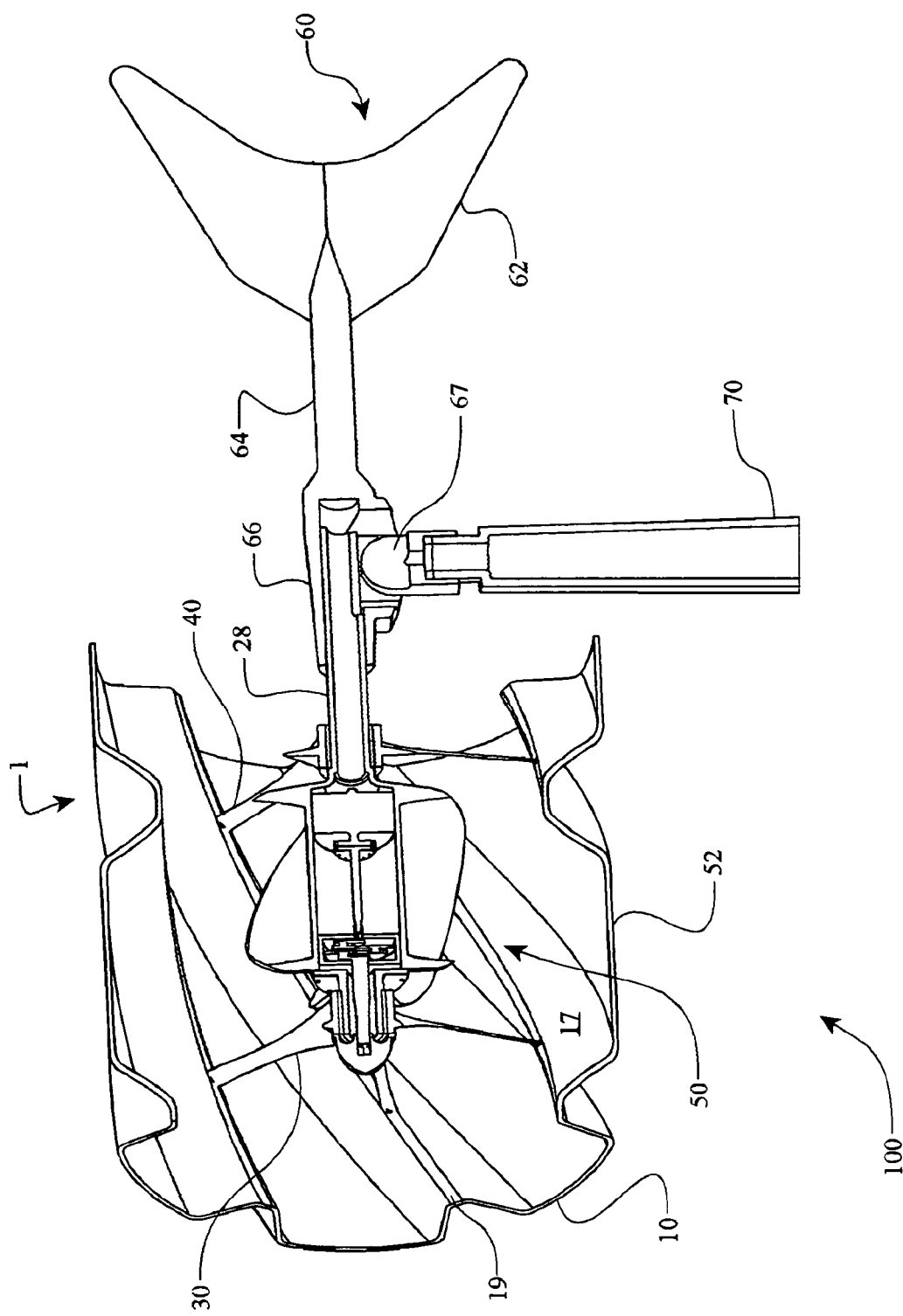
FIG. 2 is a partial section view of the fluid energy converter of FIG. 1.
Figure 3:
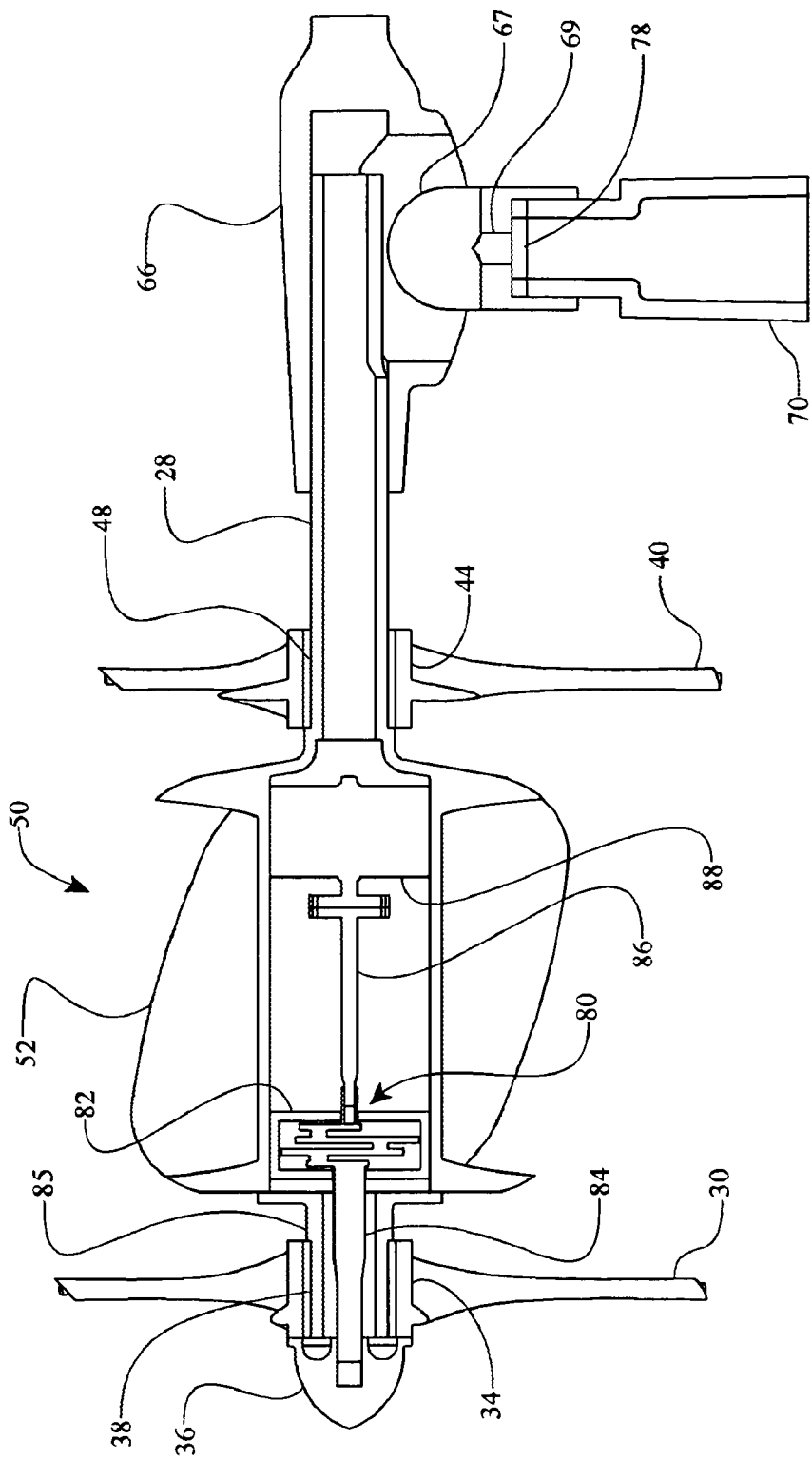
FIG. 3 is another partial section view of the fluid energy converter of FIG. 1.

Referring now to FIGS. 1, 2, and 3, one embodiment of a fluid energy converter 100 is shown. The fluid energy converter 100 includes a rotor 1, a power train 80, a tail 60, and a tower 70. In one embodiment, the rotor 1 can have a tube 10, a front set of blades 30, a back set of blades 40, a nacelle 50, and a shaft 28. In some embodiments, the tube 10 can be generally cylindrically with helical grooves 11 running the length of the tube 10. Depending on the size and the desired strength to weight ratio, the tube 10 can be produced from materials such as sheet metal, composites, including carbon fiber or fiberglass and polyester resin, plastic, or any other suitable material.

In some embodiments, the length to diameter ratio of the tube 10 is about 1:1, although this ratio can vary according to the application, and can range from about 1:10 to about 10:1. In embodiments where the fluid energy converter 100 produces energy, the helical grooves 11 are preferably configured to capture kinetic energy of a moving fluid, such as air or water, and convert the captured kinetic energy into rotating mechanical energy. In embodiments where the fluid energy converter 100 moves a fluid, such as in a compressor or pump, the grooves 11 are preferably adapted to direct the fluid in a desired direction. In some embodiments, the grooves 11 can be configured to compress, and/or accelerate the movement of, the fluid. As used here, when referring to the interaction between a fluid or fluid stream and the helical grooves 11 (or the tube 10), the term "capture" refers to a resistance provided by the helical grooves 11 or tube 10 that, among other things, increases the volume of fluid entering the tube 10 and/or increases the transfer of kinetic energy from the fluid to the tube 10.

Still referring to FIGS. 1, 2, and 3, the grooves 11 formed into the surface of the tube 10 are adapted to capture or direct fluid both on the exterior and interior surfaces of the tube 10. Each exterior groove 12 has two exterior walls 13, and depending on whether the helical grooves 11 are right hand or left hand, one of the exterior walls 13 performs more energy capture or fluid movement than the other exterior wall 13. Similarly, each interior groove 16 has two interior walls 17, and depending on whether the helical grooves 11 are right hand or left hand, one of the interior walls 17 performs more energy capture or fluid movement than the other interior wall 17. In some embodiments there are six helical grooves 11 formed into a tube 10, while in other embodiments 1, 2, 3 4, 5, 6, 7, 8 9, 12, 18, 24, 27, 30, 36, or more helical grooves are formed into the tube 10. In some embodiments the pitch of the helical grooves 11 is about four times the length of the tube 10, but depending on the diameter and desired rotational speed of the tube 10, the pitch can be less than the length of the tube in some high speed applications, and can be more than 30 times the length of the tube 10 in low speed applications.

Still referring to FIGS. 1, 2, and 3, in some embodiments the depth of each helical groove 11 is about 13% of the diameter of the tube 10. In other applications, the depth of the helical grooves 11 may be a smaller or larger percentage of the diameter of the tube 10. Deeper grooves 11 produce more stress on the tube 10, but also capture or direct more fluid. Depending on the rotational speed, diameter, and length of the tube 10, as well as the fluid, the depth of the helical grooves 11 can vary from about 1-40% of the diameter of the tube 10.

Still referring to FIGS. 1, 2, and 3, in some embodiments the angle between two exterior walls 13 forming each helical groove 11 is about 30 degrees. If this angle is decreased, the tube 10 will have a larger exterior tip surface area 14, and the helical grooves 11 will more effectively capture or direct fluid, but more stress will be produced at the surfaces of the tube 10. Depending on the application, the angle between two opposing exterior walls 13 can range from about 0-70 degrees. In some embodiments, the ratio of exterior tip surface area 14 to helical groove 11 areas is about 1.25:1. In other embodiments, the exterior tip surface area 14 comprises about 10-90% of the exterior surface area of the tube 10.

Still referring to FIGS. 1, 2, and 3, in some embodiments a radius is formed into the surface of the helical grooves 11 where the exterior walls 13 transition into the exterior tip surface 14 and the exterior root surface 15, to relieve the stress risers that occur at these corners. In some embodiments, the radius at these corners is 2% of the diameter of the tube 10. Increasing this radius decreases the stress on the tube 10 but also decreases the size of the fluid capturing or directing capability of the exterior walls 13 and the interior walls 17. Depending on the application, the radii at these corners can vary from 0% to more than 10% of the diameter of the tube 10. It should be noted that the radii at the exterior tip surfaces 14, can be different from the radii at the exterior root surfaces 15.

Still referring to FIGS. 1, 2, and 3, the front blades 30 and the back blades 40 are described. In some embodiments, the number of blades 30 and the number of blades 40 each equals the number of helical grooves 11, although more or fewer front blades 30 and back blades 40 can be used. In some embodiments, the front blades 30 and back blades 40 are attached to the interior root surface 19. The blades 30, 40 can be attached to the tube 10 with fasteners which are inserted through fastening holes 20 located in the exterior root surface 15. The fastening holes 20 in some embodiments are countersunk so that flat head screws will lie flush with the exterior root surface 15. The blades 30, 40 in some embodiments have blind tapped holes formed into their tips and which extend radially toward the front hub 34 and back hub 44, respectively. In other embodiments, the blades 30, 40 are fastened to the interior root surface 19 by welding or with adhesive. In still other embodiments, either or both of the blades 30, 40 are formed integrally with the tube 10. In some embodiments, the blades 30, 40 are attached to the interior tip surface 18 using the above described methods to maximize the length of each blade 30, 40. The increased length of the blades 30, 40 increases their ability to produce power. In other embodiments, the front blades 30 attach to the interior root surface 19 while the back blades 40 attach to the interior tip surface 18. In still other embodiments, the front blades 30 attach to the interior tip surface 18 while the back blades 40 attach to the interior root surface 19. In still other embodiments, the blades 30, 40 attach to the interior wall 17 that does not capture power or direct fluid, while in other applications the blades 30, 40 attach to the interior wall 17 that extracts power or directs fluid. In embodiments where the number of front blades 30 or back blades 40 exceeds the number of helical grooves 11, alternating front blades 30 and/or back blades 40 can be attached to the interior tip surface 18 and the interior root surface 19 or the interior wall 17.

Still referring to FIGS. 1, 2, and 3, in some embodiments the blades 30, 40 are made from material that has a high strength to weight ratio, such as carbon fiber or fiberglass and polyester or epoxy resin. In some applications, such as a slow rotating application, the blades 30, 40 can be made from sheet metal and welded together. A simple curved airfoil, hydrofoil, or other fluid foil can be formed onto the sheet metal front blades 30 and the back blades 40, which is sufficient for many low speed applications. In other embodiments, the blades 30, 40 can be molded from plastic or other moldable material.

Still referring to FIGS. 1, 2, and 3, the airfoils, hydrofoils, or other fluid foils on the blades 30, 40 will vary depending upon the application. For many wind turbines, SG6040, NACA 4412 or NACA 4415 are acceptable airfoils although many different designs can be used. SD2030 is a good choice for small wind turbines. It should be noted that different airfoils can be used on the same blades. For example, the front blades 30 can use SG6040 near the blade tips and SD2030 near the front hub 34. NACA 4412 or another airfoil can be used near the middle of the front blades 32, between the hub and tip. The back blades 40 can use an entirely different airfoil or set of airfoils depending upon the application. For example, in some embodiments the front blades 30 extract little to no power and are configured to move the wind from the center to the perimeter of the tube 10, while the back blades 40 extract considerable power and also straighten the fluid as the fluid exits the tube 10. In wind turbines and water turbines the back blades 40 can use a higher lift airfoil than the front blades 30. The different functions that the front blades 30 and the back blades 40 perform may call for different configurations of the fluid foils.

Still referring to FIGS. 1, 2, and 3, the pitch, chord twist, chord length, and taper of the blades 30, 40 are discussed. In some embodiments, the pitch at the tip of the front blades 30 is 30 degrees and the pitch of the back blades 40 is 20 degrees. In some embodiments, the blades 30, 40 have a chord twist of 20 degrees from the tip of the blade 30, 40 to the hub 34, 44, respectively. For maximum aerodynamic or hydrodynamic efficiency the optimal chord twist will vary with revolutions per minute (rpm), diameter of the tube 10, fluid, fluid velocity, and whether the fluid energy converter 100 is driven by fluid energy or moves fluid. The chord twist can be linear; however, small increases in power with wind turbines and water turbines can often be obtained if the chord twist is non-linear and the rate of twist increases toward the hub, or root, of the blades 30, 40.

In applications with high angular velocities, the pitch of the blades 30, 40 will generally be less, approaching zero degrees, and in some cases can be negative. For example, in a wind turbine with a high angular velocity, the pitch of the front blades 30 can be zero degrees and the pitch of the back blades 40 can be negative 10 degrees. In embodiments with low angular velocities and/or different fluids, the pitch of the blades 30, 40 can be greater than 60 degrees. In some embodiments, the pitch of the blades 30, 40 is equal, while in other applications the pitch of the back blades 40 is greater than the pitch of the front blades 30.

In some embodiments, the chord length of the blades 30, 40 is about 9% of the diameter of the tube 10. The optimal chord length will vary with changes in the Reynold's number, diameter of the tube 10, velocity of the fluid, type of fluid, angular velocity, and whether the fluid energy converter 100 converts kinetic energy to rotational energy or moves a fluid. In some embodiments, the chord length will be shorter on the back blades 40 than the front blades 30 while in other embodiments the chord length will be longer on the back blades 40 than the front blades 30. In some embodiments, to reduce manufacturing costs for example, the front blades 30 and the back blades 40 are identical. In some embodiments, the chord length of the blades 30, 40 decreases in length, or tapers 10 degrees, from the front and back hubs 34, 44 to the tips of the blades 30, 40. In other embodiments, the chord length is longer at the hubs 34, 44 and follows a non-linear taper toward the tips of the blades 30, 40. Generally, when a non-linear taper is used the chord length increases gradually moving from the tip toward the middle of the blades 30, 40, and increases rapidly from the middle of the blades 30, 40 to the hubs 34, 44, respectively.

In some embodiments, the fluid energy converter 100 suffers no tip loss because the tips of the blades 30, 40 are connected to and are surrounded by the tube 10, and some embodiments of the tube 10 take advantage of this phenomenon by utilizing a reverse taper where the chord length is longest at the tips of the blades 30, 40 and decreases toward the hubs 34, 44, respectively. Depending on the application, the front blades 30 and the back blades 40 do not have the same taper, and the back blades 40 can have a taper while the front blades 30 have a reverse taper. In embodiments where the blades 30, 40 taper in the same direction, the optimal angle of the tapers can be different. In still other embodiments, neither the front blades 30 nor the back blades 40 taper the chord length. This can be for manufacturing reasons, such as stresses on the blades 30, 40, rather than aerodynamic or hydrodynamic efficiency. Cost can also be a factor, because in some applications it is simpler to manufacture the blades 30, 40 without tapering the chord length.

Still referring to FIGS. 1, 2, and 3, the nacelle 50 will be described now. The nacelle 50 can be a generally cylindrical, streamlined shape with a hollow interior that houses the power train 80, including the gearbox 82, the high speed shaft 86, and the motor/generator 88. In embodiments where the fluid energy converter 100 captures power in a moving fluid, such as a wind turbine or water turbine, the gearbox 82 can be a speed increaser, which increases the rpm and decreases the torque of the tube 10 into the generator 88. If the fluid energy converter 100 is used to move, compress, or accelerate a fluid and operate as a compressor or pump, the gearbox 82 can be a speed reducer, driven by the motor 88, that reduces rpm and increases torque to the tube 10. The gearbox 82 can achieve speed increasing or speed decreasing capability by the use of multiple gears, traction rollers, variable speed changers, or any other suitable method.

In some embodiments, the nacelle 50 is a stationary component that is rigidly connected to the shaft 28 by fasteners, welding, an interference fit, or any other suitable method. The nacelle 50 can be built from any suitable materials, but generally materials with a high strength to weight ratio are preferable. Carbon fiber, fiberglass and polyester or epoxy resin, metal such as sheet aluminum, plastic and other materials can be used to construct the nacelle 50. In some embodiments, the nacelle 50 incorporates multiple helical vanes 52 to direct a fluid to flow in a desired direction. The helical vanes 52 are often made of the same material as the nacelle 50 and in some embodiments are formed integrally with the nacelle 50. For example, the nacelle 50 and the helical vanes 52 can be cast, injection molded, or rapid prototyped as one part. In other embodiments, the helical vanes 52 are attached to the nacelle 50 using standard fasteners, adhesive, or by welding.

On a first end the nacelle 50 can be rigidly attached to a front coupler 85 using standard fasteners, by welding, or with an interference fit. The front coupler 85 can be a tubular component with a flange on one end, and in some embodiments, the front coupler 85 has through holes so that fasteners can be used to attach the front coupler 85 to the nacelle 50. A front bearing 38, which in some embodiments is a needle roller bearing, is positioned over the front coupler 85 and inside the front hub 34, to allow low friction rotation of the front blades 30. At a second end, the nacelle 50 can be attached to the shaft 28, which can be a hollow cylinder that supports the structure of the rotor 1 and also serves to route power lines and other cables through its interior. The shaft 28 can be rigidly attached to the nacelle 50 with fasteners, welding, an interference fit, or any other method commonly known. A back bearing 48, which in some embodiments is a needle roller bearing, can be positioned over the shaft 28 and inside the back hub 44, to allow low friction rotation of the back blades 40.

Still referring to FIGS. 1, 2, and 3, a power flow of the fluid energy converter 100 is described. In a wind turbine, windmill, water turbine, or other application where the fluid energy converter 100 converts kinetic energy in a fluid stream to rotational energy, torque and speed produced from the fluid contacting the helical grooves 11, the front blades 30, and the back blades 40 is transferred, in some embodiments, to the nose cone 36. The nose cone 36 can be cone-shaped and rigidly attaches to the front hub 34 using standard fasteners. In one embodiment, the nose cone 36 includes a counter bore adapted to accept a low speed shaft 84. In some embodiments, the low speed shaft 84 and the counterbore of the nose cone 36 are splined to provide torque transfer between the nose cone 36 and the low speed shaft 84. In other embodiments, the nose cone 36 can have a square hole, be keyed, welded, attached with fasteners, or any other suitable method, to the low speed shaft 84. The low speed shaft 84 can be a generally cylindrical rod that engages and rotates the input of the gearbox 82, and is fastened using fasteners or another suitable method.

The gearbox 82 preferably increases speed and lowers the torque, and the output of the gearbox 82 can be attached to the high speed shaft 86, which attaches at a first end to the gearbox 82 with fasteners, splined, keyed, welded, pinned, or another method. The high speed shaft 86 can be a generally cylindrical rod that in some embodiments has a diameter that is smaller than the diameter of the low speed shaft 84 because the high speed shaft 86 transfers less torque. The high speed shaft 86 in some embodiments is flanged at a second end, and the flange has holes to allow fastening the high speed shaft 86 to the generator 88. The generator 88 can be an electromotive device commonly known which converts rotating mechanical energy into electrical energy. In some embodiments, the generator 88 is of the permanent magnet type, and the electricity the generator 88 produces is routed with electrical wires or cables from the generator 88, through the hollow shaft 28, through a radial slot of the hollow shaft 28, into the tail body 66, through a hinge aperture 69, and through a hollow tower 70, where the electricity can be used. In embodiments where the fluid energy converter 100 is a compressor or pump, power flow is reversed, and electricity rotates the motor 88, while the gearbox 82 used is a speed reducer.

Still referring to FIGS. 1, 2, and 3, in some embodiments, such as a wind turbine or windmill, the fluid energy converter 100 includes a tail 60 configured to keep the rotor 1 pointed into the wind during changes in wind direction. In some embodiments, the tail 60 has four tail vanes 62, while in other embodiments 1, 2, 3, 4, 5, or more tail vanes 62 can be used. A tail shaft 64, generally a cylindrical rod, connects the tail 60 to the tail body 66. Preferably, a material with a high strength to weight ratio is used to construct the tail 60 components; such a material can be aluminum, titanium, carbon fiber, fiberglass and polyester or epoxy resin, or plastic. In some embodiments the tail vanes 62, tail shaft 64, and tail body 66 are cast, injection molded, rapid prototyped, or machined as one part.

In some embodiments, the tail body 66 has at least two cavities, including one to accept insertion of the shaft 28. The shaft 28 can be rigidly attached to the tail body 66 by using fasteners, welding, adhesive, an interference fit, or any other suitable method. The tail body 66 also has hinge pin holes 68 (best seen in FIG. 13) which have an axis that is perpendicular to the shaft 28, and lie on a plane parallel with the surface upon which the tower base 72 rests. The hinge pin holes 68 allow insertion of hinge pins (not shown) which are pressed into the tail body 66 with an interference fit. A second cavity in the tail body 66 accepts insertion of a hinge 67, which can be an interface between the tail body 66 and the tower 70; the hinge 67 allows the rotor 1 to be pitched and yawed.

The hinge 67 can be a strong, durable component that in some embodiments is made from steel or aluminum. In some embodiments, where the fluid energy converter 100 is small and/or the loads are light, the hinge 67 can be made from molded plastic, such as glass filled nylon, or a composite. The hinge 67 includes a counterbore which has an axis that is perpendicular to the longitudinal axis 8 (see FIGS. 17A, 17B) and has an inside diameter slightly larger than the diameter of the tower 70 at its uppermost portion. A tower bearing 78, which in some embodiments is a needle thrust bearing, has an outside diameter that is approximately the same as the diameter of the uppermost portion of the tower 70, and is positioned inside the counter bore of the hinge 67 between the tower 70 and the hinge 67. The tower bearing 78 provides low friction yawing of the rotor 1. In one embodiment, the hinge 67 has two blind holes near its uppermost portion to allow insertion of the hinge pins 65 which are inserted through the hinge pin holes 68. The hinge pin holes 68 are preferably of a diameter slightly larger than the hinge pins 65 to allow the hinge pins 65 to rotate freely. In some embodiments, the tail 60 is not used and, instead, a commonly known yaw drive is used to control the yaw of the rotor 1 and maintain a desired orientation of the rotor 1 with respect to a fluid stream.

Referring now to FIGS. 4, 5A, and 5B, a manufacturing and assembly method of the tube 10 is disclosed. In some applications, such as wind turbines and windmills, certain components of the fluid energy converter 100 are relatively large. Construction and shipping of the tube 10 can be difficult, and in some embodiments, it is preferable to construct the tube 10 from multiple tube sections 22 that are assembled into the tube 10 on site. Generally, a tube section 22 can include a portion of a helical groove 11, although in some embodiments a tube section 22 can incorporate portions of two or more helical grooves 11.

Depending upon the size of the fluid energy converter 100, the number of tube sections 22 can vary from two to thirty-six or more. In some embodiments, a tube section 22 is a thin, arcuate, rectangular panel that includes a tube section edge 23 that protrudes from the edge of the tube section 22 and forms a corner. The tube section edge 23 is approximately one half the wall thickness of the tube section 22. The tube section edge 23 can have multiple tapped edge holes 25 into which bolts or screws (not shown) are threaded. Each tube section 22 can be provided with a tube section cut 24, which is an indentation in the tube section 22 and which can be approximately half the wall thickness of the tube section 22. The tube section cut 24 can be the same shape as the tube section edge 23 so that the tube section edge 23 can be inserted into the space created by the tube section cut 24. In one embodiment, the tube section cut 24 has multiple cut holes 26, which line up concentrically with the edge holes 24 when two tube sections 22 are assembled. In some embodiments, the cut holes 26 are countersunk so that flat head bolts or screws will lie flush with the surface of the tube 10 when they are screwed into the tapped edge holes 25.

Theoretical descriptions of various modes of power extraction by the fluid energy converter 100 follow. Actual performance of any given embodiment of the energy converter 100 and/or tube 10 is governed by a multiplicity of factors; hence, the following descriptions of operational principles are to be understood as generalized, theoretical, and/or not limiting upon the inventive embodiments of the devices and their methods of use described herein, unless otherwise specifically stated.

Figure 6:
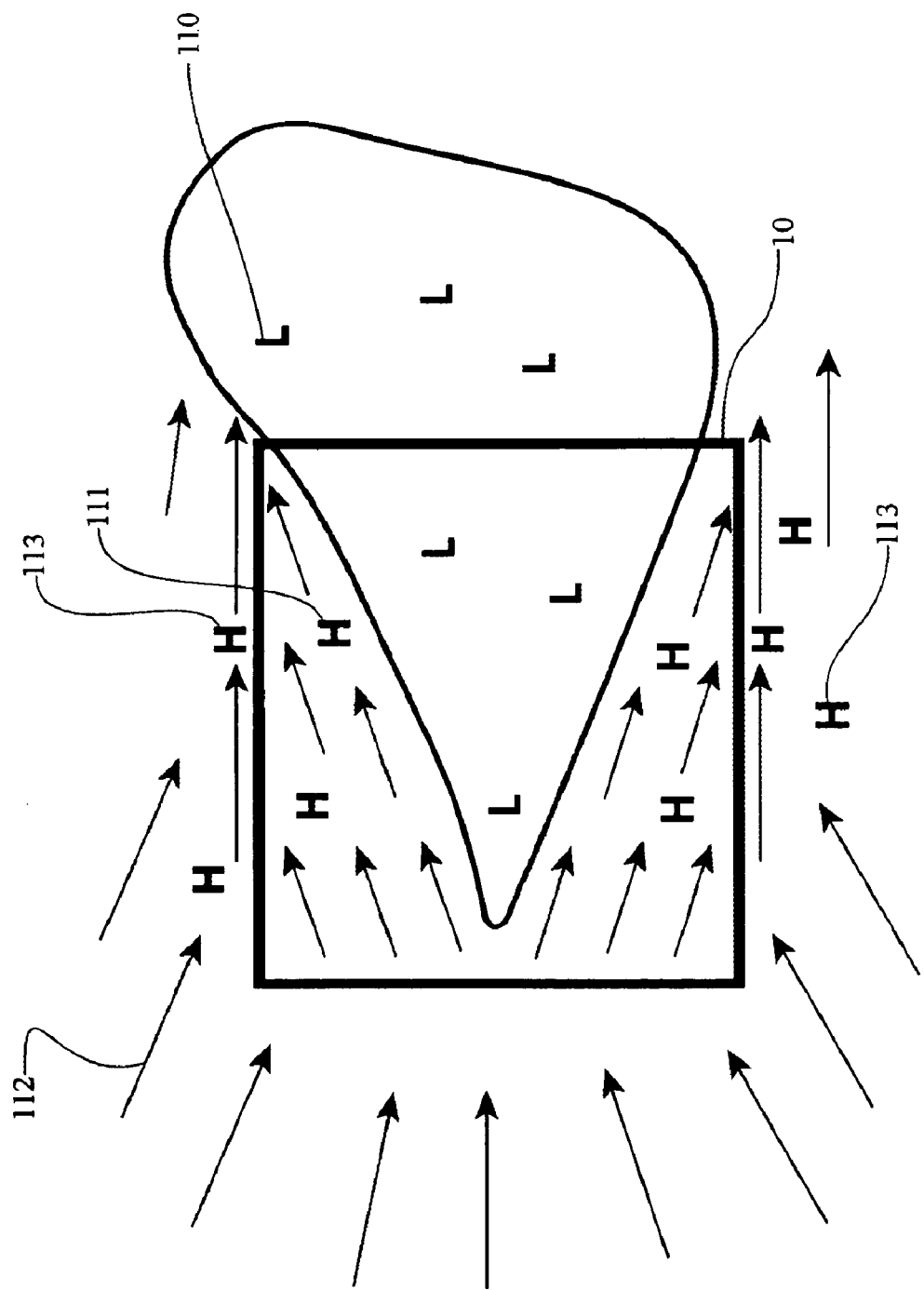
FIG. 6 is a schematic of certain fluid dynamics believed to be associated with the fluid energy converter of FIG. 1.
Figure 7:
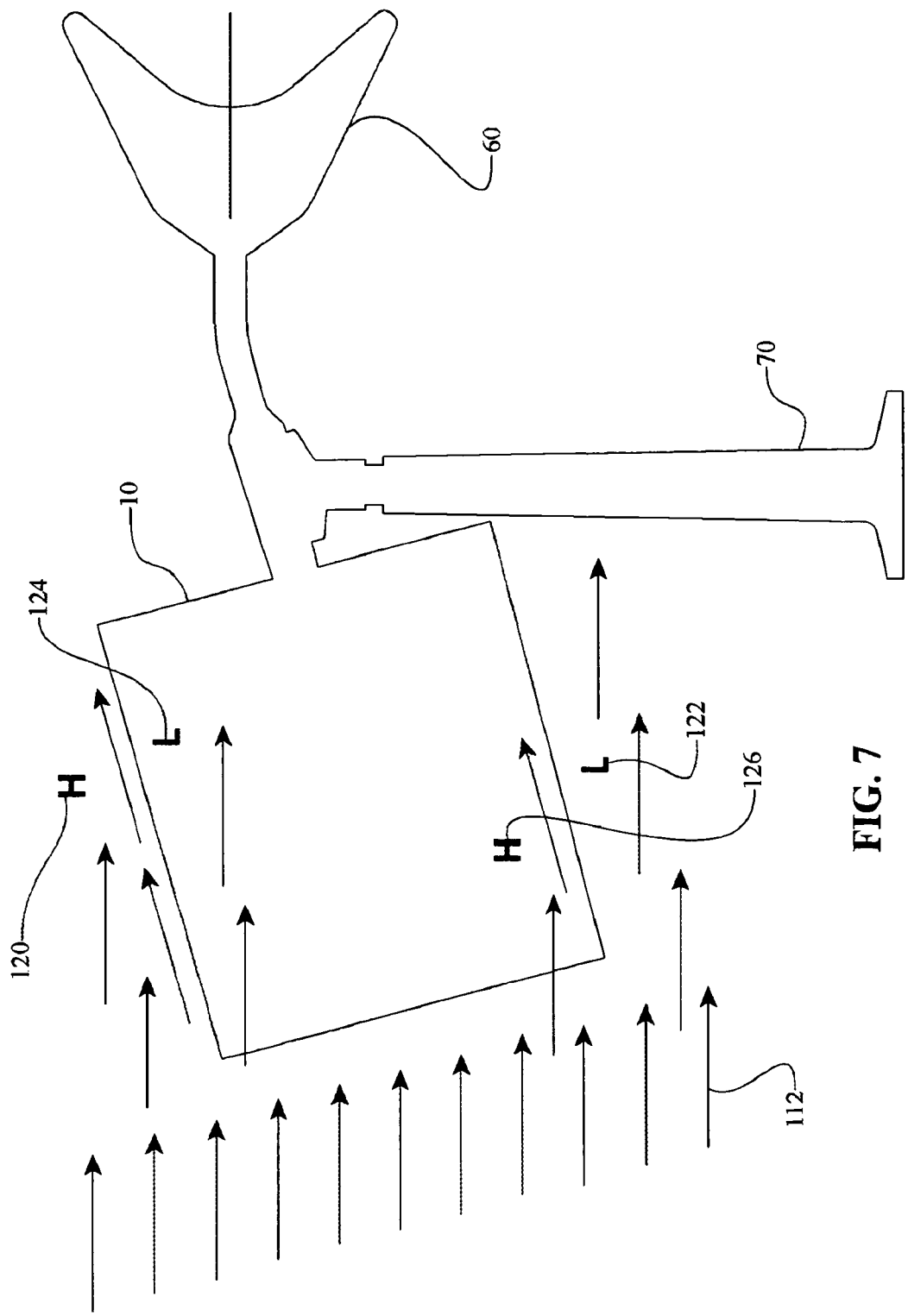
FIG. 7 is a schematic of a rotor, of the fluid energy converter of FIG. 1, pitched down.

Referring now to FIGS. 1 and 6, a pressure differential effect through the tube 10 is described. FIG. 6 shows a schematic of the tube 10 in a flowing fluid 112, where the direction of the flow of fluid 112 is denoted by arrows. As the fluid 112 enters the tube 10 when the tube 10 is rotating, the fluid 112 starts rotating in the same direction of the rotation of the tube 10 through viscous interaction with the helical grooves 11, the front blades 30, and the back blades 40. In embodiments such as wind turbines and windmills, as the fluid 112 begins rotating, the fluid 112 is affected by a centrifugal force and moves radially away from the center of the tube 10. The effect of this phenomenon is that a high pressure area 111 forms on the inside surfaces of the tube 10, and a low pressure area 110 forms in the center of the tube 10. The low pressure area 110 causes the fluid 112 entering the tube 10 to accelerate. When the fluid 112 is air, the available power increases by the cube of the increase in wind velocity.

By way of example, when the rotor 1 turns (for example, in a 10 meter per second wind), the low pressure area 110 causes the fluid 112 to accelerate through the tube 10. If the low pressure area 110 causes the rotor 1 to draw fluid 112 from an area surrounding the tube 10 having a diameter that is 20% larger than the diameter of the tube 10, the effective area of the tube 10 will increase by 44%. This causes the speed of the fluid 112 through the tube 10 to increase by 44%, and the amount of power available in the fluid 112 increases by about 3 times. This increase in available power causes the angular velocity of the rotor 1 to increase, which increases centrifugal force. The low pressure area 110 increases in size as the increase in centrifugal force more strongly forces the fluid 112 radially away from the center of the tube 10. As the low pressure area 110 enlarges, the fluid 112 flowing through the tube 10 accelerates more rapidly, increasing available power. The result is more efficient energy capture for the fluid energy converter 100 when used as a wind turbine. It should be noted that this phenomenon can also occur in other applications of the fluid energy converter 100, such as compressors, propellers, pumps, and water turbines.

Still referring to FIGS. 1 and 6, as fluid 112 is drawn from an effective area greater than the area defined by the diameter of the tube 10, the fluid 112 adjacent to the fluid 112 entering the tube 10 is affected through viscous interaction and follows a similar path. The result is that the fluid 112 is compressed onto the outside surface of the tube 10, creating a high pressure area 113 that surrounds the tube 10. The high pressure area 111 and the high pressure area 113 on the tube 10 surfaces increase the density of the fluid 112 that interacts with the power producing surfaces of the tube 10, resulting in further increases in the amount of power that the fluid energy converter 100 can extract. The result is a more efficient energy capture for the fluid energy converter 100 when it is used as a wind turbine. This phenomenon can also occur in other applications of the fluid energy converter 100, such as compressors, propellers, pumps, and water turbines.

Still referring to FIGS. 1 and 6, as the fluid 112 inside the tube 10 begins rotating in the same direction as the rotation of the tube 10, a vortex develops which increases the torque the tube 10 produces. In the case of a wind turbine, this increase in power can be used to turn a larger generator, or in the case of a windmill to increase the work that the windmill can perform, such as pump more water. The result is more efficient energy capture for the fluid energy converter 100 when it is used as a wind turbine. This phenomenon can also occur in other applications of the fluid energy converter 100, such as compressors, propellers, pumps, and water turbines.

Referring to FIGS. 6, 17A, and 17B, the effect of the acceleration of the fluid 112 through the tube 10 on the boundary layer is described. FIG. 17A depicts a normal inside boundary layer 114 and a normal outside boundary layer 115 resulting from fluid flow across the surfaces of a tube. FIG. 17B depicts what is believed are the boundary layers that arise during operation of the fluid energy converter 100. As centrifugal force affects the fluid 112 and compresses the fluid 112 against the surfaces of the tube 10, the high pressure area 111 and the high pressure area 113 affect the boundary layers 116, 118. As the fluid 112 moves across the tube 10, boundary layers 116, 118 develop that would normally thicken from the front to the back of the tube 10, as shown in FIG. 17A. However, the fluid compression 119 of the fluid 112 against the tube 10 surfaces reduces or prevents the thickening of both the inside and outside boundary layers 116, 118. The effect is the same both on the interior and exterior surfaces of the tube 10.

Further, the high pressure areas 111, 113 strengthen and become larger from the front to the back of the tube 10. This produces a steadily increasing fluid compression 119, which is denoted with arrows (perpendicular to the longitudinal axis 8) in FIG. 17B. The increasing length of the arrows indicates increasing fluid compression 119. The fluid compression 119 affects both boundary layers 116, 118, and hinders the boundary layers 116, 118 from growing from the front to the back of the tube 10. In some embodiments, the high pressure areas 111, 113 can cause the boundary layers 116, 118 to become thinner as the fluid 112 moves from the front to the back of the tube 10. Hence, in some embodiments, the high pressure areas 111, 113 cause the boundary layers 116, 118 to maintain laminar flow across the length of the tube 10, preventing and/or reducing turbulence and separation from occurring.

The result is more efficient energy capture for the fluid energy converter 100 when used as a wind turbine. This phenomenon can also occur in other applications of the fluid energy converter 100, such as compressors, propellers, pumps, and water turbines.

Referring to FIGS. 1, 6, 7, 8, 12, and 13, the effect of pitching the rotor 1 is explained. Pitching, or tilting the rotor 1 vertically, causes changes in pressure both inside and outside of the tube 10. If the rotor 1 is pitched down as in FIGS. 7, 12, and 13, an outside top high pressure area 120 forms on the top of the tube 10 on the outside surface and an inside bottom high pressure area 126 forms on the bottom of the tube 10 on the inside surface. In embodiments where the fluid energy converter 100 is used with compressible fluids 112, the low pressure area 110 rises as it exits the back of the tube 10 because the exiting fluid 112 is less dense than the surrounding exterior fluid. In this case, the fluid 112 in the outside top high pressure area 120 accelerates toward the low pressure area 110 and increases the available energy that the fluid energy converter 100 can capture. An inside top low pressure area 124 forms on the top inside surface of the tube 10 because some of the fluid 112 that would normally flow to this area is diverted to create the outside top high pressure area 120. Similarly, an outside bottom low pressure area 122 forms at the bottom of the tube 10 on the outside because some of the fluid 112 that would normally flow to this area is diverted to create the inside bottom high pressure area 126. In some embodiments, the rotor 1 is pitched down 20 degrees, although depending on the application, a pitch of between 1 and 30 degrees can be used during normal operation.

Figure 12:
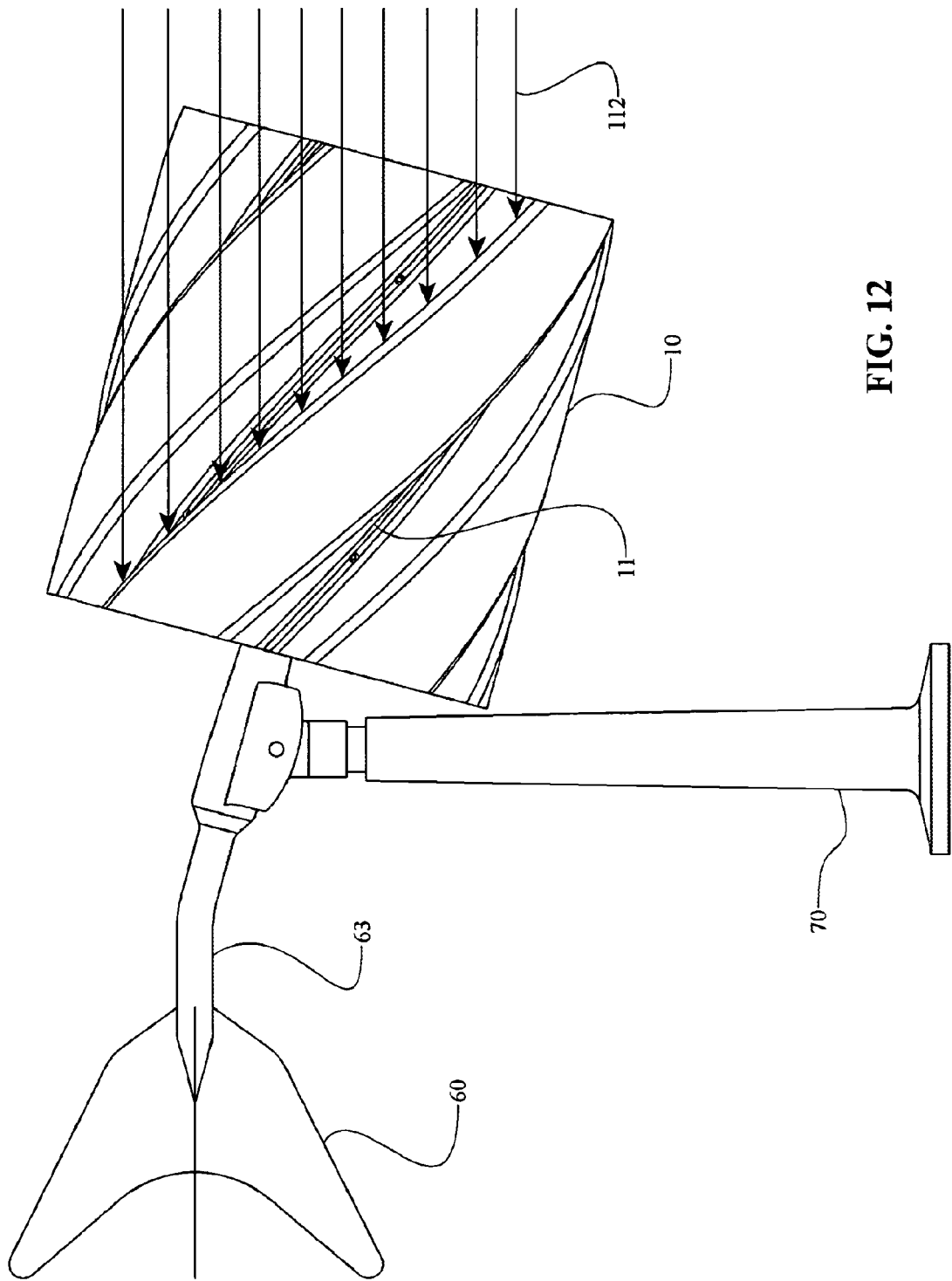
FIG. 12 is a side view of a rotor, of the fluid energy converter of FIG. 1, pitched down.
Figure 13:
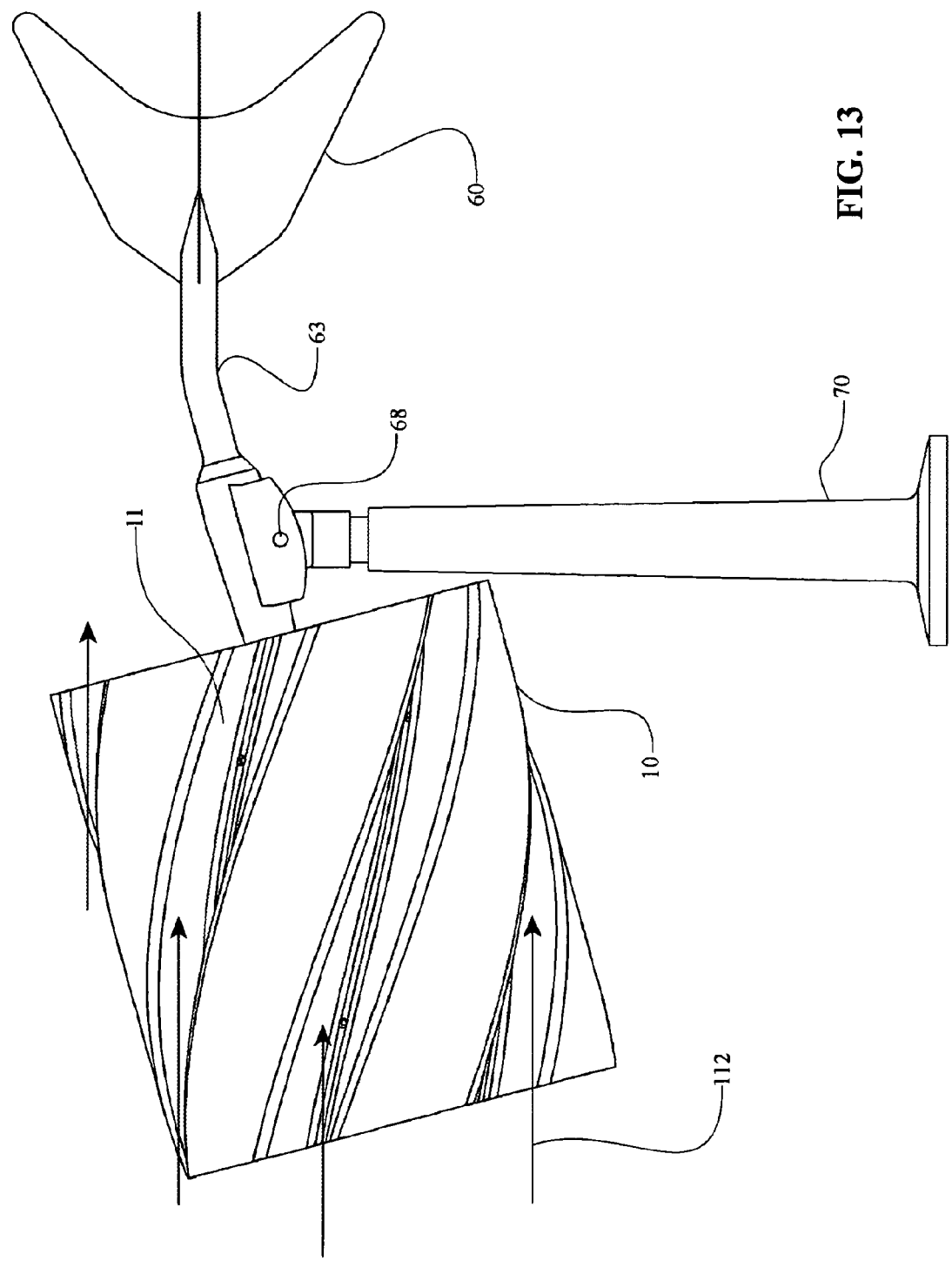
FIG. 13 is a side view of a rotor, of the fluid energy converter of FIG. 1, pitched down.

Referring to FIGS. 12 and 13, the effect of pitching the rotor 1 and the effect of changing the orientation of the helical grooves 11 relative to the fluid 112 is described. FIG. 12 shows a side view of how the fluid 112 stream contacts the helical grooves 11. The helical grooves 11 are nearly perpendicular to the fluid stream 112, and move in a direction that is approximately from the front to the back of the tube 10. If the fluid 112 moves faster than the helical grooves 11 move from the front to the back of the tube 10, the fluid 112 contacts and pushes the helical grooves 11, assisting rotation of the tube 10. In this case, high pressure is produced because the fluid 112 gives up some of its energy to the tube 10 and loses velocity. If the helical grooves 11 move from the front to the back of the tube 10 faster than the velocity of the fluid 112, the fluid 112 does not give up energy to rotate the tube 10, the fluid 112 is not slowed, a low pressure forms on the first side of the tube 10, and the tube 10 is not assisted in its rotation.

Referring to FIG. 13, a second side view of how the fluid 112 stream contacts the helical grooves 11 is shown. The helical grooves 11 are nearly parallel to the fluid stream 112, and move in a direction that is approximately perpendicular to the fluid 112. On the second side of the tube 10, the helical grooves 11 are oriented so that they cannot capture much energy from the fluid 112. If the angular velocity of the tube 10 is significantly greater than the velocity of the fluid 112, the fluid 112 acts on the helical grooves 11 to slow rotation of the tube 10. If the angular velocity of the tube 10 is significantly slower than the velocity of the fluid 112, the fluid 112 contacts and pushes the helical grooves 11 and assists rotation of the tube 10. Various factors come into play when setting the pitch of the rotor 1, including fluid velocity, helical groove 11 angle, type of fluid, angular velocity of the tube 10, number of helical grooves 11, and shape of the blades 30, 40.

Figure 8:
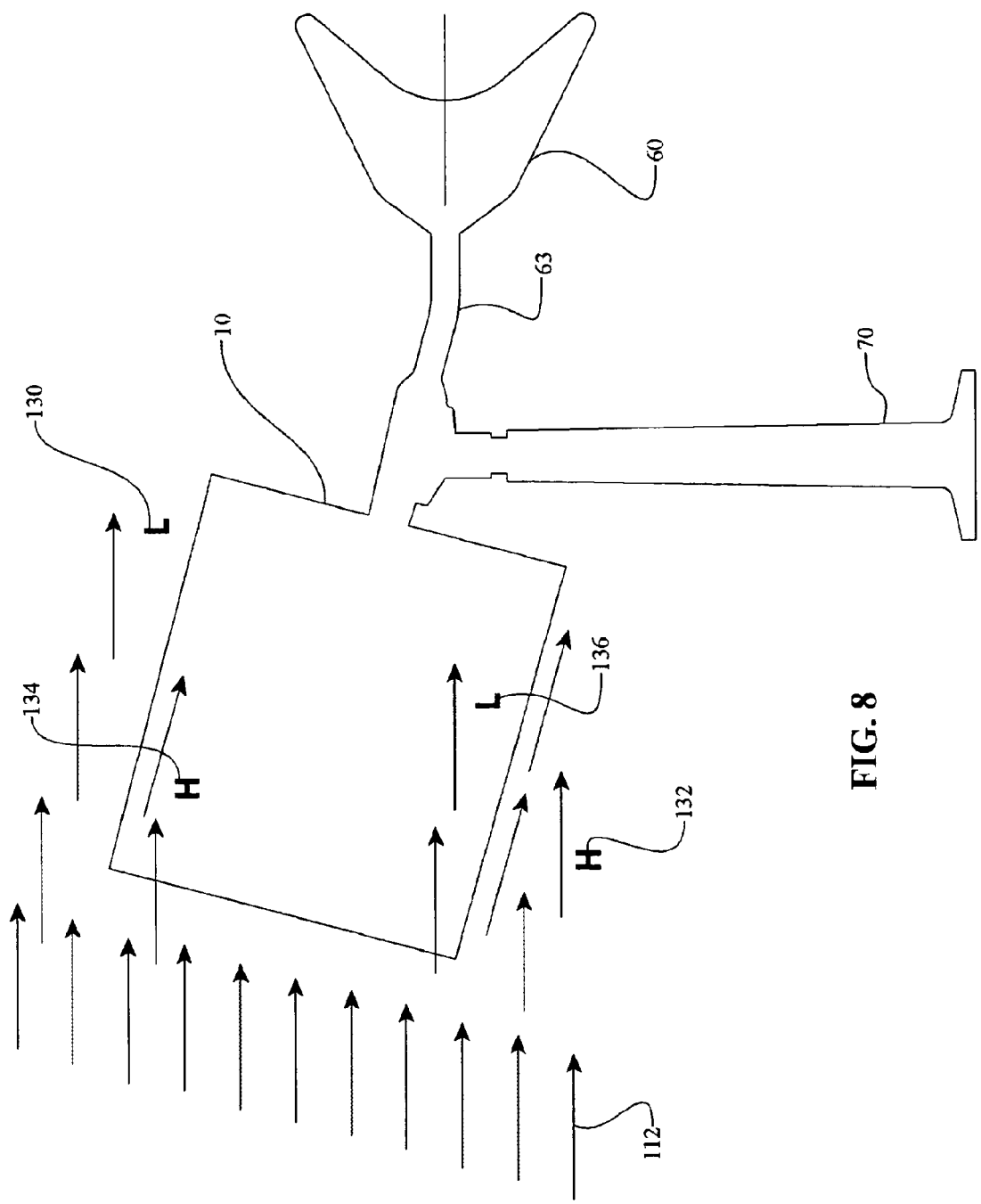
FIG. 8 is a schematic of a rotor, of the fluid energy converter of FIG. 1, pitched up.

Referring to FIGS. 1, 6, 8 and 13 now, FIG. 8 shows the rotor 1 pitched up about 20 degrees, which creates an outside top low pressure area 130 on the top and outside of the tube 10. Similarly, an inside bottom low pressure area 136 forms on the bottom and inside of the tube 10. These low pressure areas form because the fluid 112 is diverted to create the inside top high pressure area 134, which forms on the inside and top of the tube 10, and the outside bottom high pressure area 132, which forms on the outside and bottom of the tube 10. The outside top low pressure area 130 and the outside bottom high pressure area 132 produce lift, which is advantageous in some embodiments. For example, in some embodiments it is preferable to make the rotor 1 as light as possible, and situations can develop when the rotor 1 becomes weightless and floats as the rotor 1 is pitched up. Although the rotor 1 is pitched up about 20 degrees, in other embodiments the pitch angle can vary between 1 and 30 degrees during normal operation. In some embodiments, the tail shaft 64 includes a tail bend 63 to maintain a desired pitch angle relative to the flow of the fluid 112. In other embodiments a pitch drive is used, which is similar to a yaw drive, to control the pitch angle of the rotor 1.

Figure 9:
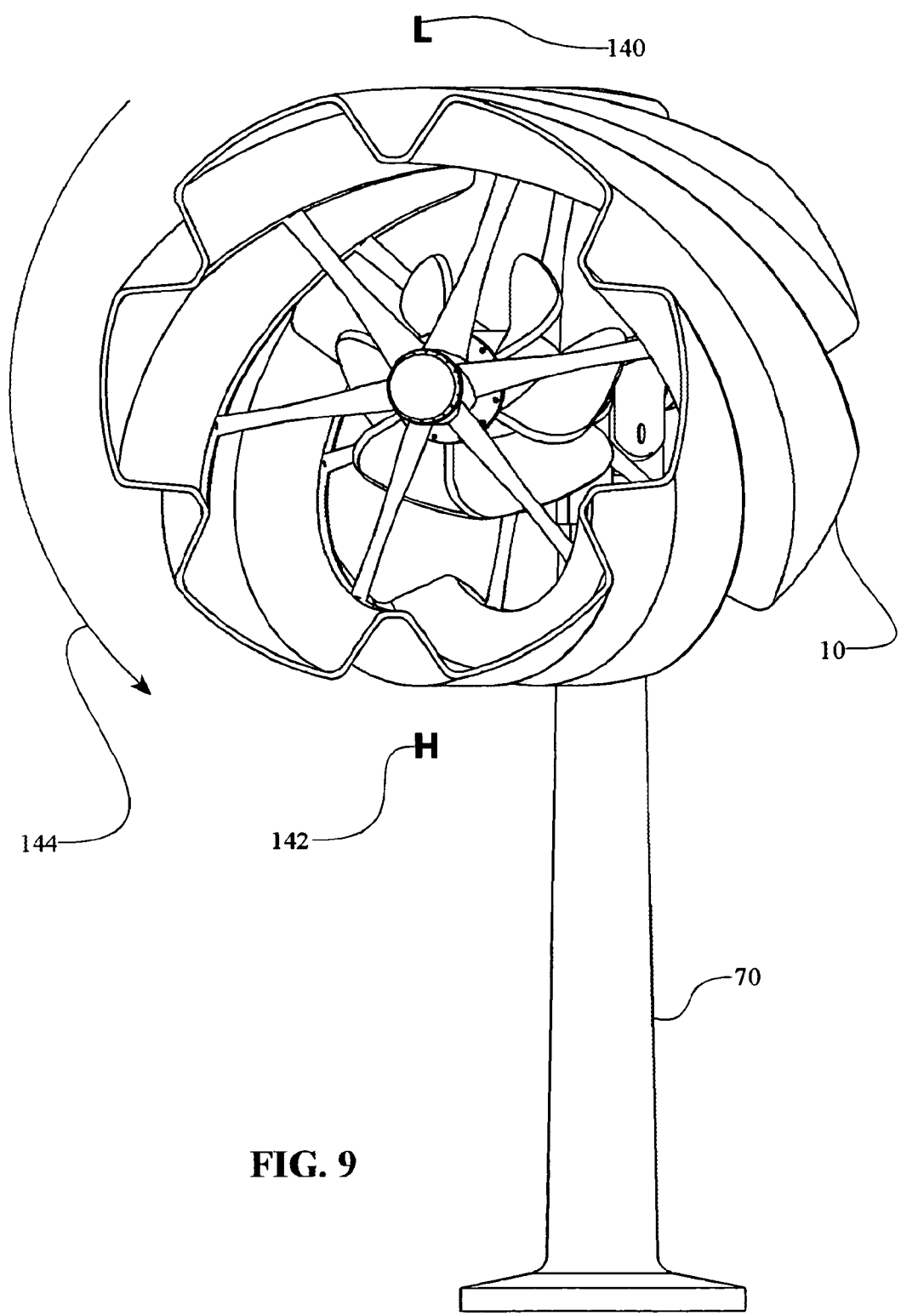
FIG. 9 is a front view of the fluid energy converter of FIG. 1 having a rotor yawed in a first direction.
Figure 14:
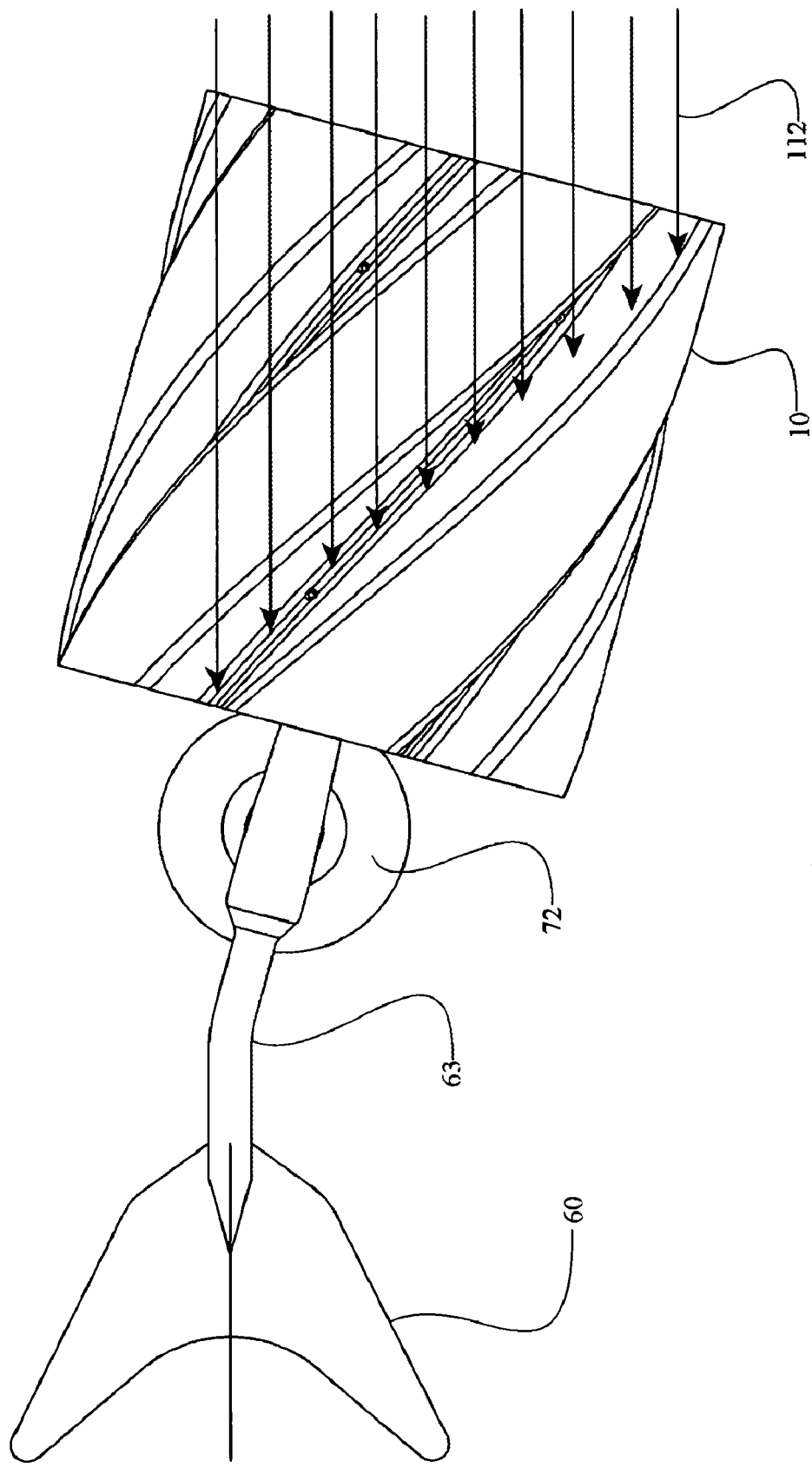
FIG. 14 is a top view of a rotor, of the fluid energy converter of FIG. 1, yawed in a first direction.

Referring to FIGS. 1, 9, 10, 14, and 15, the effects of yawing the rotor 1 are explained. In FIGS. 9 and 14, the rotor 1 is yawed 16 degrees in a first direction so that the fluid 112 flows in a direction substantially with the rotation direction 144. Because the helical grooves 11 are positioned so that they are nearly perpendicular to the flow of the fluid 112, the helical grooves 11 move in a direction from the front to the back of the tube 10 as the helical grooves 11 rotate. If the movement of the helical grooves 11 from the front to the back of the tube 10 is at least as fast as the velocity of the fluid 112, a low pressure area 140 on the top of the tube 10 forms. At this yaw orientation, the top low pressure area 140 on the top of the tube 10 produces lift. Similarly, a bottom high pressure area 142 forms on the bottom of the tube 10 due to the helical grooves 11 moving in a direction which is not in the same direction as the fluid 112. This also produces lift which makes the rotor 1 lighter, and in some embodiments, the rotor 1 can be made lighter than air by using this lift mechanism. In some embodiments, the tail shaft 64 includes a tail bend 63 to maintain the yawing of the rotor 1 at a desire orientation relative to the fluid 112. Although in this example the rotor 1 is yawed 16 degrees in a first direction, in other embodiments the yaw angle can vary between 1 and 30 degrees during normal operation.

Figure 10:
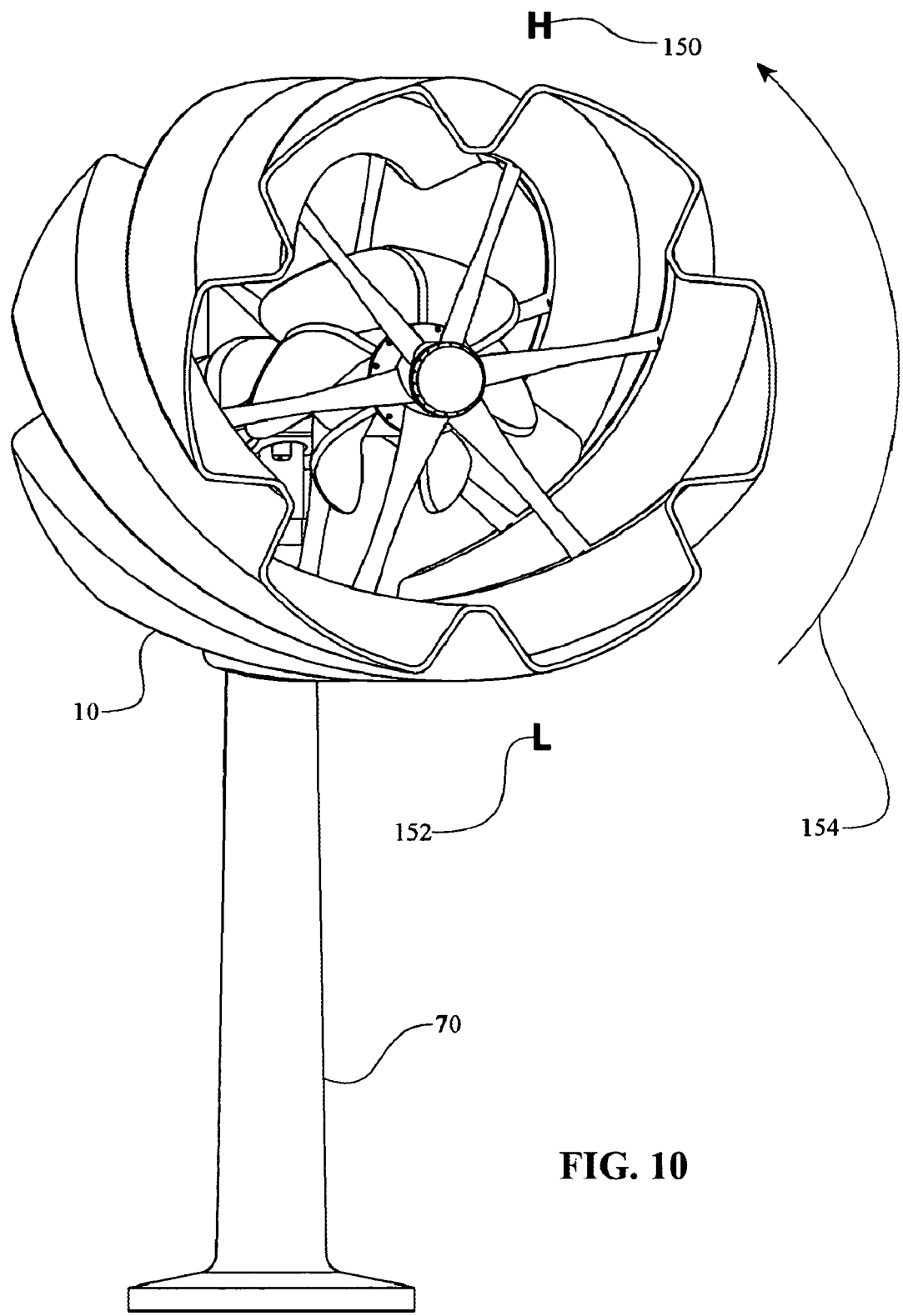
FIG. 10 is a front view of the fluid energy converter of FIG. 1 having a rotor yawed in a second direction.
Figure 15:
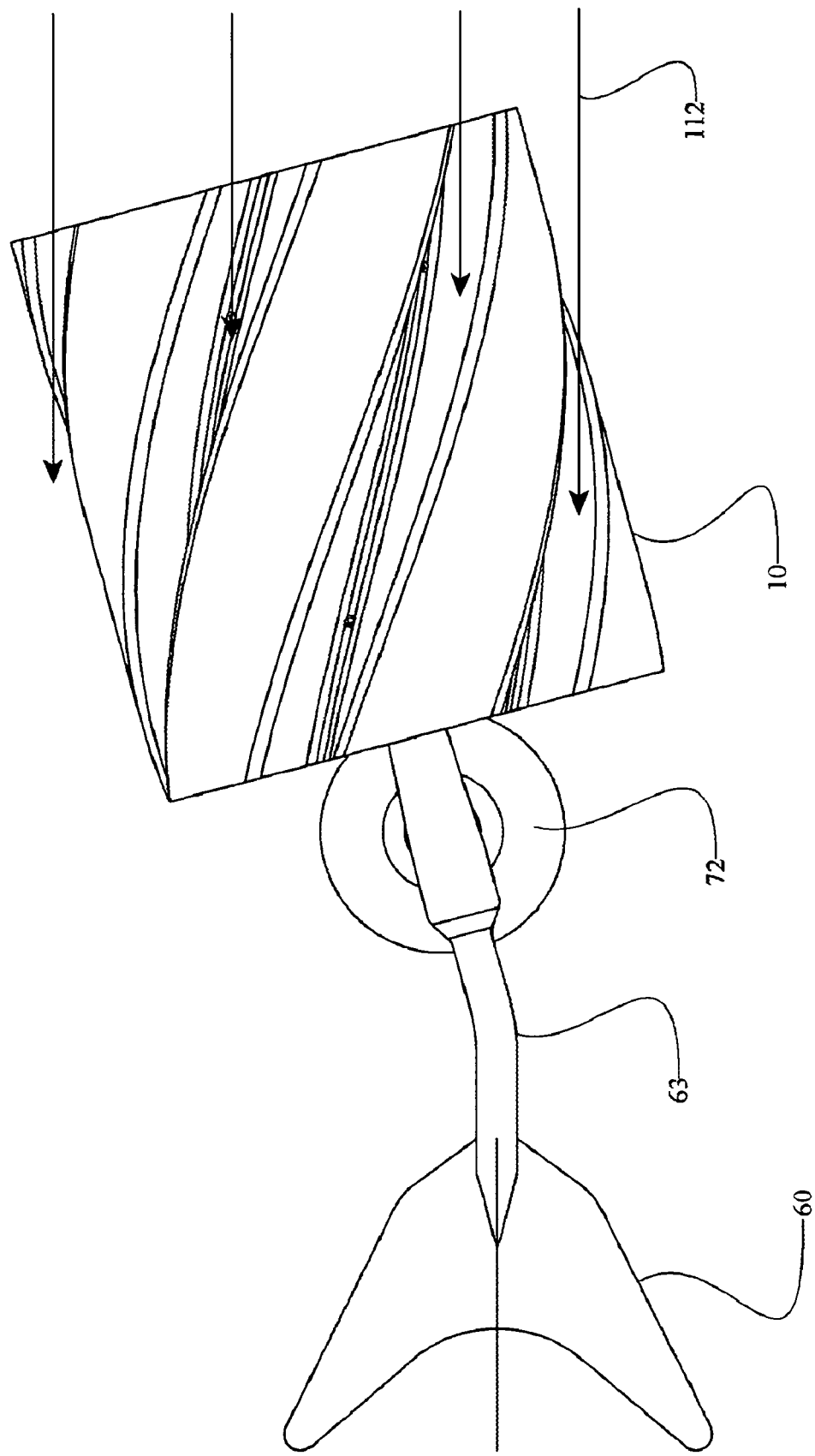
FIG. 15 is a top view of a rotor, of the fluid energy converter of FIG. 1, yawed in a second direction.

Still referring to FIGS. 1, 9, 10, 14, and 15, in FIGS. 10 and 15 the rotor 1 is yawed in the opposite, or a second, direction. At this yaw orientation, a top high pressure area 150 forms on the top of the tube 10 and a bottom low pressure area 152 is produced on the bottom of the tube 10 if the helical grooves 11 move from the front to the back of the tube 10 more rapidly than the fluid 112 underneath (that is, the high and low pressures reverse when the helical grooves 11 are moving from the front to the back of the tube 10 more slowly than the velocity of the fluid 112). In this situation, the rotation direction 154 causes a component of the helical grooves 11 to move against the fluid 112 at the top of the tube 10, and substantially with the fluid 112 at the bottom of the tube 10. In embodiments where the fluid energy converter 100 is used with a compressible fluid 112, the low pressure area 110 rises as it exits the back of the tube 10 because the exiting fluid 112 is less dense than the surrounding gas. In this case, the top high pressure area 150 causes acceleration of the wind 112 toward the low pressure area 110, and increases the available energy that the fluid energy converter 100 can capture. In some embodiments, the rotor 1 is yawed 16 degrees in the second direction, while in other embodiments the rotor 1 is yawed between 1 and 30 degrees.

Figure 11:
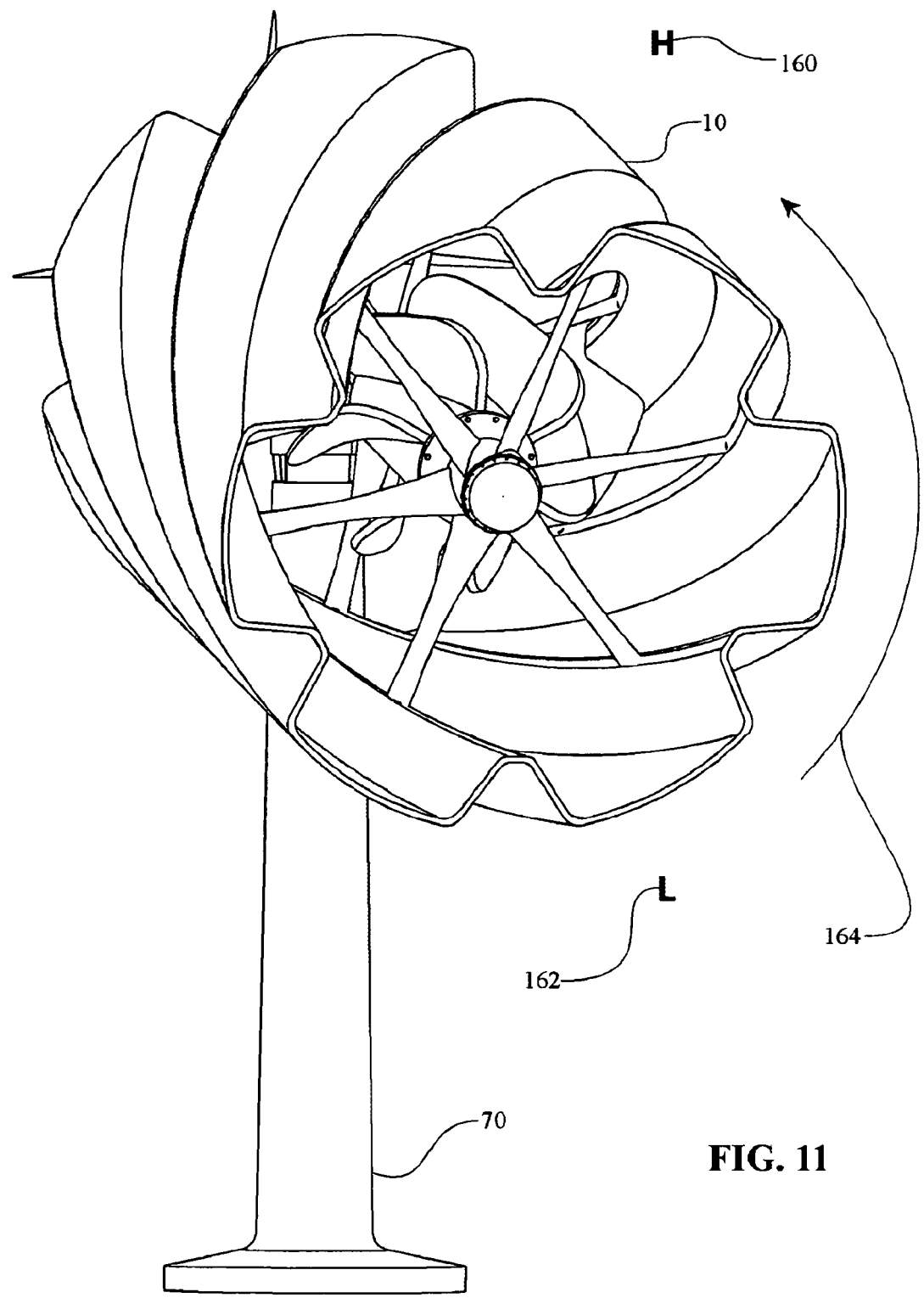
FIG. 11 is a perspective view of a rotor, of the fluid energy converter of FIG. 1, pitched and yawed.

Referring now to FIG. 11, the rotor 1 is both pitched down 15 degrees and yawed 14 degrees to maximize the pressure differences that can be produced. Depending on the application, the pitch angle of the rotor 1 can vary between 1 and 30 degrees and the yaw angle can vary between 1 and 30 degrees. The combination of pitching and yawing the rotor a yaw-pitch high pressure area 160 on the top of the tube 10 and a yaw-pitch low pressure area 162 underneath the tube 10. In one embodiment, the helical grooves 11 are formed so that they are of a left hand orientation, and the rotation direction 164 of the rotor 1 is clockwise when viewed from the front. The same pressure differences result when the helical grooves 11 are right hand, the rotor 1 is pitched down, but the yaw is in the first direction. With the helical grooves 11 in a left hand orientation and the rotor 1 pitched up and the yaw in a first direction, the pressure differences on the top and bottom of the tube 10 reverse, and a low pressure results on the top, and a high pressure is produced underneath the tube 10. Generally, when the rotor 1 is both pitched and yawed to maximize the pressure differences that can be produced, the rotor 1 pitch angle will be less than if it were only pitched and not also yawed, and the rotor 1 yaw angle will be less than if it were only yawed and not also pitched.

In some embodiments such as wind turbines, because the structure of the rotor 1 can be configured to be stronger than the structure of commonly used wind capturing technologies, the rotor 1 can be used at higher wind speeds than current technologies. In very high winds, the tube 10 can be yawed or pitched more than in normal operation to reduce wind flow into the tube 10 so that the fluid energy converter 100 can still operate without damage to the generator 88.

Figures 16A, 16B:
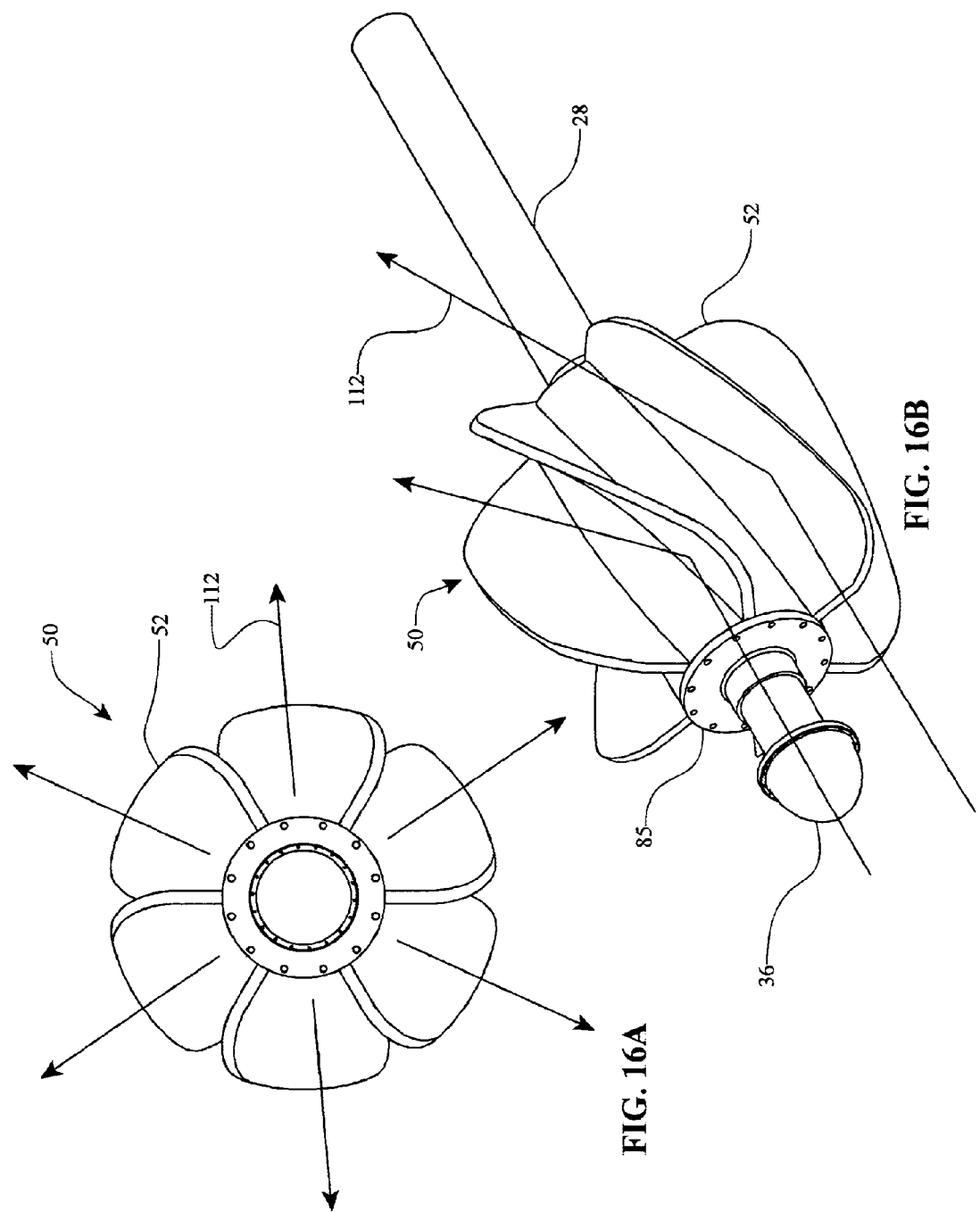
FIG. 16A is a front partial view of a nacelle, of the fluid energy converter of FIG. 1, showing the effect of the nacelle on the fluid that enters the fluid energy converter.
FIG. 16B is a perspective partial view of the nacelle of FIG. 16A and the effect of the nacelle on that enters the fluid energy converter of FIG. 1.

Referring now to FIGS. 1, 16A, and 16B, the flow of fluid 112 over and around the nacelle 50 is described. In one embodiment, the nacelle 50 is configured to direct fluid 112 in a selected direction by configuring the nacelle vanes 52 in a desired shape and position. In some embodiments, the nacelle vanes 52 have a helix that is opposite to the helix of the helical grooves 11. For example, if the helical grooves 11 are left hand, the nacelle vanes 52 will be right hand so that the fluid 112 will be directed to flow and rotate in the same direction as the rotation of the tube 10, as seen in FIG. 16B. The nacelle vanes 52 can also be configured to direct fluid 112 radially away from the center of the tube 10 as seen in FIG. 16*b*, which increases the low pressure area 110 and increase the outside and inside high pressure areas 111, 113. In some embodiments the pitch of the nacelle vanes 52 is less than the pitch of the helical grooves 11, but depending upon the application, the pitch of the nacelle vanes 52 can be equal to or higher than the pitch of the helical grooves 11. In some embodiments, the number of nacelle vanes 52 equals the number of helical grooves 11, but the number of nacelle vanes 52 can be more or less than the number of helical grooves 11.

Figure 18:
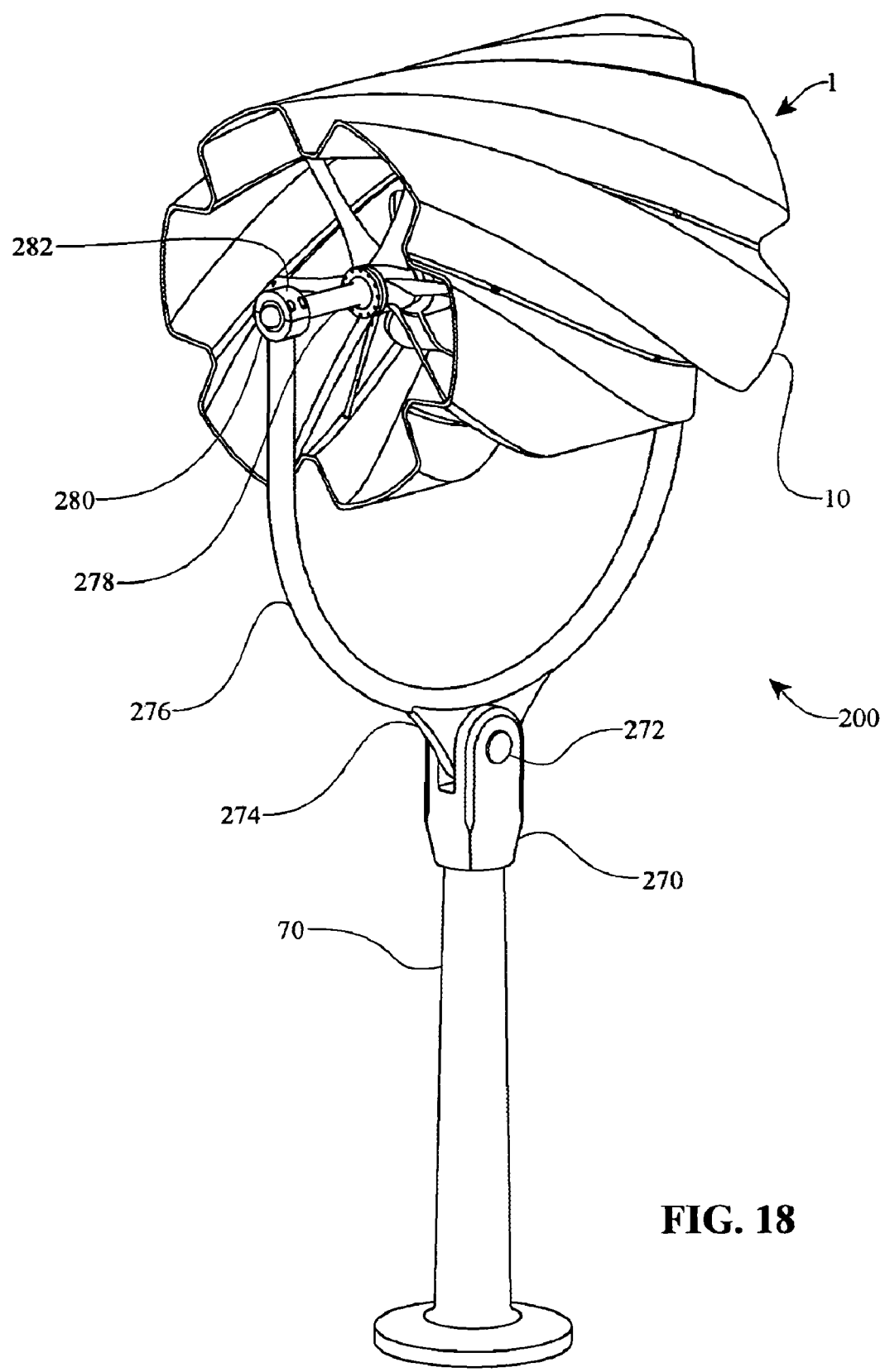
FIG. 18 is a perspective view of an alternative mounting method for the rotor of the fluid energy converter of FIG. 1.

Referring to FIG. 18, an alternative fluid energy converter 200 is disclosed. For the purposes of simplicity, only the differences between the fluid energy converter 200 and the fluid energy converter 100 are described. In one embodiment, the fluid energy converter 200 does not have a tail 60 or tail shaft 64 but incorporates a yaw drive (not shown) which is commonly known. Assembled to the top of the tower 70 is a U-hinge 270, which provides for yawing and pitching of the rotor 1. The U-hinge 270 can have a cylindrical bore which fits over the top of the tower bearing 78 and provides for low friction yawing of the rotor 1. Yawing is accomplished with a yaw drive which is commonly known. In one embodiment, the U-hinge 270 is a strong and rigid component that can be made from a material such as aluminum, steel, carbon fiber, fiberglass with polyester or epoxy resin, or any other suitable material. The U-hinge 270 incorporates a slot with two through holes into which a U-pin 272 is inserted with an interference fit, for example. A U-plate 274, which in some embodiments rigidly attaches to the center of the U-arm 276, has a through hole into which the U-pin 272 is inserted. The U-pin 272 provides for pitching of the rotor 1 with a pitch drive (not shown), which is similar to the yaw drives commonly known. The U-arm 276 in some embodiments is generally U-shaped and tubular, and is configured to support the rotor 1 and provide mounting to the front and back to eliminate the cantilever loads which the rotor 1 produces. When used with wind turbines and windmills, the U-arm 276 can raise the height of the rotor 1 where winds usually have higher velocities. In other embodiments, the U-arm 276 is V-shaped or has the shape of a square wave. In one embodiment, rigidly attached to the top of each end of the U-arm 276 is a U-shaft bracket 280, which in some embodiments is made from a strong material such as steel or aluminum, can be U-shaped, and is configured to accept insertion of the U-shaft 278. A U-shaft clamp 282 rigidly attaches to each of the two U-shaft brackets 280 using standard fasteners, and provides for simplified assembly of the U-shaft 278 and secures the U-shaft 278 in position.

Figure 19:
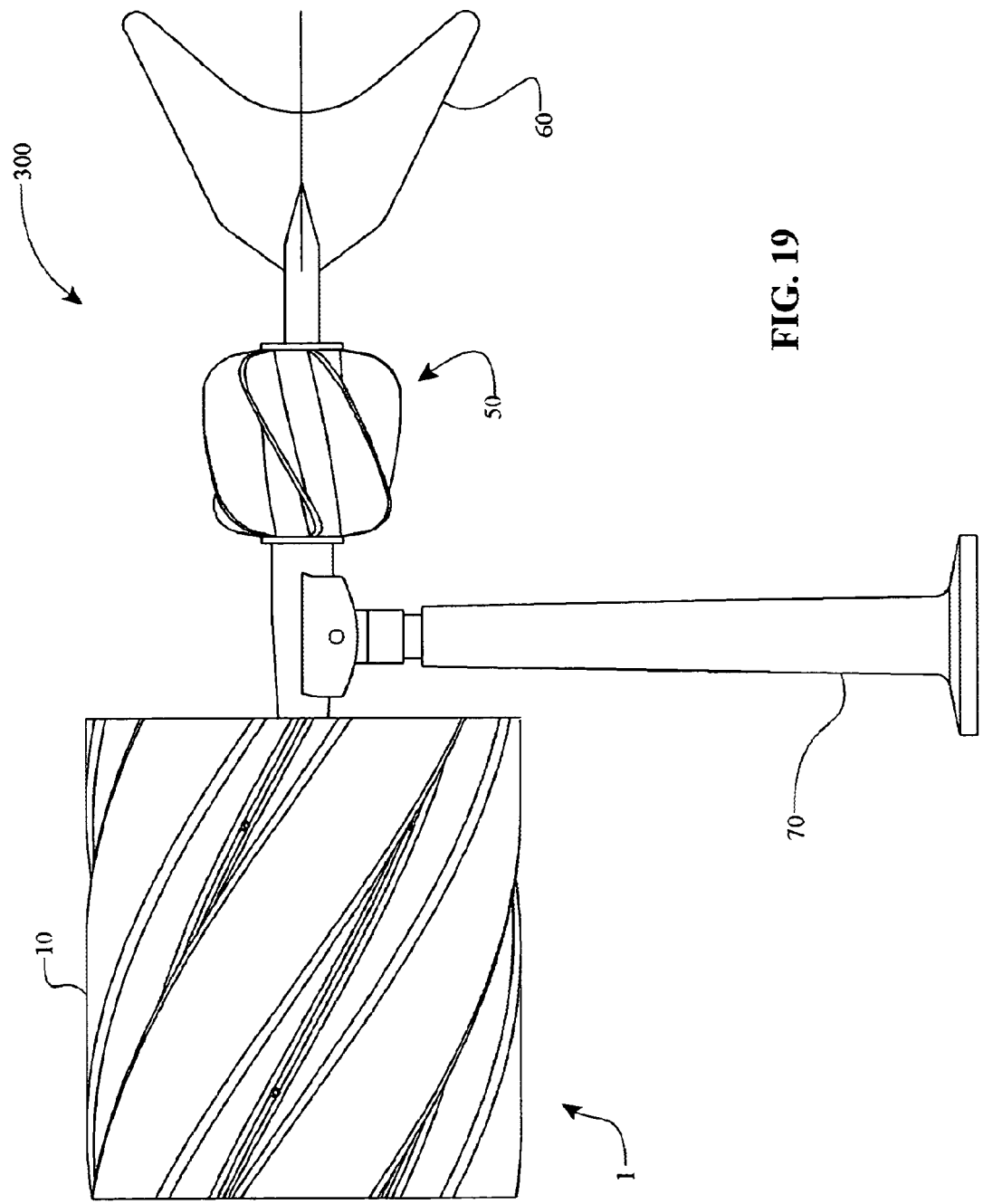
FIG. 19 is a perspective view of an alternative position of the nacelle of the fluid energy converter of FIG. 1.

Referring now to FIGS. 3 and 19, an alternative fluid energy converter 300 is described. The fluid energy converter 300 includes a nacelle 50 that is moved from inside the tube 10 to behind the tower 70. The nacelle 50 in some embodiments is heavy because the nacelle 50 houses the powertrain 80. The weight of the nacelle 50 can be configured to counterbalance the cantilever load produced by the rotor 1. In some embodiments, moving the nacelle 50 behind the tower 70 also helps the fluid 112 flow through the tube 10. The low speed shaft 84 is lengthened and runs from the nose cone 36 through the center of the hollow shaft 28, and through the tail body 66. The nacelle 50 is integrated into the tail body 66 so that the low speed shaft 84 can attach to the gearbox 82. Electrical cables (not shown) are routed from the generator 88 and then inside the nacelle 50 to the gearbox 82. In one embodiment, the diameter of the gearbox 82 is slightly smaller than the inside diameter of the nacelle 50 so that the electrical cables can fit between the outside diameter of the gearbox 82 and the inside diameter of the nacelle 50.

Figure 20:
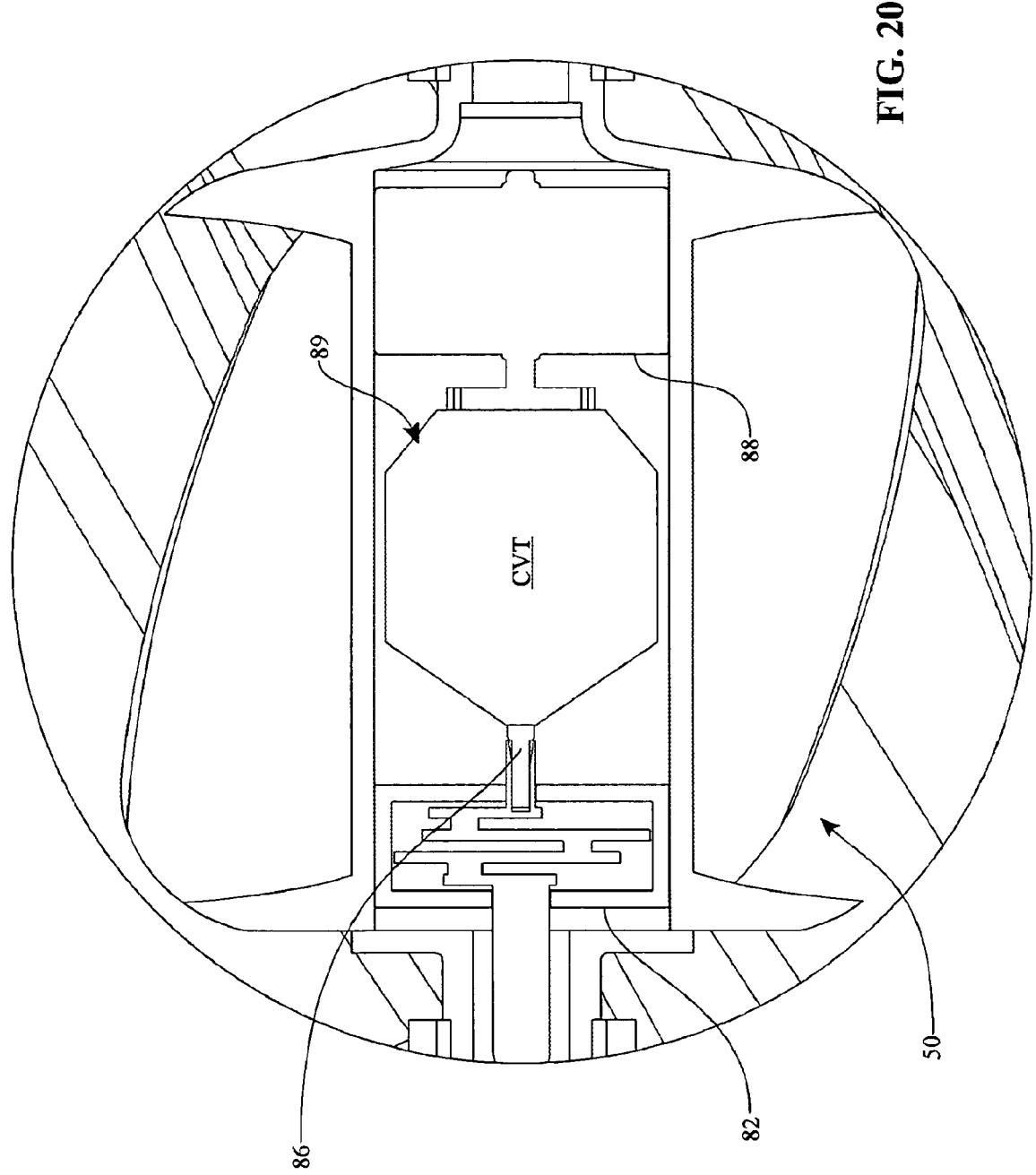
FIG. 20 is a section view the fluid energy converter of FIG. 1 having a continuously variable variator unit.

Referring to FIG. 20, in one embodiment the nacelle 50 can include a continuously variable transmission (CVT) 89, which can be placed in the powertrain 80 between the gearbox 82 and the generator 88. In some embodiments, the inside of the nacelle 50 can be the case of the CVT 89. In other embodiments the case (not shown) of the CVT 89 rigidly attaches to the nacelle 50. The input of the CVT 89 can be coupled to the high speed shaft 86 using a spline, key, fasteners, pins, or any other suitable method. In one embodiment, the output of the CVT 89 can be coupled to the generator 88 with fasteners which are inserted through holes in a flange of the generator 88 and threaded into tapped holes on the output of the CVT 89. The CVT 89 maintains a constant input speed into the generator 88, even as the velocity of the fluid 112 varies, by increasing the input rotational speed when the velocity of the fluid 112 is low and by reducing the input rotational speed when the velocity of the fluid 112 is high.

Figure 21:
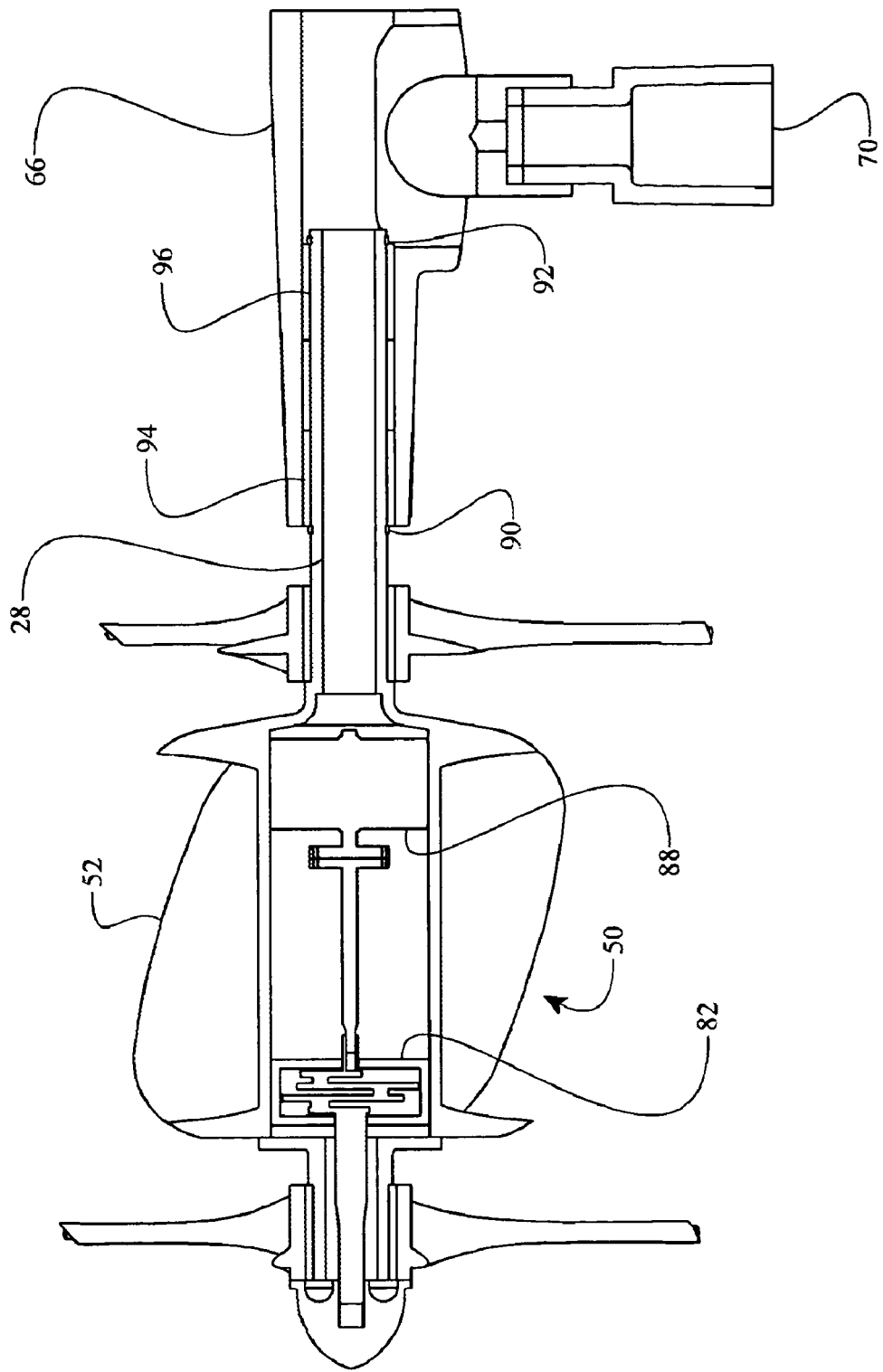
FIG. 21 is a section view of an alternative nacelle for the fluid energy converter of FIG. 1.

Referring to FIGS. 3 and 21, a contra-rotating nacelle 50 is disclosed. The nacelle 50 can be rigidly attached to the shaft 28, and the outside diameter of the shaft 28 can be configured to fit into the first nacelle bearing 94 and the second nacelle bearing 96. In some embodiments the nacelle bearings 94, 96 are located by an interference fit into the inside diameter of the tail body 66, but the nacelle bearings 94, 96 can also be attached with adhesive, a set screw, or any other suitable method. The nacelle bearings 94, 96 allow for low friction relative rotational movement between the shaft 28 and the tail body 66. As the fluid 112 enters the tube 10, the fluid 112 contacts the front blades 32, and after the front blades 32 extract some of the kinetic energy of the fluid 112, the fluid 112 begins rotating in a direction that is opposite to the rotation of the front blades 32. The fluid 112 then contacts the helical vanes 52 and causes the nacelle 50 to rotate in a direction opposite to the direction of rotation of the front blades 32 and the tube 10. In some embodiments, the stator (not shown) of the generator 88 can be attached to the inside diameter of the nacelle 50 so that the stator rotates in a direction opposite to the direction of rotation of the rotor (not shown) of the generator 88. The high speed shaft 86 turns the rotor of the generator 88. This configuration causes a large speed differential between the stator and rotor of the generator 88 and, thereby, increases the relative speed of the generator 88 as well as the power the generator 88 produces. A slip ring or rotating conductor (not shown) can be used between the rotating electricity carrying wires exiting the generator 88 to the non-rotating electricity carrying wires that enter the tower 70.

Figure 22A:
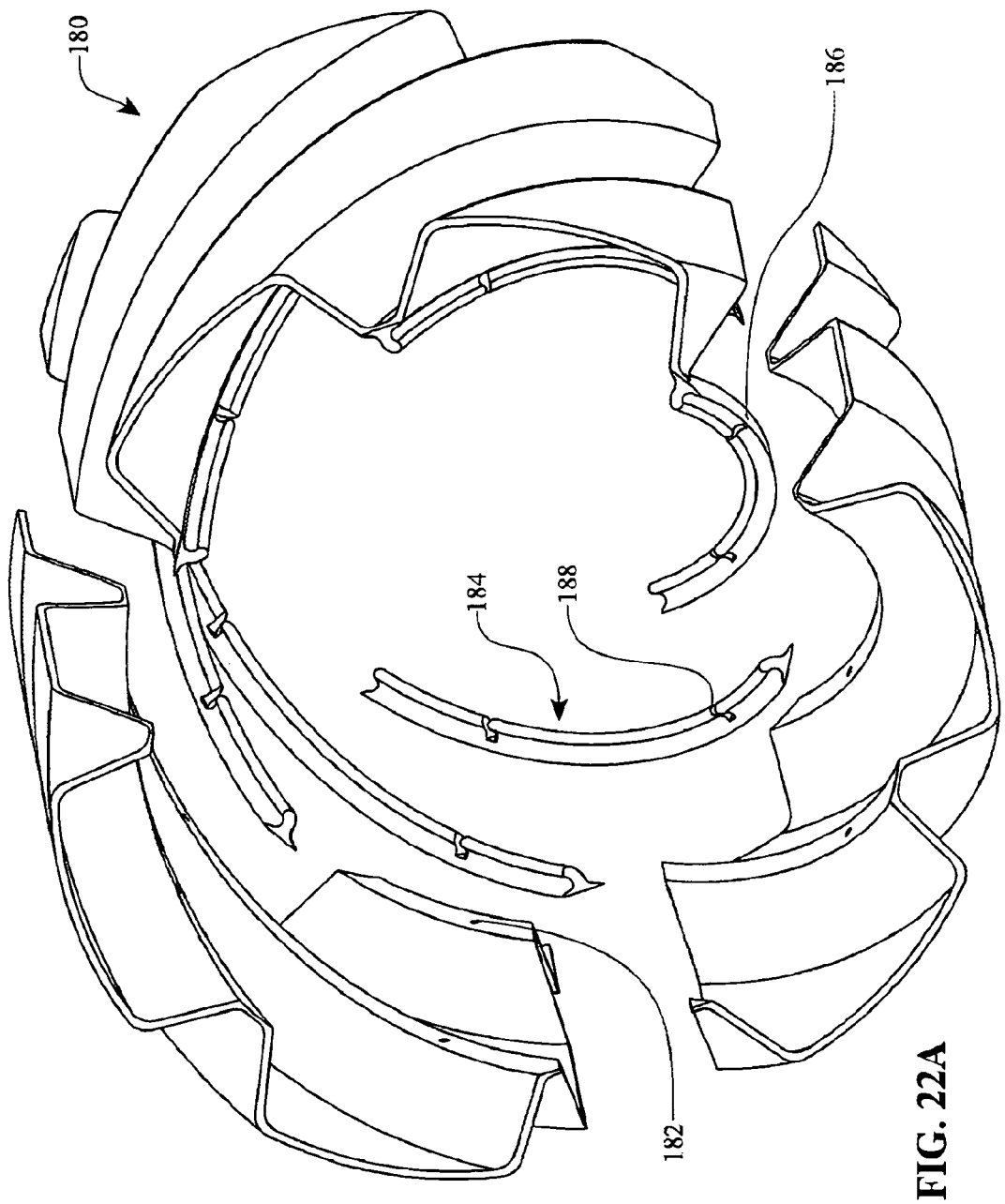
FIG. 22A is an exploded view of an alternative manufacturing method for the tube of the fluid energy converter of FIG. 1.

Referring now to FIGS. 1, 4, and 22A, an alternative manufacturing method is disclosed for the tube 10. FIG. 22A is an exploded view of a tube 10 manufactured from three substantially identical, full length, arcuate pieces 180. In one embodiment, an arcuate piece 180 has an arc of 120 degrees, or one third of a circle; hence, the three arcuate pieces 180 complete the full circumference and area of the tube 10, from the front edge to the back edge. In some embodiments, the arcuate pieces 180 are manufactured from the same materials as the tube 10 of FIG. 4, although other materials can be used. In some embodiments more or fewer arcuate pieces 180 are used, which have arcs between 10 and 180 degrees. The arcuate pieces 180 contain multiple fastening holes 182, which in some embodiments are designed to accommodate flat head screws (not shown) inserted through the exterior root surface 15 of the arcuate pieces 180. Arcuate strips 184 can be used to connect individual arcuate pieces 180 to one another. In some embodiments, the number of arcuate strips 184 equals the number of helical grooves 11, although more or fewer arcuate strips 184 can be used. The arcuate strips 184 can be attached to the interior root surfaces 19 of the arcuate pieces 180. In some embodiments, the profile of each arcuate strip 184 is T-shaped but can be configured with a curve to capture the fluid 112. Each arcuate strip 184 can be provided with at least one fastening hole 186, although in some embodiments 2, 3, 4, 5, 6, or more fastening holes 186 can be used. In some embodiments, each arcuate piece 180 has four fastening holes 182 and attaches to four arcuate strips 184; in other applications, however, each arcuate piece 180 can be attached to more or fewer arcuate trips 184, and have more or fewer fastening holes 182. In some embodiments, flat head screws are inserted through the arcuate strip holes 186. Each arcuate strip 184 has at least one arcuate strip slot 188, to which a front set of blades 30, a back set of blades 40, or other component can be attached. In some embodiments, the fastening holes 186 protrude into the arcuate strip slots 188, and flat head screws are inserted through the arcuate pieces 180, through the fastening holes 186, and screwed into tapped holes in the blades 30, 40. In some embodiments, there are twice as many arcuate strips 184 as arcuate pieces 180, and each arcuate strip 184 attaches to two arcuate pieces 180. The arcuate strips 184 in some embodiments are made from a rigid, inflexible material such as carbon fiber, fiberglass with epoxy or polyester resin, or other composite. In other embodiments, the arcuate strips 184 are formed from aluminum, steel, or titanium, although other materials, such as plastics, can be used.

Figure 22B:
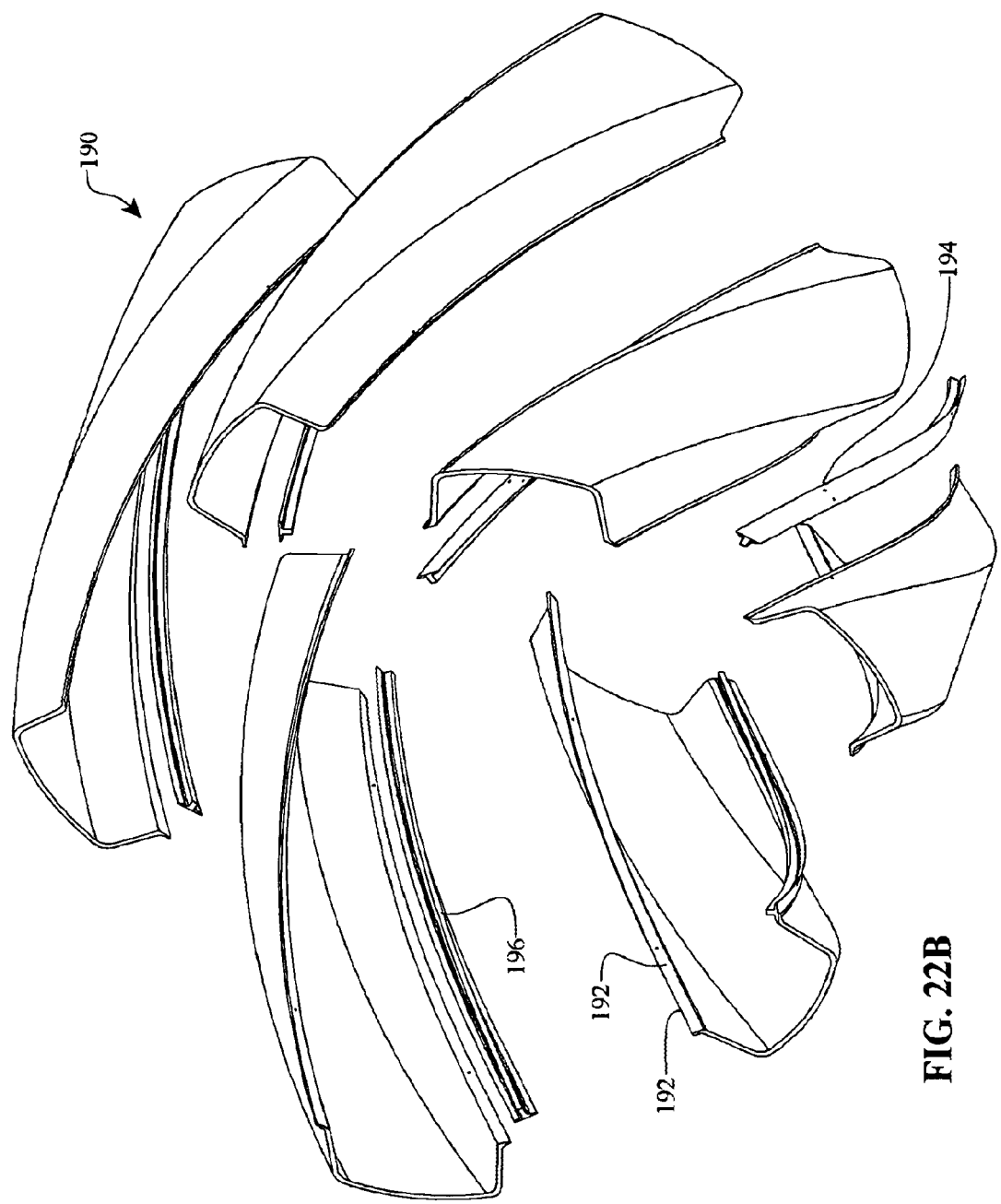
FIG. 22B is an exploded view of an alternative manufacturing method for the tube of the fluid energy converter of FIG. 1.

Referring to FIGS. 1, 4, and 22B, another alternative method of manufacturing the tube 10 is disclosed. Multiple helical pieces 190 which begin at the front edge, and continue to the back edge, of the tube 10 are substantially identical and can be connected to each other to form the tube 10. In some embodiments, the helical pieces 190 do not traverse the full length of the tube 10 but, rather, form a distance ½, ⅓, ¼, ⅕, ⅙ or less of the length of the tube 10. The helical pieces 190 can have side edges 191 which are formed along the exterior root surface 15 of the helical grooves 11. The side edges 191 contact each other to form the tube 10. In some embodiments the number of helical pieces 190 positioned radially around the tube 10 equals the number of helical grooves 11, while in other embodiments the helical pieces 190 can contain portions of more than two helical grooves 11. Multiple fastening holes 192 can be formed near the side edges 191. In some embodiments fasteners, such as flat head screws are inserted through the exterior root surface 15 of the helical pieces 190. In some embodiments the fastening holes 192 are countersunk so that if flat head screws are used the heads will lie flush with the surface of the helical pieces 190. In some embodiments, multiple helical strips 194 can be used to join the helical pieces 190 to each other. The helical strips 194 are similar, in some respects, to the arcuate strips 184 and in some embodiments have a T-shaped profile, although other shapes, such as an I-shaped or a flat profile can be used. The helical strips 194 in some embodiments are made from a rigid, inflexible material such as carbon fiber, fiberglass with epoxy or polyester resin, or other composite. In other embodiments, the helical strips 194 are formed from aluminum, steel, or titanium, although other materials, such as plastics, can be used. Multiple helical strip holes 196 can be formed into the helical strips 194. In some embodiments, some of the helical strip holes 196 are tapped while others are clearance holes so that flat head screws can be inserted through the helical strips 194 and screwed into tapped radial holes at the tips of the blades 30, 40. Other, shorter flat head screws are threaded into the helical strip holes 196 that are tapped. In some embodiments the helical strips 194 run the length of the tube 10, while in other embodiments the helical strips 194 can be ½, ⅓, ¼, or less of the length of the tube 10.

Figure 23:
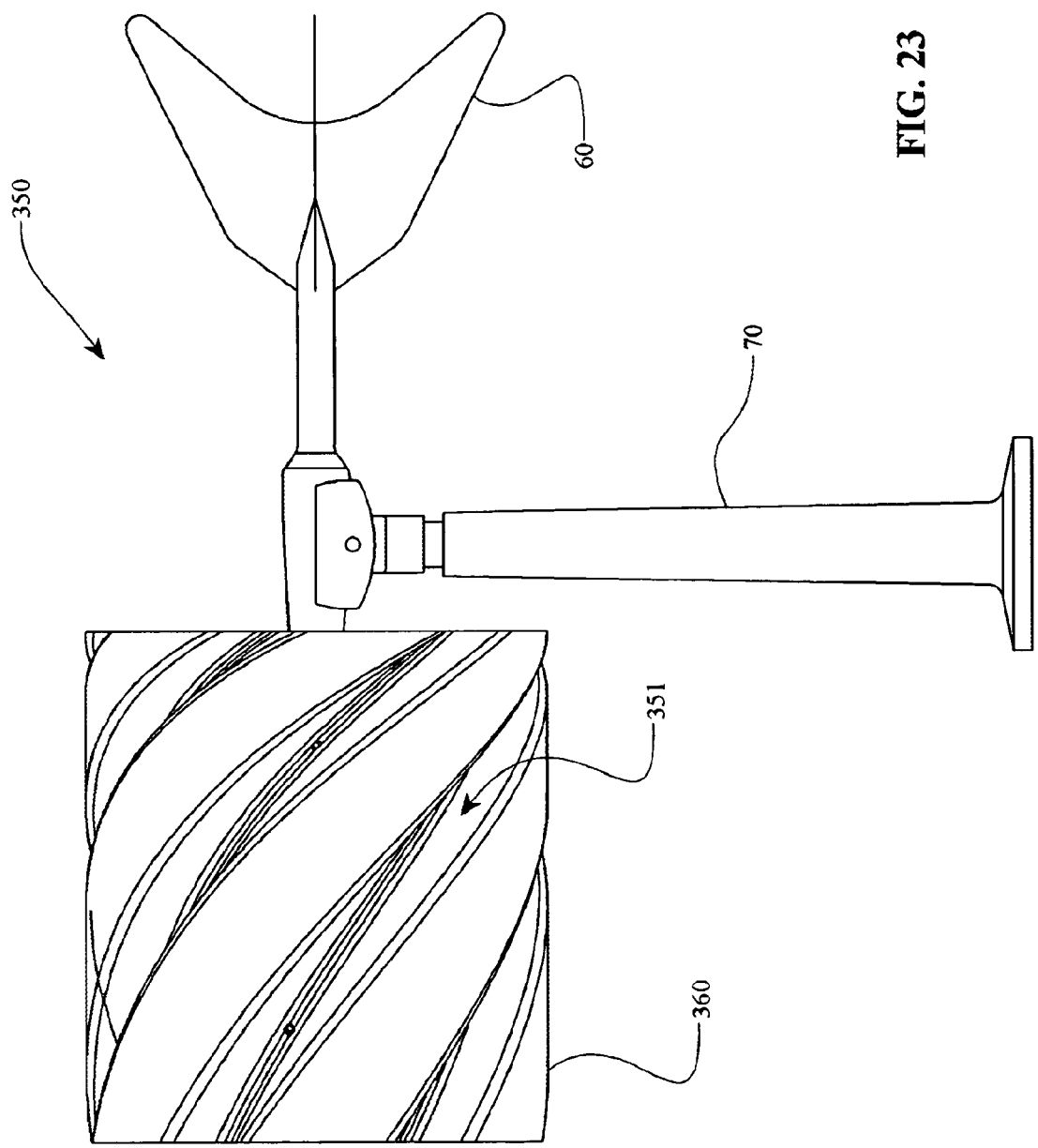
FIG. 23 is a side view of an alternative embodiment of the fluid energy converter of FIG. 1.

Referring now to FIG. 23, an alternative fluid energy converter 350 is disclosed. The fluid energy converter 350 can have a tube 360 with variable helical grooves 351. The variable helical grooves 351 in some embodiments begin with a shallower helix angle which increases from the front to the back of the tube 360. In some embodiments, the helix angle at the back of the tube 360 is about 185% of the helix angle at the front of the tube 360, but depending on the application the helix angle at the back of the tube 360 can be 200%, 300%, or more, and less than 185% of the helix angle at the front of the tube 360. This can optimize energy capture as the fluid 112 moves across the tube 360 in an application such as a wind turbine, windmill, waterwheel, or water turbine. However, in other applications, such as when the fluid energy converter 350 is used as a pump or compressor, the variable helical grooves 351 can begin with a steeper helix angle which progressively becomes shallower.

Figure 24:
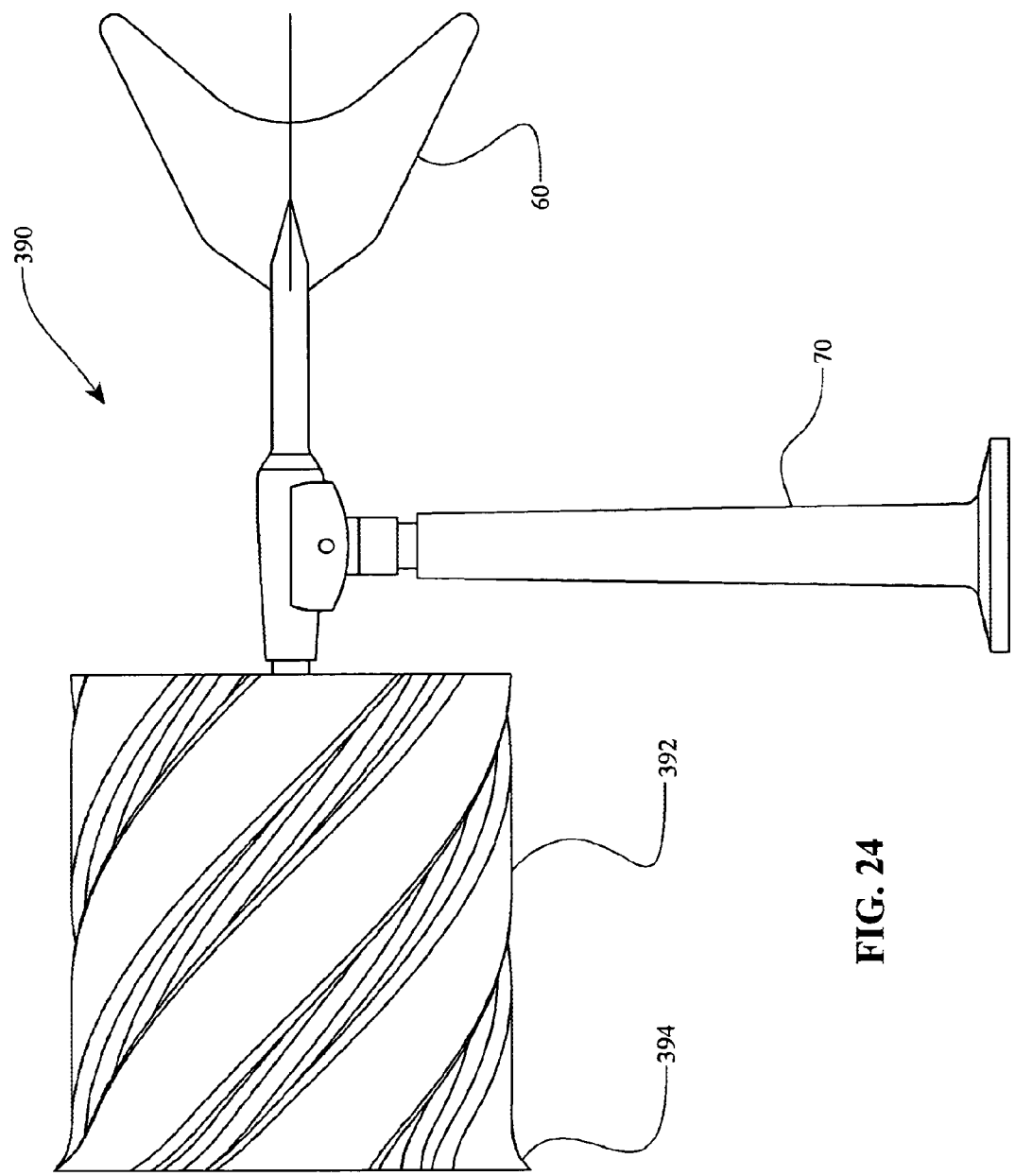
FIG. 24 is a side view of an alternative embodiment of the fluid energy converter of FIG. 1.

Referring now to FIG. 24, yet another alternative fluid energy converter 390 is disclosed. The fluid energy converter 390 can have a tube 392 with a bell mouth opening 394 to maximize the amount of fluid 112 moving through the tube 392. In some embodiments, increasing the amount of fluid 112 inside of the tube 392 increases the energy density in the tube 10. The flared opening of the bell mouth 394 captures more fluid 112 In some applications involving a compressible fluid 112, the additional fluid 112 can raise the pressure in the high pressure area 111, which boosts efficiency of the fluid energy converter 390. The curve forming the bell mouth 394 in some embodiments has a radius that is about 40% of the radius of the tube 10; however, in other applications larger or smaller radii can be used. In some embodiments, the diameter of the bell mouth 394 is 5% greater than the diameter of the remainder of the tube 392, although in other embodiments the diameter is from 1-30% greater than the remainder of the tube 392.

Figure 25:
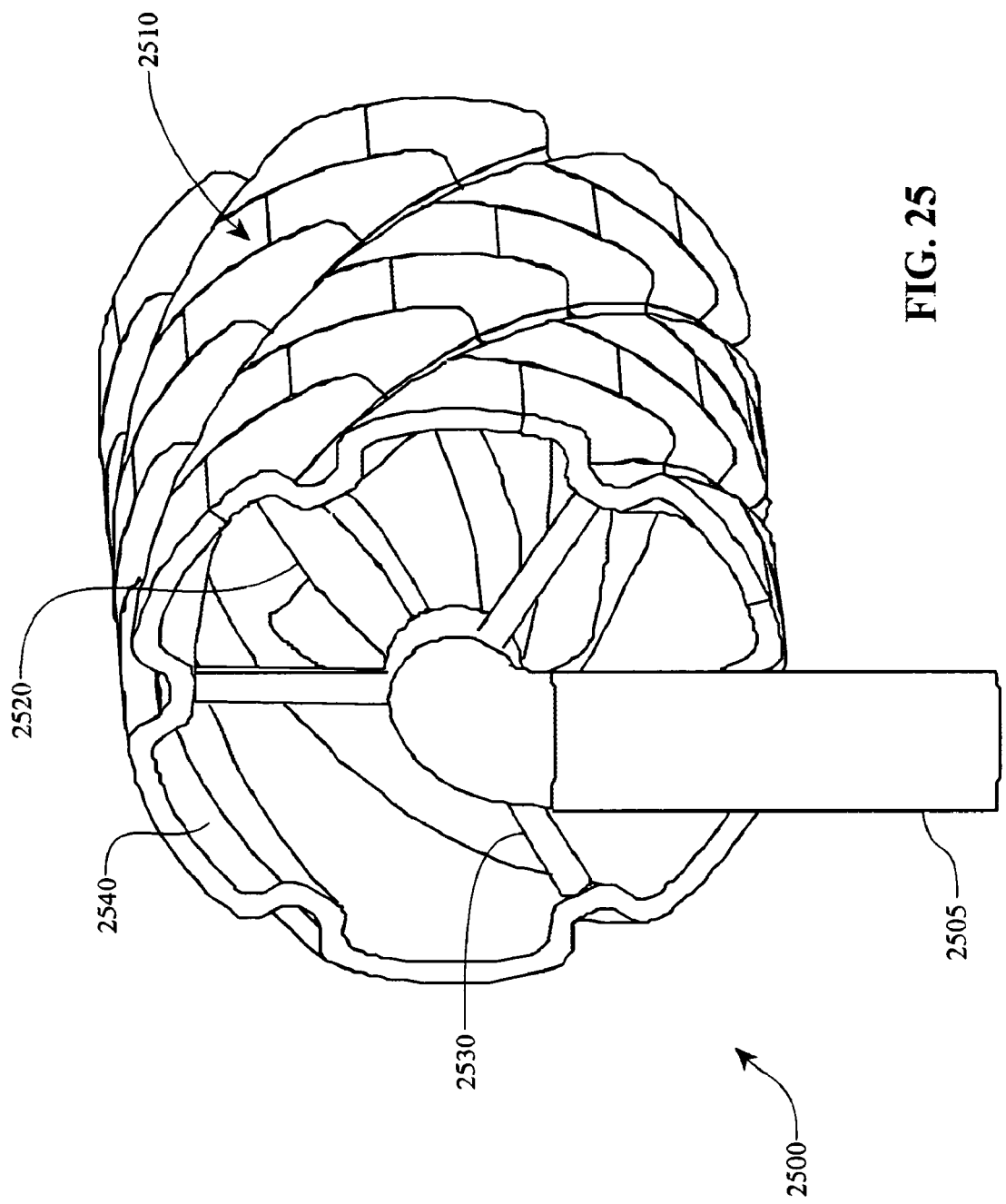
FIG. 25 is a perspective view of an alternative embodiment of a wind turbine system.
Figure 26B:
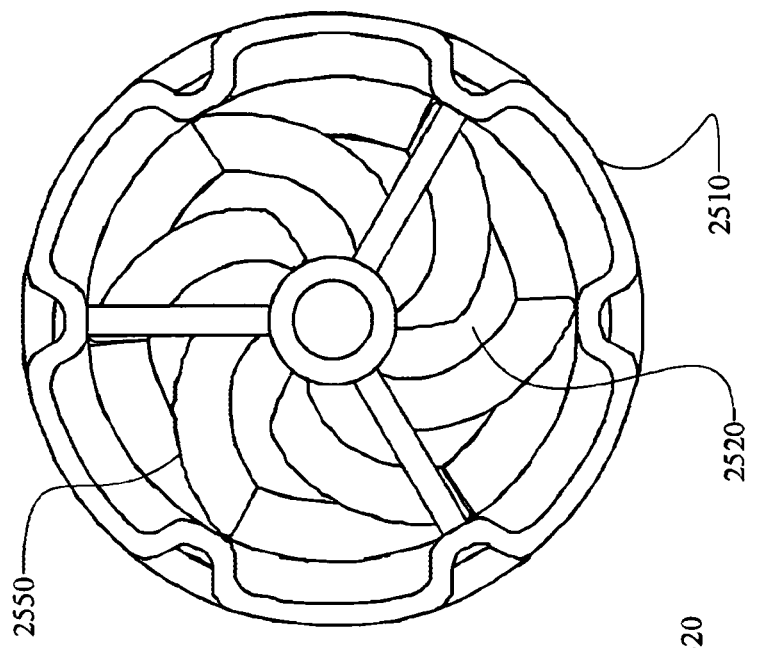
FIG. 26B is a partial end view of the system of FIG. 25.
Figure 26A:
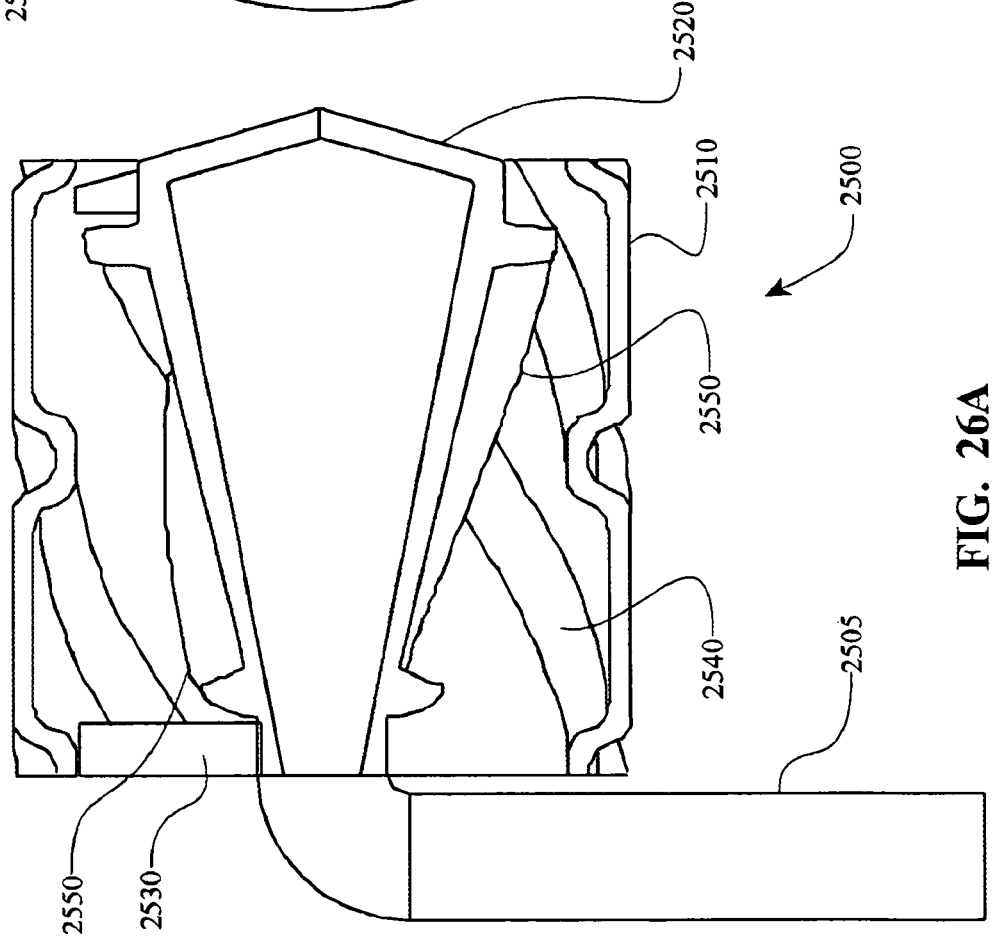
FIG. 26A is a cross-sectional view of the system of FIG. 25.

Referring now to FIG. 25, an alternative wind turbine system 2500 can include a rotor 2510 that forms the outside case of the system 2500. The rotor 2510 generally surrounds a central body 2520. The central body 2520 of this embodiment can be configured to compress the flow of incoming wind to increase the wind speed in the turbine and thereby increase the overall wind capture of the system 2500. In some embodiments, the central body 2520 is fixed. In the illustrated embodiment, the rotor 2510 connects via spokes 2530 to a drive shaft (not shown) that couples the rotational energy of the rotor 2510 to a power transmission device (for example, the continuously variable transmission 3020) for efficiently coupling the rotational energy received by the rotor 2510 from the wind to an electrical generator 3030, for example (see FIG. 30).

Figure 28:
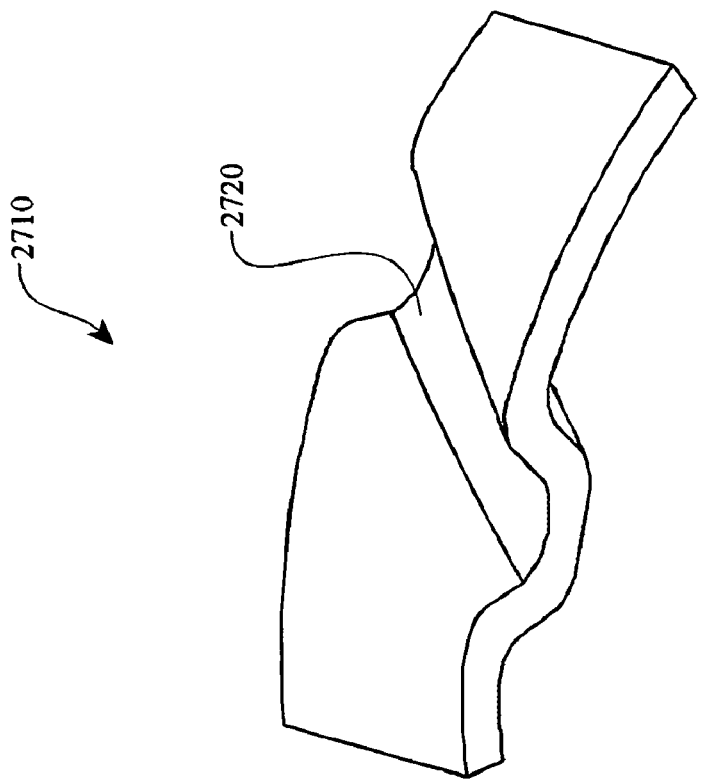
FIG. 28 is a perspective view of a modular piece of the rotor section of FIG. 27.
Figure 27:
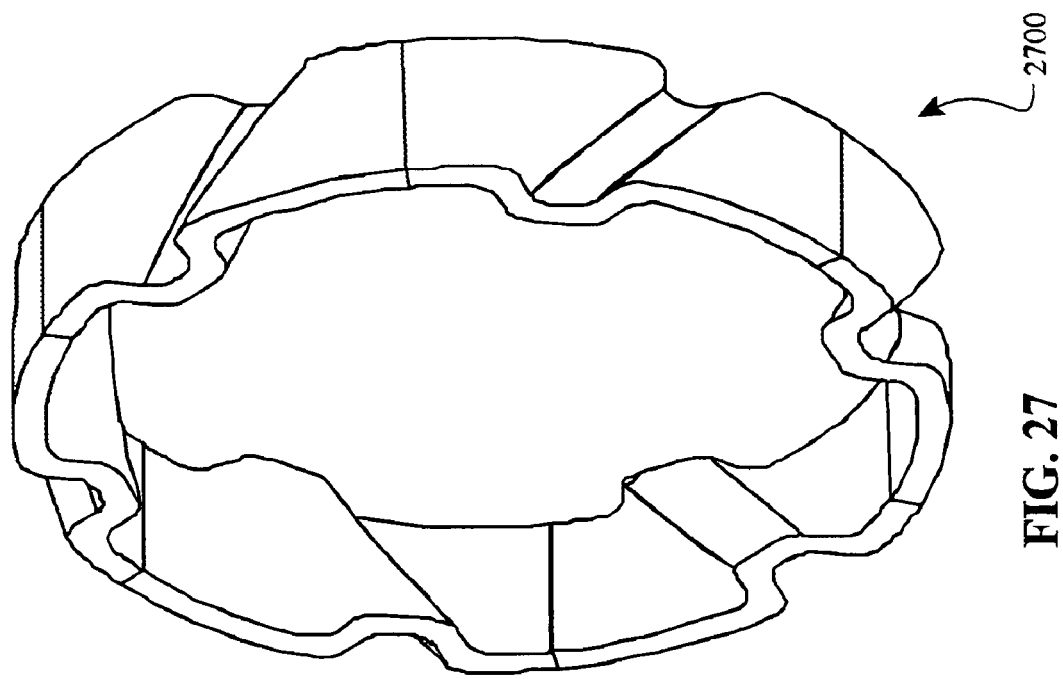
FIG. 27 is a perspective view of a section of a rotor that can be used with the system of FIG. 25.
Figure 29:
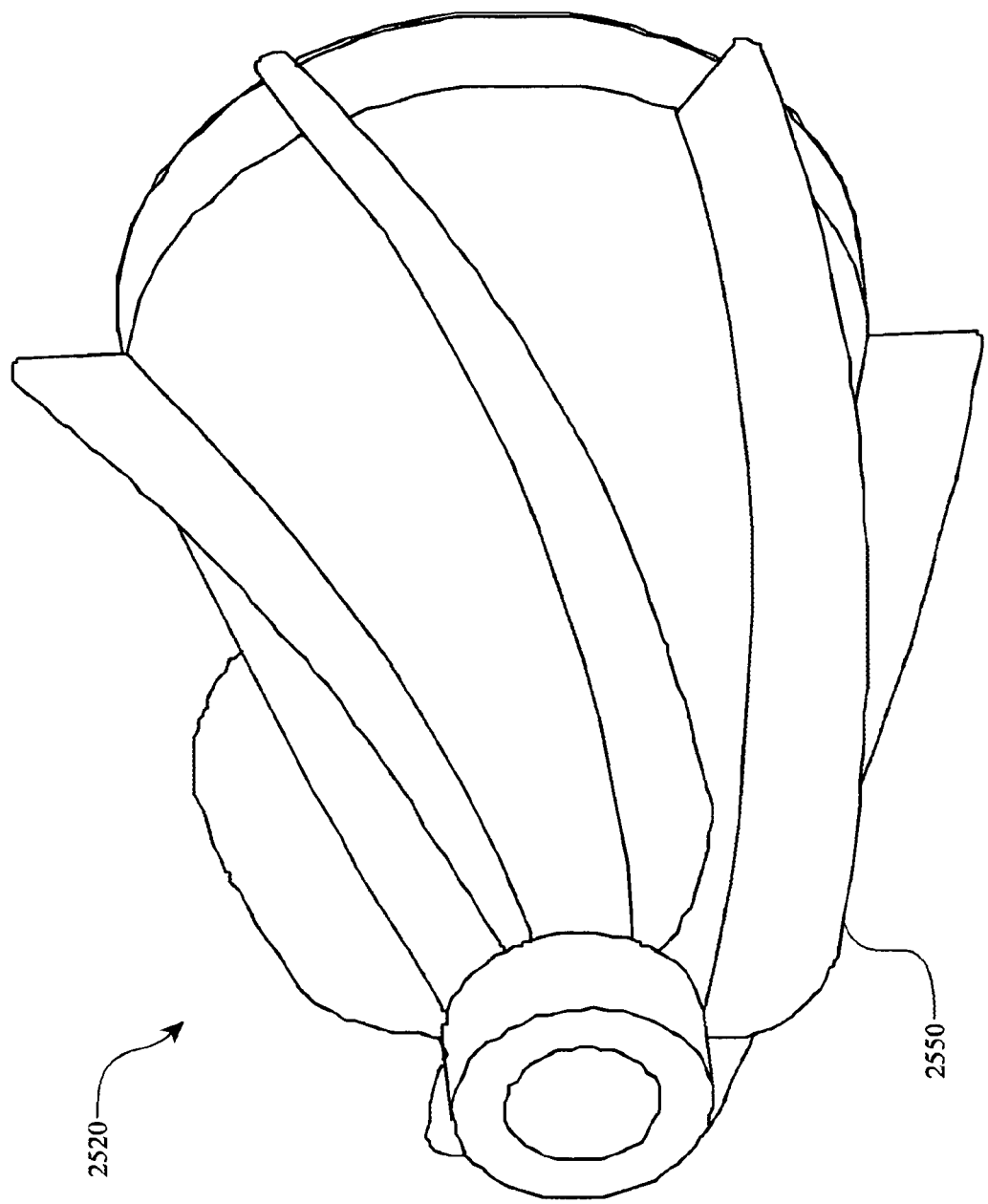
FIG. 29 is a perspective view of a central body that can be used with the system of FIG. 25.

Referring now to FIGS. 25, 27 and 28, in some embodiments, the rotor 2510 is a solid, generally cylindrical tube. In some embodiments, one or more spiral protrusions, or vanes 2540, extend longitudinally along the inner surface of the rotor 2510. In some embodiments, such as is depicted in FIGS. 27 and 28, the rotor 2510 is formed of identical pieces 2710 that are connected to form a section ring 2700, which are then attached to one another in the proper angular alignment to form a hollow tubular rotor 2510 with the repeated pattern of vanes 2540. Each piece 2710 includes a central protrusion 2720 that forms the incremental vane portion for that piece 2710. Forming the rotor 2510 from modular structures has several advantages. Namely, these modular pieces 2710 are easily transported in comparison to the large tubular rotor 2510 because they can be stacked and densely packed. Additionally, the use of these modular pieces 2710 also reduces manufacturing and storage cost. The pieces can be fastened together by any method known in the art, including mechanical fasteners, epoxies, glues interlocking structures or other methods or structures. In other embodiments, the rotor 2510 may formed of a single, integrated piece.

Referring now to FIGS. 25, 26A, 26B and 29, one embodiment of a body 2520 is illustrated that directs air that would otherwise have little effect on the vanes 2540 of the rotor 2510 towards the internal surface of the rotor 2510, thereby increasing the relative pressure in the vicinity of the rotor 2510. Therefore, as air enters the turbine system 2500 it begins to increase in pressure as the same mass of air is forced into a smaller area. For a given mass flow rate of air through the turbine 2500, the speed of the air passing through the turbine system 2500 increases, thereby increasing the kinetic energy of the wind. Because the kinetic energy of the wind is imparted from the air to the rotor 2510, the increase in kinetic energy caused by the shape of the body 2520 leads to improved performance of the turbine system 2500 as a whole. The illustrated embodiment shows a relatively linear increase in the cross-sectional area of the body 2520 along the length of the body 2520 leading to a generally cone shaped body 2520. However, non-linear shapes can also be used to achieve various compression and expansion profiles along the length of the body 2520. For instance, from the front to the back of the body 2520, the cross-sectional area can increase at a decreasing rate or at an increasing rate or at a varying rate.

Furthermore, in some embodiments, the turbine system 2500 can be designed so that air enters from the other end of the rotor 2510, so that the body 2520 rapidly compresses air at the input and as air passes over the decreasing diameter of the conical shaped body 2520, the air pressure decreases, thereby improving overall airflow through the turbine system 2500.

As is also illustrated in FIGS. 25, 26A, 26B and 29, the central body 2520 can include one or more spiral vanes 2550 along its outer surface to impart a rotational component to the velocity of at least some of the air and thereby increase the efficiency with which kinetic energy is transferred from the air to the rotor 2510. In some embodiments, the angle at which a specific portion of the air strikes the respective area of a vane 2550 of the rotor 2510 can have an effect on how much of the kinetic energy of the portion of air is transferred to the rotor 2510. This angle is optimized in some embodiments to maximize the transfer of energy to the rotor in conjunction with the evacuation of the spent air from the turbine system 2500.

Figure 30:
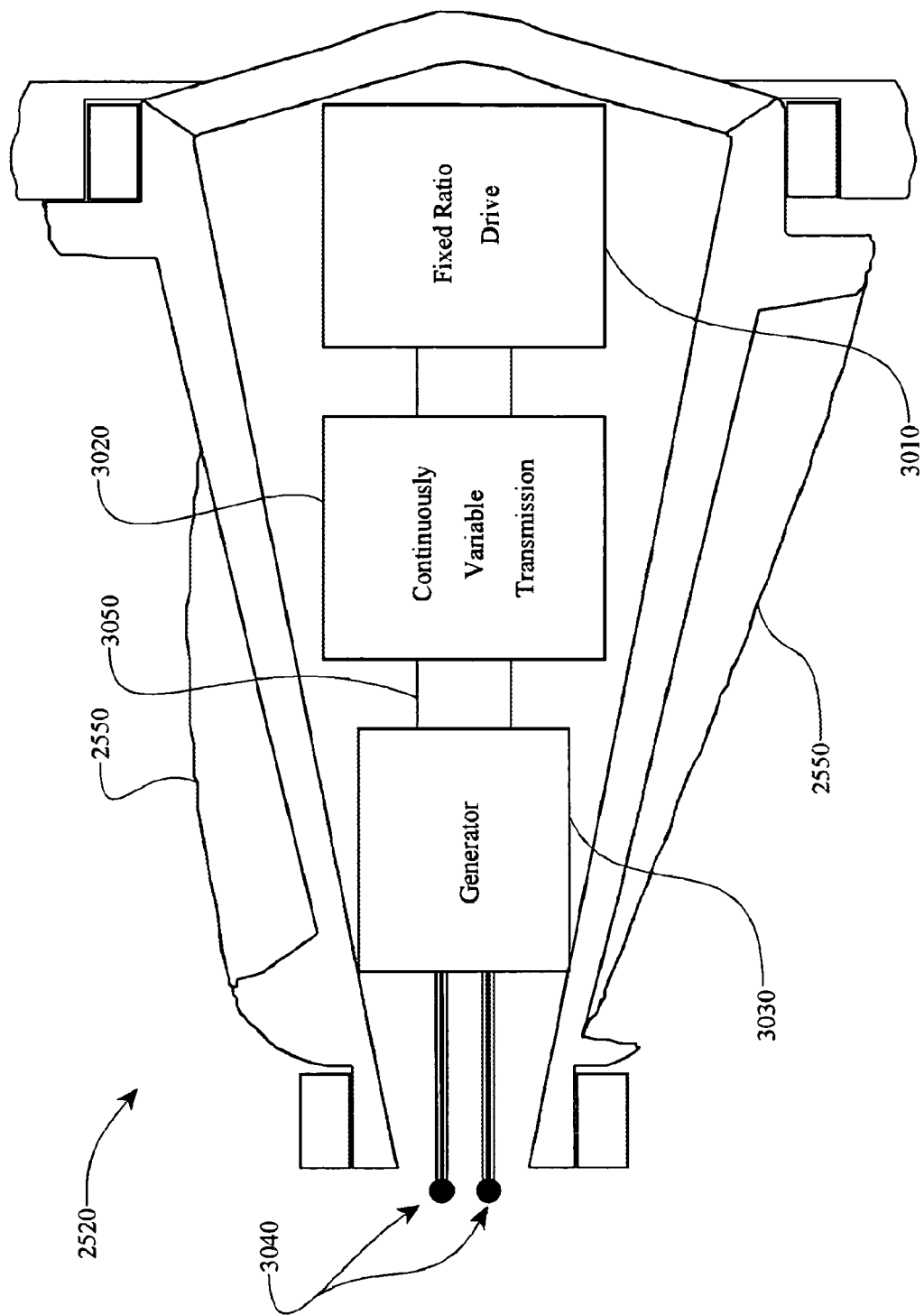
FIG. 30 is a schematic of one embodiment of the central body of FIG. 29.

Referring now to FIG. 30, in some embodiments, the central body 2520 houses one or more energy handling and transmission components. In the illustrated embodiment, the components include a fixed ratio drive 3010, a continuously variable transmission 3020 (CVT), a generator 3030 and power transmission lines 3040. The fixed ratio drive 3010 can be a step up gear system or a rolling traction planetary. The CVT 3020 can be any type known in the art and is designed to vary the rotational speed of a transmission shaft 3050 so that speed input to the generator 3030 can be controlled to optimize and simplify the generation of electrical power. The CVT 3020 can be any transmission capable of such rotational speed variance such as those described in the above-incorporated patent applications.

In some embodiments, the use of a CVT 3020 alleviates the need for power electronics known in the wind powered electrical energy generation industry that convert the power generated by the generator 3030 operating at various rotational speeds into the desired output characteristics, such as a desired frequency. Some embodiments of the body 2520 also include other transmission components or systems for coupling the varying rotational energy to an electrical generator such as are known in the art. The CVT 3020 of the illustrated embodiment can also be replaced by a typical automatic transmission or removed completely in other embodiments. The CVT 3030 can be controlled by an electrically controlled motor or in other embodiments can be controlled by the rotating speed of the rotor 2510. For instance, weights can be placed inside the spokes 2530 and connected by a tether to a control mechanism for the CVT 3020 so that a centripetal force is generated by the weights that varies with rotational speed of the rotor 2510 and that increases or decreases the CVT 3020 output speed in order to optimize the electrical power transmission of the generator 3030. In some embodiments, all of the components inside of the body 2520 are located on the ground and shafts (not shown) transmit the rotational energy to the ground via one or more gear systems such as bevel gears (not shown). While the illustrated embodiment shows the power transmission lines 3040 exiting the body 2520 via the front, it is understood that these power transmission lines 3040 can leave the body anywhere and can be dynamic contacts as well.

Referring again to FIGS. 25 and 29, the front cone on the wind entry side of the central body 2520 can also include a set of retractable flaps (not shown). At low speed, the flaps remain substantially flush against the surface of the cone. As the wind speed increases, and the CVT 3020, generator 3030 or other transmission component reaches a particular transmission ratio setpoint, the flaps begin to rise from the surface to restrict the flow of air through turbine system 2500. In some embodiments, these flaps can effectively limit the airflow to allow electrical power generation during storms, when wind power is greatest and when typical wind generators must be shut down. In some embodiments, the flaps are controlled in conjunction with the CVT 3020 via the centrifugal force of the spokes 2530 or by the electronic controller. The flaps may be elastically held flat at low speed, such as by springs or can be positively controlled via a direct control and positioning system as such mechanisms are known to one of skill in the art. Various control and positioning systems are known in the art for achieving such functionality and can be used with such embodiments.

Referring again to FIGS. 25 and 26A, the illustrated body includes a generally vertical stand 2505 that supports the turbine system 2500 above the surface upon which it is mounted, such as the ground in some embodiments, in order to achieve favorable wind conditions. The stand 2505 that is illustrated is a vertical pipe; however, any type of stand can be used. Furthermore, in the illustrated embodiment, the stand 2505 attaches to the front of the body 2520 while in some embodiments, the stand 2505 attaches to the rear or tail of the body to allow for reduced resistance to air entry into the turbine system 2500. The turbine system 2500 of some embodiments is rotatably coupled to the base 2505 to allow the system to rotate into the wind. In some such embodiments, the direction that the turbine system 2500 faces is controlled by a positioning system as such systems are known in the art and in other fields such as astronomy for example.

Figure 31:
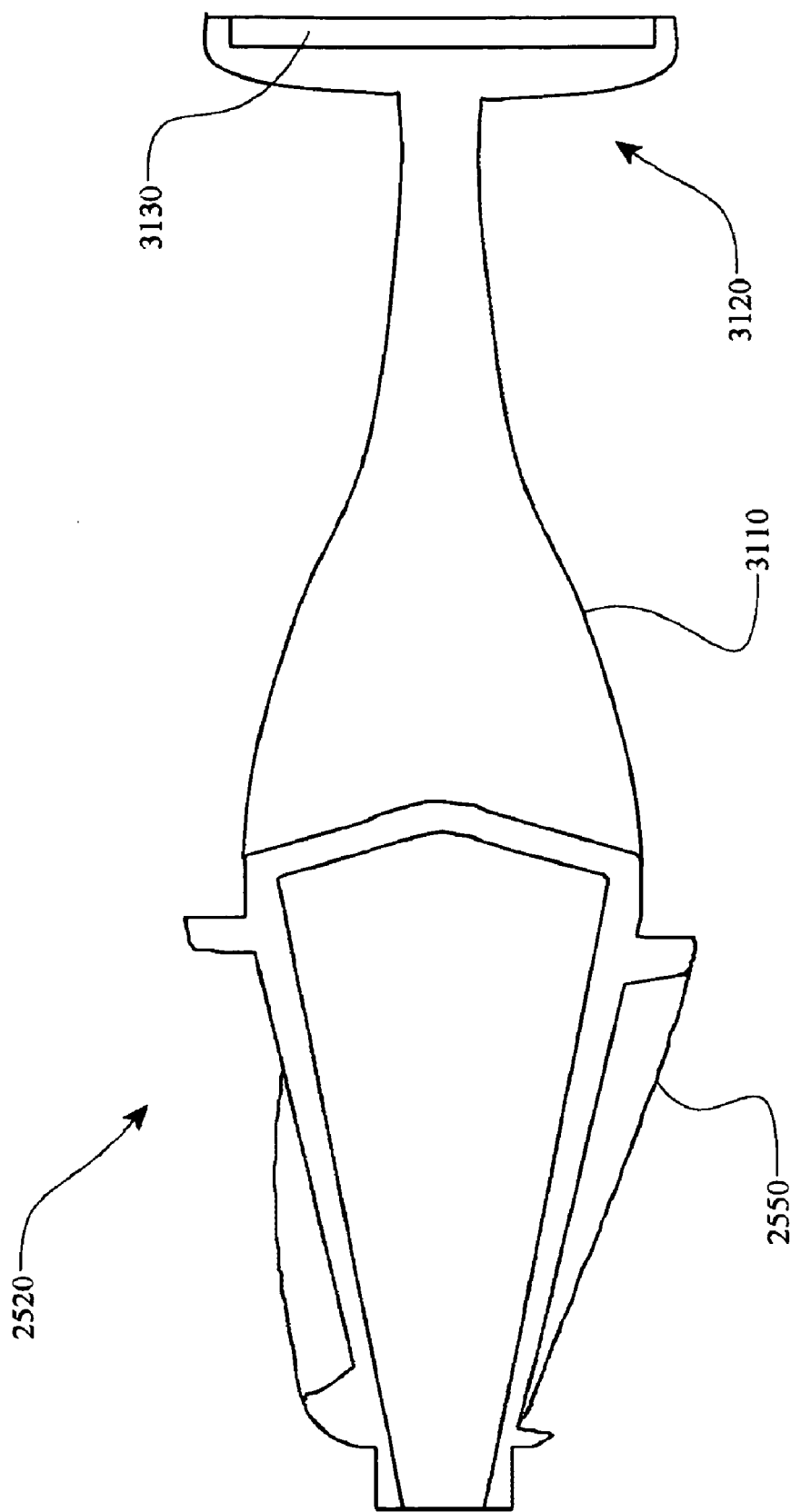
FIG. 31 is a cross-sectional view of an alternative embodiment of the central body of FIG. 29.

Referring now to FIG. 31, in some embodiments, the turbine system 2500 includes a tail 3110 on the exiting side of the central body 2530. The tail 3110 of the illustrated embodiment has a convergent shape to reduce the drag of air exiting the turbine and thereby improve the overall airflow through the turbine system 2500. Additionally, the illustrated tail 3110 includes a vertical portion 3120 for stabilization of the direction the turbine system 2500 faces. In addition, the illustrated embodiment includes a rudder 3130 that can be used to direct the turbine system 2500. The rudder 3130 can be configured to cause the wind turbine system 2500 to turn slightly out of parallel with the direction of the wind so that some of the wind creates lift to allow the rotor 2510 to at least partially lift off its bearings. As some component of the wind strikes the side of a cylinder spinning in the wind such that the bottom spins against or into the wind and the top spins away from the wind, the cylinder undergoes lift. That is, if the wind turbine system 2500 is rotated at least partially in the correct direction out of parallel with the wind, a portion of the incident wind power can be harnessed to reduce the load on the bearings and thereby increase efficiency by reducing losses. This principle can be advantageously employed to more easily bring the turbine rotor 2510 up to its steady state speed as the system is started. In addition, the reduction in weight on the bearings tends to reduce wear. Some embodiments of the system 2500 that include such lift are tilted sufficiently out of parallel with the wind so as to generate lift while still be being sufficiently parallel with the wind so as to maintain efficient coupling with the wind. In referring to both FIGS. 26A and 31, the rotor 2510 can be extended in some embodiments to surround at least partially or completely the divergent portion of the tail 3110.

Figure 32:
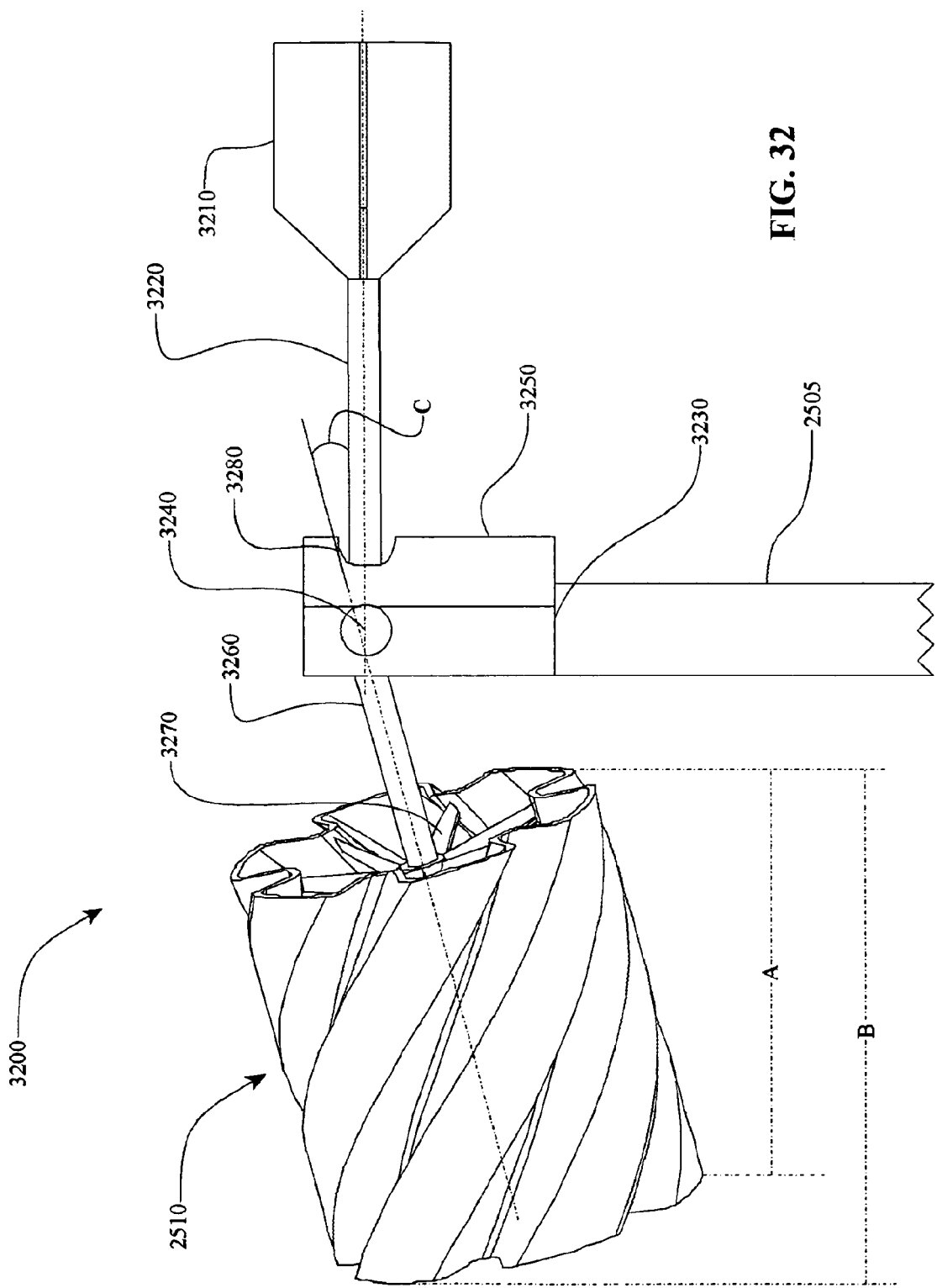
FIG. 32 is a side elevational view of an alternative embodiment of a wind turbine system.
Figures 33, 34:
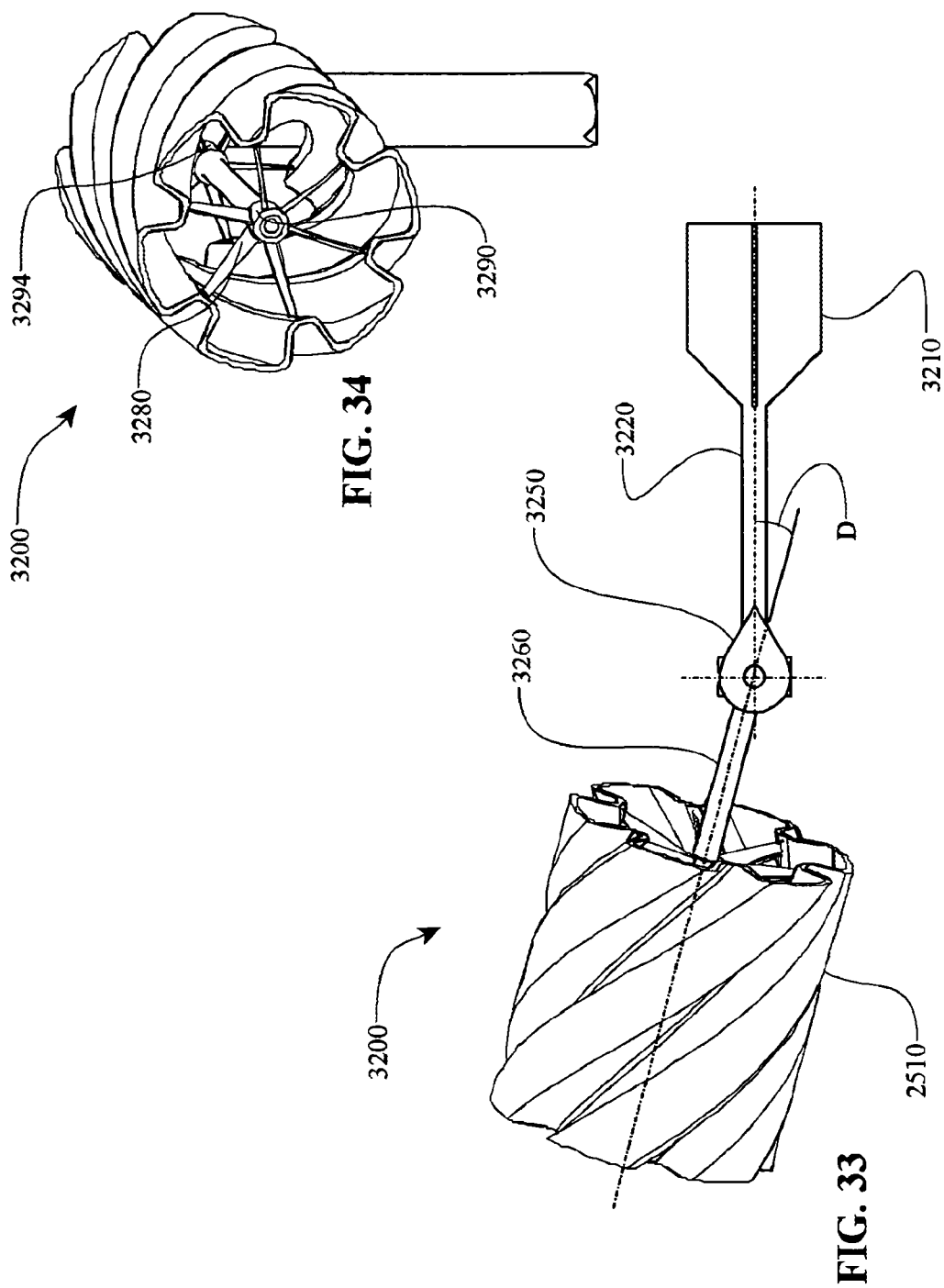
FIG. 33 is a top elevational view of the system of FIG. 32.
FIG. 34 is a front elevational view of the system of FIG. 32.

Referring now to FIGS. 32, 33, and 34, another embodiment of a wind turbine system 3200 is described. The rotor 2510 attaches to a rotor shaft 3260, a generally tubular shaped component constructed of metal, carbon fiber, fiberglass, or other any other material known in the art. The hollow core of the rotor shaft 3260 allows for the passage of electrical lines and any other parts and materials required to generate electricity, pump water, or other uses that may be employed for the wind turbine system 3200. The rotor shaft 3260 attaches at a first end to a front hub 3290 (see FIGS. 34, 37), located at the front central portion of the rotor 2510. In one embodiment the rotor shaft 3260 is stationary and does not rotate. At a second end the rotor shaft 3260 attaches to a swivel 3240. The swivel 3240, constructed of a strong, rigid material such as steel, provides for vertical tilting of the rotor 2510 along an up and down vertical plane. The swivel 3240 is housed in a swivel mount 3250, which is constructed of a strong, rigid, and in one embodiment lightweight material, such as carbon fiber or other composite. The swivel mount 3250 pivots on the stand 2505 to allow for rotational movement of the wind turbine system 3200 on a horizontal plane in response to changes in wind direction. Bearings (not shown) used in the art may be employed between the swivel mount 3250 and the stand 2505 to minimize friction during rotational movement on a horizontal plane. Also attached to the swivel 3240 is a tail shaft 3220, which can be any shape but in the illustrated embodiment is a generally cylindrical rod or tube constructed from metal, composite, or any other material common in the art. The tail shaft 3220 attaches to the swivel 3240 at a first end and at a second end attaches to the tail 3210 and in one embodiment does not rotate. The tail 3210 is designed to position the rotor 2510 both vertically and horizontally with respect to the wind. In one embodiment, the tail 3210 is constructed of four generally flat, planar sections that are strong and rigid. Two of the four sections are positioned vertically on a vertical plane coincident with the tail shaft 3220 axis and serve to horizontally position the rotor 2510. Two other sections are positioned horizontally on a horizontal plane coincident with the tail shaft 3220 axis and serve to vertically position the rotor 2510.

Referring to FIG. 32, the wind turbine system 3200 is designed to produce lift to the rotor 2510 by increasing the speed of the wind over the top of the rotor 2510. The rotor 2510 is tilted down vertically so that the front of the rotor 2510, which is the portion of the rotor 2510 facing into the wind, is lower than the back of the rotor 2510. The rotor 2510 is pointed down toward the foundation to which the stand 2505 is anchored. This creates a situation where wind hits the top of the front of the rotor 2510 before hitting the bottom front of the rotor 2510. Line A shows that the distance from the bottom front of the rotor 2510 to the back of the rotor 2510 is shorter than line B, which is the distance from the top front of the rotor 2510 to the back of the rotor 2510. Because the wind must flow farther to reach the back of the rotor 2510, the wind will flow faster over the top of the rotor 2510, creating an area of lower pressure and lift. This lift effectively reduces the weight of the rotor 2510, increasing its rotational speed. Still referring to FIG. 32, angle C, near the center of FIG. 32, is the angular distance on a vertical plane between the axis of the tail shaft 3220, which is generally parallel with the wind flow, and the axis of the rotor shaft 3260. Angle C maximizes the lift produced by the lower pressure on the top of the rotor 2510 without sacrificing wind flow through the rotor 2510. If angle C is too large, wind will be cut off from entering the rotor 2510 and the rotational speed of the rotor 2510 will decrease. If angle C is too small, insufficient lift will be generated to optimize the rotor's 2510 rotational speed. The optimum angle for angle C varies with the wind speed, the rpm of the rotor 2510, the design of the rotor 2510, and the size of the wind turbine system 3200. In one embodiment, angle C is 15 degrees, although it can vary from 1-30 degrees depending upon the application.

Referring now to FIG. 33, the wind turbine system 3200 is also designed to produce lift to the rotor 2510 by increasing the speed of the wind over the top of the rotor 2510. The rotor 2510 is tilted horizontally on a horizontal plane so that the wind strikes the front of the rotor 2510 at an angle D, which is the angular distance on a horizontal plane between the axis of the tail shaft 3220, which is generally parallel with the wind flow, and the axis of the rotor shaft 3260. The rotor 2510 in wind turbine system 3200 is designed to rotate counter-clockwise when viewed from the front. When the rotor 2510 rotates counter-clockwise it will be tilted to the left when viewed from the front. Conversely, in other embodiments where the rotor 2510 rotates clockwise, it will be tilted to the right when viewed from the front. Tilting the rotor 2510 horizontally causes the wind striking the bottom of the rotor 2510 to some degree to move in the opposite direction as the rotation of the rotor 2510, slowing wind speed under the bottom of the rotor 2510. At the same time wind flowing over the top of the rotor 2510 moves to some degree in the same direction as the rotation of the rotor 2510. This creates lower pressure above the rotor 2510, creating lift. This lift effectively lightens the rotor 2510 enabling it to rotate faster. Making angle D too large will decrease the amount of wind entering the rotor 2510, reducing rotational speed of the rotor 2510. Making angle D to small will not take maximum advantage of the lift that can be produced. Angle D in the wind turbine system 3200 is 15 degrees, although depending on the application, it can vary between 1-30 degrees.

Figure 38:
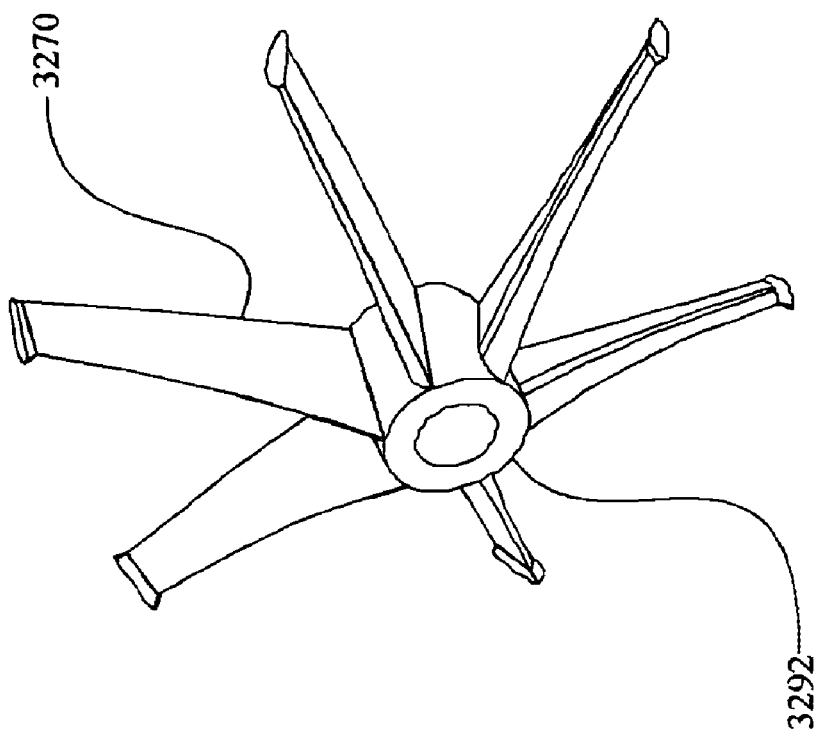
FIG. 38 is a perspective view of a set of back blades that can be used with the system of FIG. 32.
Figure 37:
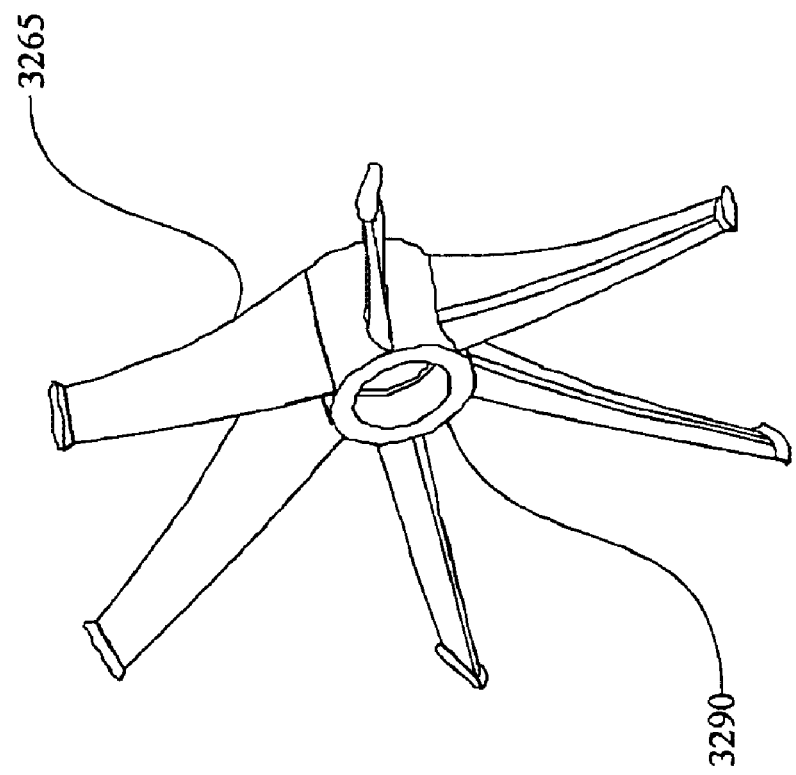
FIG. 37 is a perspective view of a set of front blades that can be used with the system of FIG. 32.

Referring now to FIGS. 34, 37, and 38, sets of front and rear blades 3265, 3270 attach the rotor 2510 to the front and rear hubs 3290, 3292, respectively. In one embodiment the number of blades for each set of front and rear blades 3265, 3270 is six, but this number can vary from 2-20 or more blades. Referring to FIG. 37, in one embodiment the front blades 3265 sweep forward as they move radially outward to strengthen the structure of the rotor 2510, minimizing flex. Referring to FIG. 38, the rear blades sweep backward as they move radially outward, also to strengthen the structure of the rotor 2510 and to minimize flex. Both the front and rear blades 3265, 3270 are aerodynamically designed to minimize wind resistance, produce energy, and maximize the flow of wind through the rotor 2510. The front and rear blades 3265, 3270 can be further designed to capture wind, and convert it to rotational energy, as is common in the art. In one embodiment, the front and rear blades 3265, 3270 are designed to act as fans and push wind through the center of the rotor 2510. This increase in speed of the wind through the center creates a situation where wind is sucked into the rotor 2510 from an area greater than the diameter of the rotor 2510. This increases wind capture, in effect creating a larger diameter rotor 2510. Wind adjacent to the flow sucked to the inside of the rotor 2510 is also affected, causing this wind to strike the outside of the rotor 2510, further increasing rotational speed of the rotor 2510.

Figure 36:
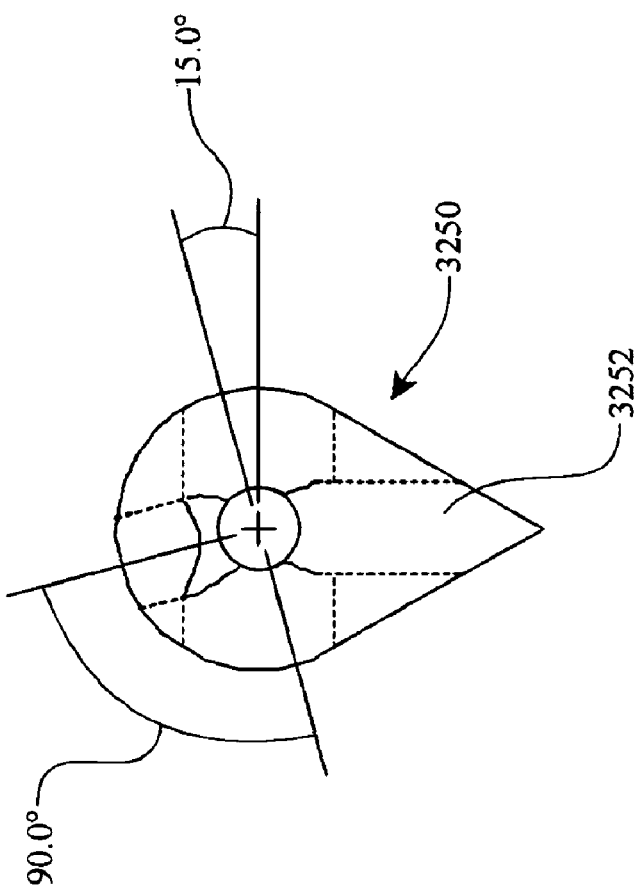
FIG. 36 is a bottom view of the swivel mount of FIG. 35.
Figure 35:
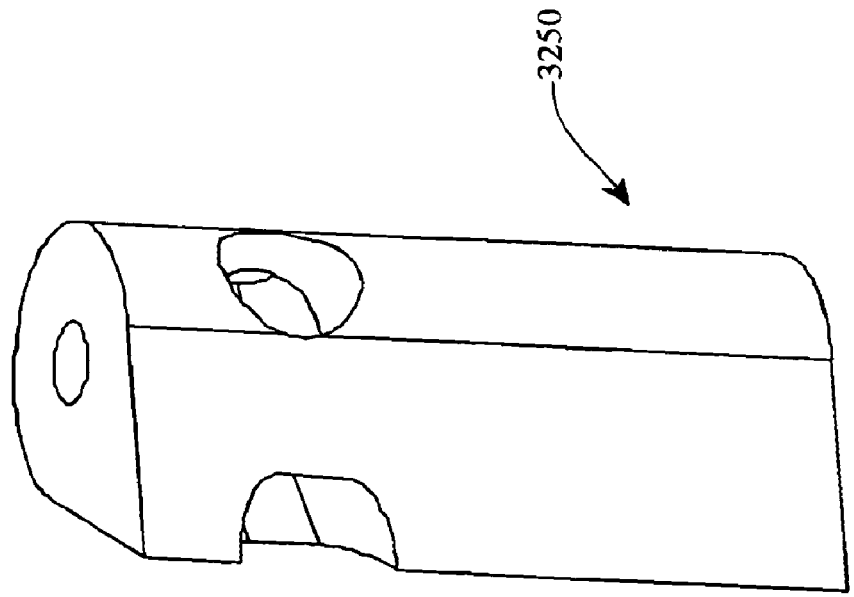
FIG. 35 is a perspective view of a swivel mount that can be used with the system of FIG. 32.

Referring to FIGS. 35 and 36, the swivel mount 3250 serves to position the rotor 2510 at optimal vertical and horizontal angles. The swivel mount 3250 also provides a balance point for the wind turbine system 3200. In one embodiment, weight is evenly distributed on both sides of the swivel mount 3250, reducing wear and minimizing the size and cost of structural components. The swivel mount 3250 is hollow, allowing for the passage of electrical lines and other equipment to pass through into the stand 2505. In one embodiment, the swivel mount 3250 has an aerodynamic profile to minimize wind resistance. At a first, lower end, the swivel mount 3250 contacts the top of the stand 2505. The swivel mount 3250 can rotate on top of the stand 2505. This rotation can be facilitated by placing a bearing between the stand 2505 and the swivel mount 3250. The swivel mount 3250 also has an aperture into which the swivel 3240 is inserted. The swivel 3240, attached to both the rotor shaft 3260 and the tail shaft 3220, provides for vertical tilting of the rotor 2510. A slot at the front of the swivel mount 3250 provides for entry of the rotor shaft 3260, connection to the swivel 3240, and provides space for vertical tilting of the rotor shaft 3260 without contacting the swivel mount 3250. A similar slot at the rear of the swivel mount provides for entry of the tail shaft 3220, connection to the swivel 3240, and provides space for vertical tilting of the tail shaft 3240 without contacting the swivel mount 3250. Referring to FIG. 36, a bottom view of the swivel mount 3250 shows that the slot 3252 into which the tail shaft 3220 is inserted is angularly offset by 15 degrees from the slot in the front of the swivel mount 3250, which faces the wind.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A tube for a fluid energy converter, the tube comprising:
   a generally cylindrical and hollow body having an interior surface, an exterior surface, and a longitudinal axis; and
   a plurality of helical grooves formed into the exterior surface and the interior surface;
   wherein each helical groove formed into the exterior surface has an exterior tip surface and an exterior root surface and wherein each helical groove formed into the interior surface has an interior tip surface and an interior root surface, wherein a first portion of the body defines the exterior tip surface of a respective one of the grooves formed into the exterior surface and wherein the first portion defines the interior root surface of a respective one of the grooves formed into the interior surface and wherein a second portion of the body defines the exterior root surface of the respective one of the grooves formed into the exterior surface and wherein the second portion defines the interior tip surface of a respective one of the grooves formed into the interior surface; and
   wherein each helical groove has first and second walls and wherein the helical grooves are adapted to capture fluid on the first wall of a helical groove on the exterior surface, and wherein the helical grooves are adapted to capture fluid on the second wall of the helical groove on the interior surface.

2. The tube of claim 1, wherein the tube comprises a plurality of helical pieces, the helical pieces having apertures and a substantially helical shape with portions of one or more helical grooves formed into each helical piece.

3. The tube of claim 1, wherein the tube is configured such that when the tube is pitched down a high pressure area forms on the top of the tube.

4. The tube of claim 1, wherein the tube is configured such that when the tube is pitched up a high pressure area forms on the bottom of the tube.

5. The tube of claim 1, wherein the tube is configured such that yawing the tube in a first direction causes a high pressure area to form on the bottom of the tube.

6. The tube of claim 1, wherein the tube is configured such that yawing the tube produces a high pressure area on the top of the tube.

7. The tube of claim 1, wherein the tube is configured such that yawing, and pitching down, the tube causes a high pressure area to form on the top of the tube.

8. The tube of claim 1, wherein the tube is configured such that yawing, and pitching up, the tube causes a high pressure area to form on the bottom of the tube.

9. A fluid energy converter, comprising:
   a longitudinal axis;
   a rotatable tube coaxial about the longitudinal axis, wherein the rotatable tube has a plurality of helical grooves formed into an exterior surface and an interior surface of the rotatable tube;
   a set of front blades distributed radially around the longitudinal axis, the set of front blades coupled to the rotatable tube;
   a set of back blades distributed radially around the longitudinal axis, the set of back blades coupled to the rotatable tube;
   a shaft coincident with the longitudinal axis and operationally coupled to the rotatable tube;
   a nacelle positioned coaxially about the longitudinal axis, wherein the nacelle is positioned inside the rotatable tube; and
   wherein the rotatable tube is configured to convert kinetic energy in a fluid into rotating mechanical energy, or to convert rotating mechanical energy into kinetic energy in a fluid.

10. The fluid energy converter of claim 9, wherein a tip of each blade on the set of front blades rigidly attaches to the interior surface.

11. The fluid energy converter of claim 9, wherein a tip of each blade on the set of back blades rigidly attaches to the interior surface.

12. The fluid energy converter of claim 9, wherein the set of back blades is configured to convert kinetic energy in a fluid into rotating mechanical energy, or convert rotating mechanical energy into kinetic energy in a fluid.

13. A rotor for a windmill, the rotor comprising:
    a generally cylindrical and hollow tube having an interior surface and an exterior surface;
    a plurality of walls along a perimeter of the tube, the walls forming a plurality of helical vanes configured to receive kinetic energy from a wind; and
    wherein the rotor is configured for mounting coaxially with a nacelle, and wherein the nacelle is located at least partly in the tube.

14. The rotor of claim 13, wherein the walls form internal and exterior surfaces of the tube.

15. The rotor of claim 13, further comprising a first plurality of blades that operationally couple the rotor to a torque transmitting shaft of the windmill.

16. The rotor of claim 15, wherein the first plurality of blades couples to a first hub of the windmill.

* * * * *

UNITED STATES PATENT AND TRADEMARK OFFICE
CERTIFICATE OF CORRECTION

PATENT NO. : 7,600,963 B2 Page 1 of 1
APPLICATION NO. : 11/506762
DATED : October 13, 2009
INVENTOR(S) : Donald C. Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Fifth Day of October, 2010

David J. Kappos
*Director of the United States Patent and Trademark Office*